(12) United States Patent
Keller et al.

(10) Patent No.: US 9,129,078 B1
(45) Date of Patent: *Sep. 8, 2015

(54) STATIC TIMING ANALYSIS OF INTEGRATED CIRCUIT DESIGNS WITH FLEXIBLE NOISE AND DELAY MODELS OF CIRCUIT STAGES

(71) Applicant: Cadence Design Systems, Inc., San Jose, CA (US)

(72) Inventors: Igor Keller, Pleasanton, CA (US); Vinod Kariat, Sunnyvale, CA (US); King Ho Tam, Fremont, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/067,720

(22) Filed: Oct. 30, 2013

Related U.S. Application Data

(60) Division of application No. 12/203,128, filed on Sep. 2, 2008, now Pat. No. 8,595,669, which is a continuation-in-part of application No. 12/203,115, filed on Sep. 2, 2008, now Pat. No. 8,543,954.

(60) Provisional application No. 60/969,580, filed on Aug. 31, 2007, provisional application No. 60/696,580, filed on Jul. 1, 2005.

(51) Int. Cl.
   *G06F 17/50* (2006.01)

(52) U.S. Cl.
   CPC ........ *G06F 17/5031* (2013.01); *G06F 17/5036* (2013.01); *G06F 17/5068* (2013.01); *G06F 17/5072* (2013.01); *G06F 2217/84* (2013.01)

(58) Field of Classification Search
   CPC ............ G06F 17/5068; G06F 17/5072; G06F 17/5036; G06F 17/5031; G06F 2217/84
   USPC ......... 716/113, 115, 118, 119, 124, 131, 132, 716/134
   See application file for complete search history.

(56) References Cited

U.S. PATENT DOCUMENTS

| | | | | |
|---|---|---|---|---|
| 5,794,128 | A * | 8/1998 | Brockel et al. | 455/67.11 |
| 6,117,182 | A * | 9/2000 | Alpert et al. | 716/114 |
| 6,292,766 | B1 * | 9/2001 | Mattos et al. | 703/14 |
| 6,347,393 | B1 * | 2/2002 | Alpert et al. | 716/114 |
| 6,378,109 | B1 * | 4/2002 | Young et al. | 716/115 |
| 6,405,348 | B1 * | 6/2002 | Fallah-Tehrani et al. | 716/113 |
| 6,499,131 | B1 * | 12/2002 | Savithri et al. | 716/115 |
| 6,675,365 | B2 * | 1/2004 | Elzinga | 716/113 |
| 6,941,258 | B2 * | 9/2005 | Van Heijningen et al. | 703/16 |
| 6,971,076 | B2 * | 11/2005 | Chen | 716/115 |
| 6,983,432 | B2 * | 1/2006 | Hayes | 716/113 |
| 7,050,388 | B2 * | 5/2006 | Kim et al. | 370/201 |
| 7,073,140 | B1 * | 7/2006 | Li et al. | 716/115 |

(Continued)

*Primary Examiner* — Helen Rossoshek
(74) *Attorney, Agent, or Firm* — Schwegman Lundberg & Woessner P.A.

(57) ABSTRACT

Systems, apparatus, and methods of static timing analysis for an integrated circuit design in the presence of noise are disclosed. The integrated circuit design may be partitioned into a plurality of circuit stages. A timing graph including timing arcs is constructed to represent the timing delays in circuit stages of the integrated circuit design. A model of each circuit stage may be formed including a model of a victim driver, an aggressor driver, a victim receiver, and a victim net and an aggressor net coupled together. For each timing arc in the timing graph, full timing delays may be computed for the timing arcs in each circuit stage.

15 Claims, 34 Drawing Sheets

(56) References Cited

U.S. PATENT DOCUMENTS

| | | | |
|---|---|---|---|
| 7,086,018 B2 * | 8/2006 | Ito | 716/112 |
| 7,158,920 B2 * | 1/2007 | Ishikawa | 702/191 |
| 7,181,716 B1 * | 2/2007 | Dahroug | 716/115 |
| 7,359,843 B1 * | 4/2008 | Keller et al. | 703/2 |
| 7,383,522 B2 * | 6/2008 | Murgai et al. | 716/113 |
| 7,454,731 B2 * | 11/2008 | Oh et al. | 716/113 |
| 7,469,391 B2 * | 12/2008 | Carrere et al. | 716/115 |
| 7,549,134 B1 * | 6/2009 | Li et al. | 716/115 |
| 7,562,323 B1 * | 7/2009 | Bai et al. | 716/115 |
| 7,590,953 B2 * | 9/2009 | Chang | 716/113 |
| 7,720,654 B2 * | 5/2010 | Hollis | 703/2 |
| 7,747,975 B2 * | 6/2010 | Dinter et al. | 716/119 |
| 7,761,275 B2 * | 7/2010 | Chopra et al. | 703/14 |
| 7,804,760 B2 * | 9/2010 | Schmukler et al. | 370/201 |
| 7,882,466 B2 * | 2/2011 | Ishikawa | 716/136 |
| 7,882,471 B1 * | 2/2011 | Kariat et al. | 716/113 |
| 7,890,915 B2 * | 2/2011 | Celik et al. | 716/113 |
| 8,205,181 B1 * | 6/2012 | Singla et al. | 716/113 |
| 8,336,010 B1 * | 12/2012 | Chang et al. | 716/108 |
| 8,543,954 B1 * | 9/2013 | Keller et al. | 716/115 |
| 8,595,669 B1 * | 11/2013 | Keller et al. | 716/115 |
| 8,631,369 B1 * | 1/2014 | Kariat et al. | 716/113 |
| 2003/0182640 A1 * | 9/2003 | Alani et al. | 716/4 |
| 2009/0193373 A1 * | 7/2009 | Abbaspour et al. | 716/6 |
| 2011/0257953 A1 * | 10/2011 | Li et al. | 703/14 |

\* cited by examiner

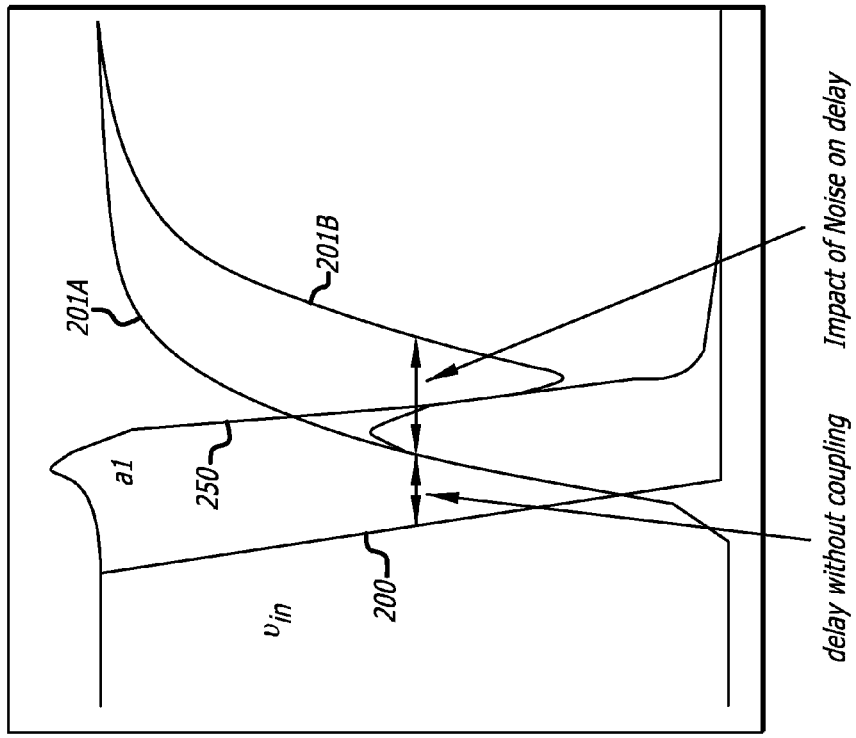
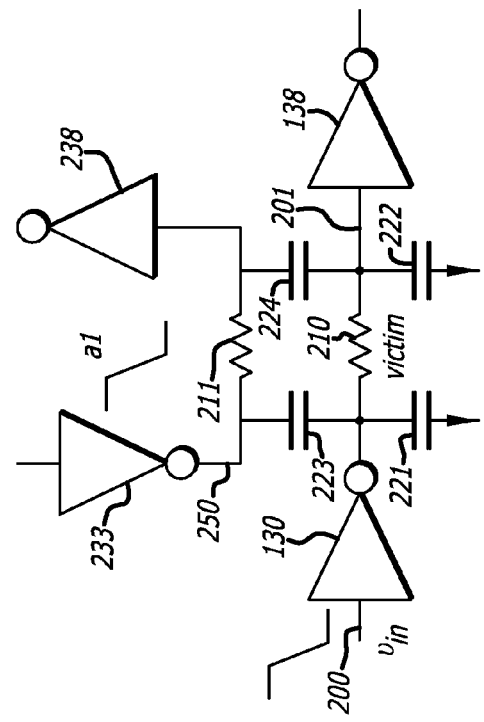
FIG. 2A
FIG. 2B

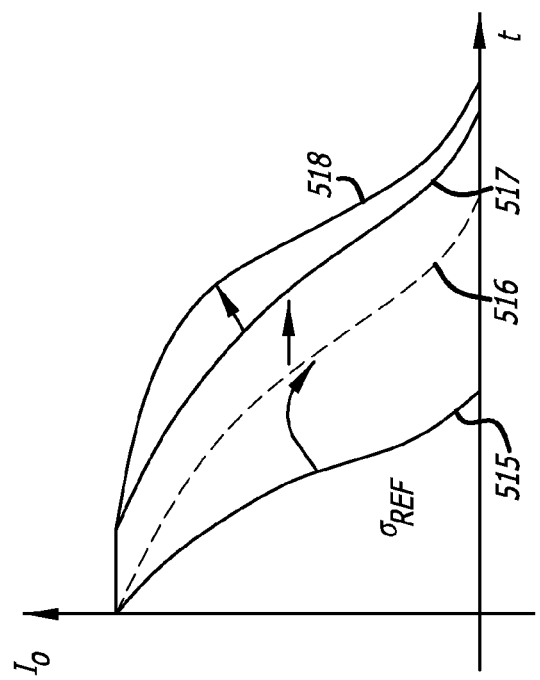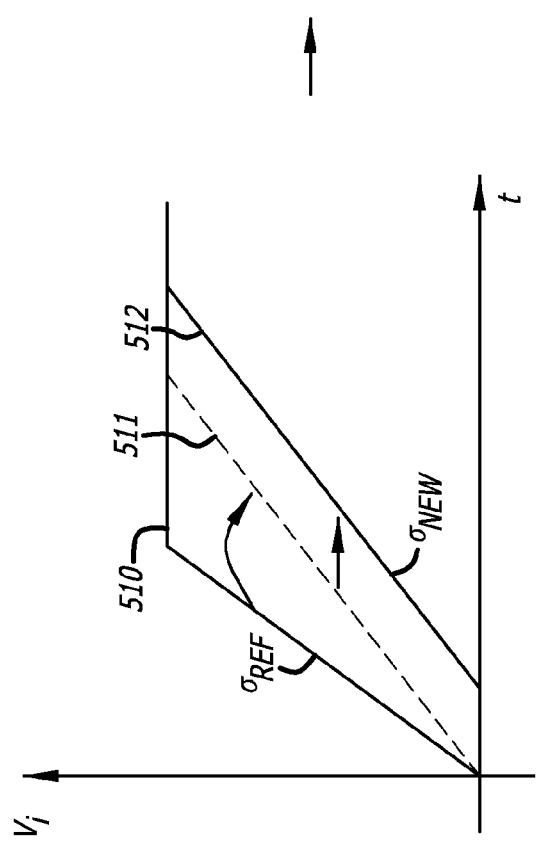
FIG. 5B

|  | $\tau_\sigma$ | $T_\sigma$ |
|---|---|---|
| $\sigma_{REF}$ | $\tau_{REF}$ | $T_{REF}$ |
| $\sigma_{FAST}$ | $\tau_{FAST}$ | $T_{FAST}$ |
| $\sigma_{SLOW}$ | $\tau_{SLOW}$ | $T_{SLOW}$ |

FIG. 11

| v | 0 | $v_1$ | $v_2$ | ... | 1 |
|---|---|---|---|---|---|
| $\sigma_{REF}$ | $F_{\sigma_{REF}}(0)$ | $F_{\sigma_{REF}}(v_1)$ | $F_{\sigma_{REF}}(v_2)$ | ... | $F_{\sigma_{REF}}(1)$ |
| $\sigma_{FAST}$ | $F_{\sigma_{FAST}}(0)$ | $F_{\sigma_{FAST}}(v_1)$ | $F_{\sigma_{FAST}}(v_2)$ | ... | $F_{\sigma_{FAST}}(1)$ |
| $\sigma_{SLOW}$ | $F_{\sigma_{SLOW}}(0)$ | $F_{\sigma_{SLOW}}(v_1)$ | $F_{\sigma_{SLOW}}(v_2)$ | ... | $F_{\sigma_{SLOW}}(1)$ |

FIG. 12

| $V_c(t)/V_o$ | $V_{o_0}$ | $V_{o_1}$ | $V_{o_2}$ | $V_{o_3}$ | $\cdots$ | $V_{o_P}$ |
|---|---|---|---|---|---|---|
| $V_{c(0)}$ | $I_{0,0}$ | $I_{0,1}$ | $I_{0,2}$ | $I_{0,3}$ | $\cdots$ | $I_{0,P}$ |
| $V_{c(1)}$ | $I_{1,0}$ | $I_{1,1}$ | $I_{1,2}$ | $I_{1,3}$ | $\cdots$ | $I_{1,P}$ |
| $V_{c(2)}$ | $I_{2,0}$ | $I_{2,1}$ | $I_{2,2}$ | | $\cdots$ | $I_{2,P}$ |
| $V_{c(3)}$ | $I_{3,0}$ | $I_{3,1}$ | $I_{3,2}$ | | $\cdots$ | $I_{3,P}$ |
| $\vdots$ | $\vdots$ | | | | | |
| $V_{c_Q}$ | $I_{Q_0}$ | $I_{Q_1}$ | $I_{Q_2}$ | | $\cdots$ | $I_{Q_P}$ |

FIG. 13

| $V_o$ | $C_g$ |
|---|---|
| $V_{o_0}$ | $C_{g_0}$ |
| $V_{o_1}$ | $C_{g_1}$ |
| $V_{o_2}$ | $C_{g_2}$ |
| $\vdots$ | $\vdots$ |
| $V_{o_P}$ | $C_{g_P}$ |

FIG. 14

| u (measured @ current l) / σ | $u_1(@l_1)$ | ... | $u_i(@l_i)$ | $u_{i+1}(@l_{i+1})$ | ... |
|---|---|---|---|---|---|
| $σ_1$ | $Y_1$ | ... | $Y_i$ | $Y_{i+1}$ | ... |
| $σ_2$ | $Z_2$ | ... | $Z_i$ | $Z_{i+1}$ | ... |
| $σ_0$ | $X_1$ | ... | $X_i$ | $X_{i+1}$ | ... |

FIG. 15

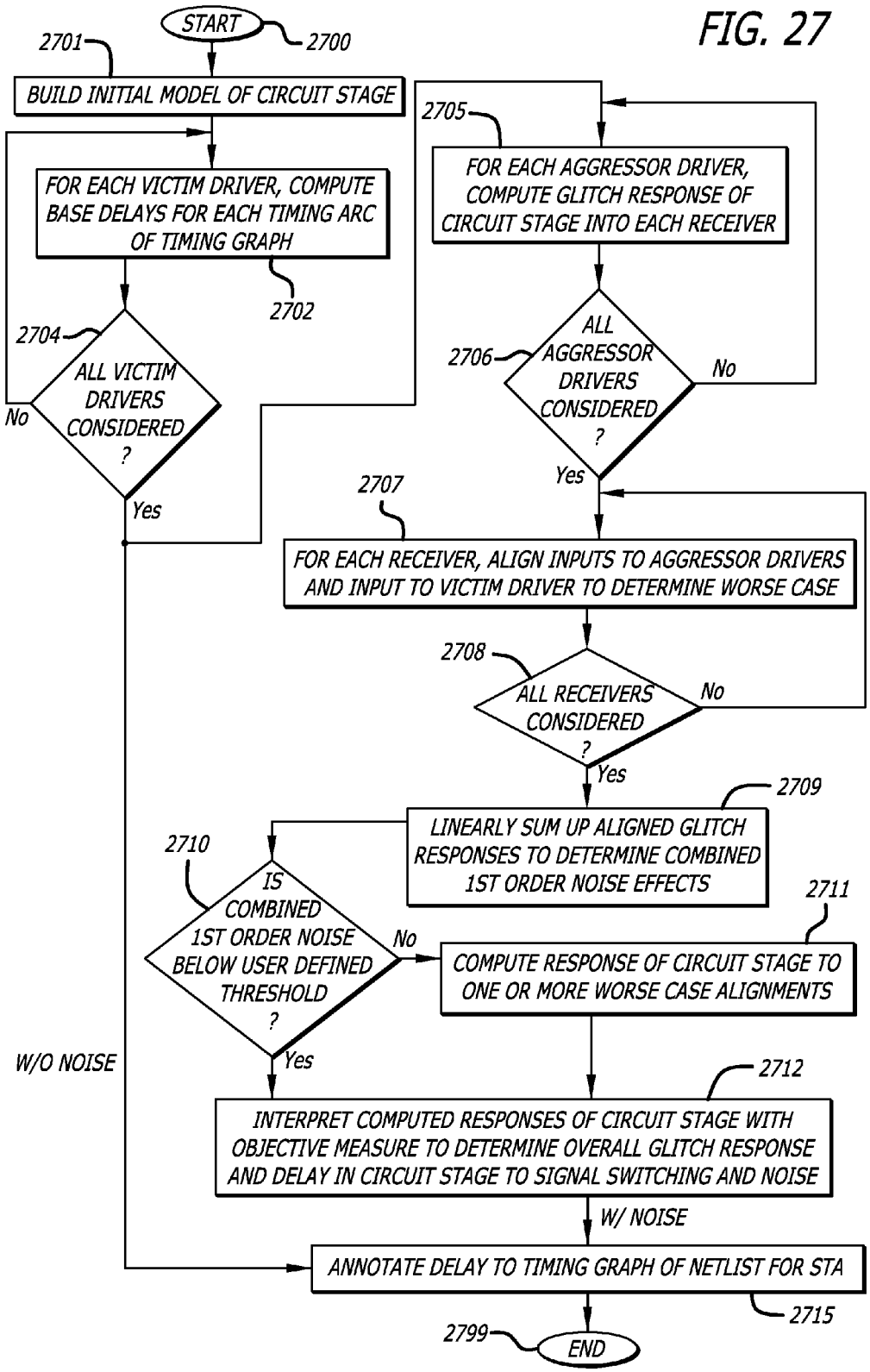

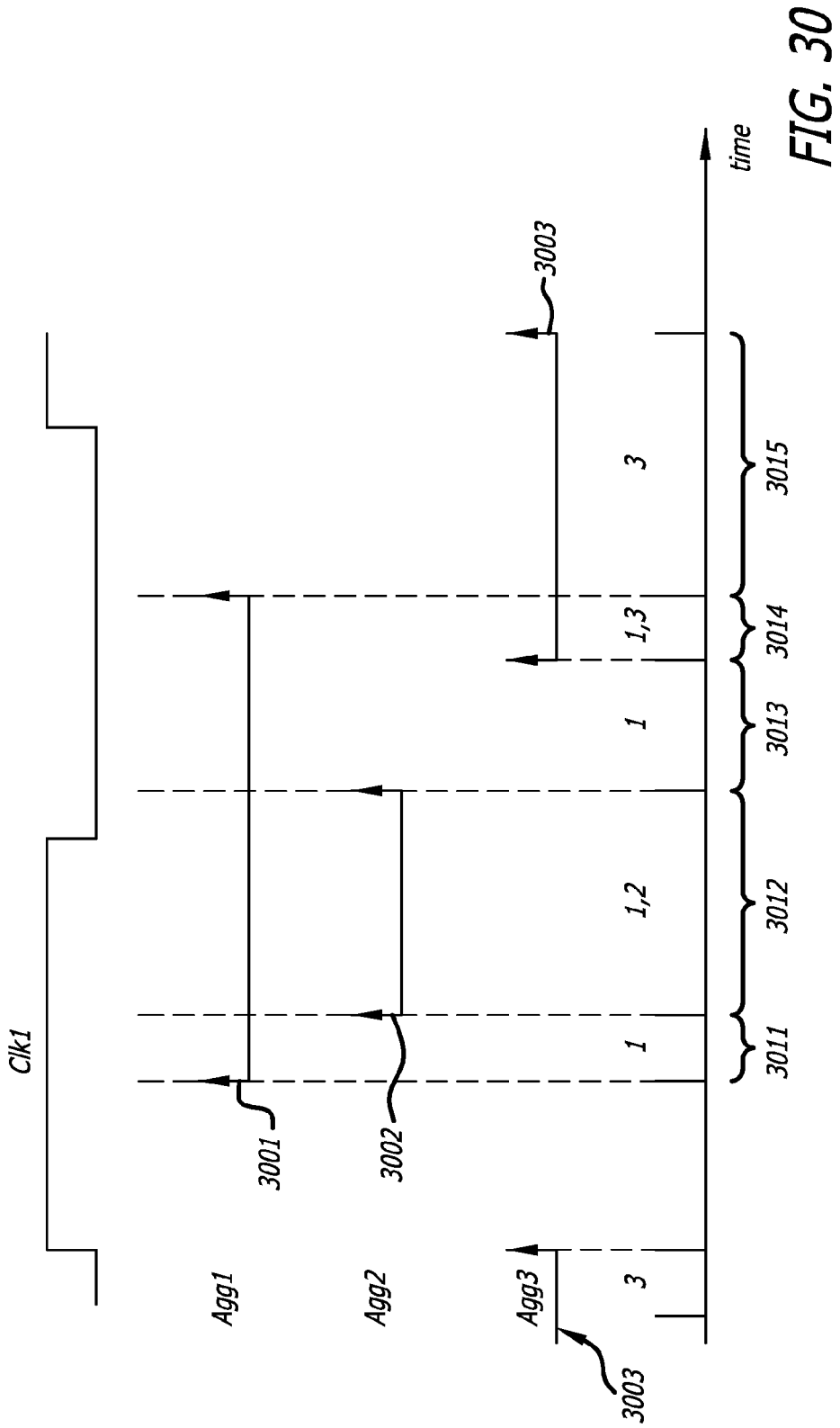

STATIC TIMING ANALYSIS OF INTEGRATED CIRCUIT DESIGNS WITH FLEXIBLE NOISE AND DELAY MODELS OF CIRCUIT STAGES

CROSS REFERENCE TO RELATED APPLICATIONS

This non-provisional United States (U.S.) patent application is a divisional patent application and claims the benefit of U.S. patent application Ser. No. 12/203,128 filed on Sep. 2, 2008 by inventors, Igor Keller et al., entitled FLEXIBLE NOISE AND DELAY MODELING OF CIRCUIT STAGES FOR STATIC TIMING ANALYSIS OF INTEGRATED CIRCUIT DESIGNS, pending. U.S. patent application Ser. No. 12/203,128 claims the benefit of provisional U.S. Patent Application No. 60/969,580 filed on Aug. 31, 2007 by inventors, Igor Keller et al., entitled CONCURRENT SENSITIVITY, NOISE, AND STATIC TIMING ANALYSIS FOR INTEGRATED CIRCUIT DESIGNS USING A MULTI-CCC CURRENT SOURCE MODEL, and is incorporated in its entirety (including appendices) herein by reference.

U.S. patent application Ser. No. 12/203,128 further is a continuation-in-part and claims the benefit of non-provisional U.S. patent application Ser. No. 12/203,115 filed on Sep. 2, 2008 by inventors, Igor Keller et al., entitled CONCURRENT NOISE AND DELAY MODELING FOR STATIC TIMING ANALYSIS OF INTEGRATED CIRCUIT DESIGNS; now issued as U.S. Pat. No. 8,543,954 on Sep. 24, 2013.

FIELD

The embodiments of the invention relate generally to integrated circuit design software tools, such as static timing analysis software tools and signal integrity analysis software tools for designing integrated circuits.

BACKGROUND

Electronic computer aided design (ECAD) software tools for static timing analysis (STA) may be used to estimate timing delays in an electronic circuit, such as electronic circuits that are found in integrated circuits. However, process technology has improved so that smaller transistor channels of 65 nano-meters (nm) and 45 nm have become available. With smaller transistor channels, there is an increased need for more accurate timing analysis. Additionally with the smaller geometries there may be a number of unknown effects to electronic signal propagation that may be considered, which may not have been as severe with more relaxed process technology nodes.

BRIEF SUMMARY

The embodiments of the invention are best summarized by the claims that follow below.

Briefly however, crosstalk noise may be analyzed concurrently with timing delays by modeling the noise effects using a current source. This additional current source, along with a voltage dependent current source modeling a switching or static driver of the victim net and reduced-order model for the interconnect, allows for an efficient calculation of noisy transitions and noise glitches on the victim nets. A model of a circuit stage of an integrated circuit may be formed by including a model of victim drivers, aggressor drivers, receivers, and the victim nets and aggressor nets together. Base timing delays may be initially computed for each timing arc from each victim driver to each receiver of a timing graph without regard to noise. The glitch responses of the circuit stage into each receiver in response to the input transitions coupled to the aggressor drivers may then be computed. The input transitions of the aggressor drivers may be aligned with the input transition of the victim drivers as a result of the glitch responses. The aligned glitch responses can then be summed together to determine a combined first order noise effect on a circuit stage.

In accordance with another embodiment of the invention, a flexible noise analysis method is disclosed that to analyze noise and the noise-on-delay effects in a circuit with user selectable methods. The method of analyzing noise and the noise-on-delay effects in a circuit stage may be partitioned into independently controlled components, such as an aggressor driver model, a victim driver model, aggressor filtering/constraining, a virtual aggressor driver, aggressor aligning, and a metric or objective measure of the noise effects on the circuit, each of which may be user selectable. In this manner, the method of concurrent analysis of timing delays and noise effects may be selectable by a user.

BRIEF DESCRIPTIONS OF THE DRAWINGS

FIG. 2A is a schematic diagram of an exemplary stage of a standard cell in a netlist.

FIG. 2B are waveform diagrams to illustrated signals of the schematic diagram of FIG. 2A.

FIG. 5B illustrates an input voltage waveform and an output current waveform generated by the application of a second transform function in accordance with another embodiment of the invention.

FIG. 11 illustrates a table storing values for $T_o$ and $t_o$ which is indexed by slew rate $\sigma$.

FIG. 12 illustrates a table storing values for $F_o(V)$ which is indexed by slew rate $\sigma$ and the normalized time value $v$.

FIG. 13 illustrates a table storing $I_o(V_c,V_o)$ which is indexed by both $V_c$ and $V_o$.

FIG. 14 illustrates a table storing values of $C_g$ which may be looked up given $V_o$.

FIG. 15 illustrates a table of equi-currents at normalized time values for time transformation of an input waveform.

FIG. 27 illustrates a flow chart of model formation and analysis of a circuit stage for concurrent noise and delay analysis of a circuit stage for static timing analysis of an integrated circuit.

FIG. 30 illustrates a waveform timing diagram of aggressor timing windows for aligning aggressor driver glitch responses to meet a selectable objective.

DETAILED DESCRIPTION

In the following detailed description of the embodiments of the invention, numerous specific details are set forth in order to provide a thorough understanding. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

Introduction

Figure 1A:
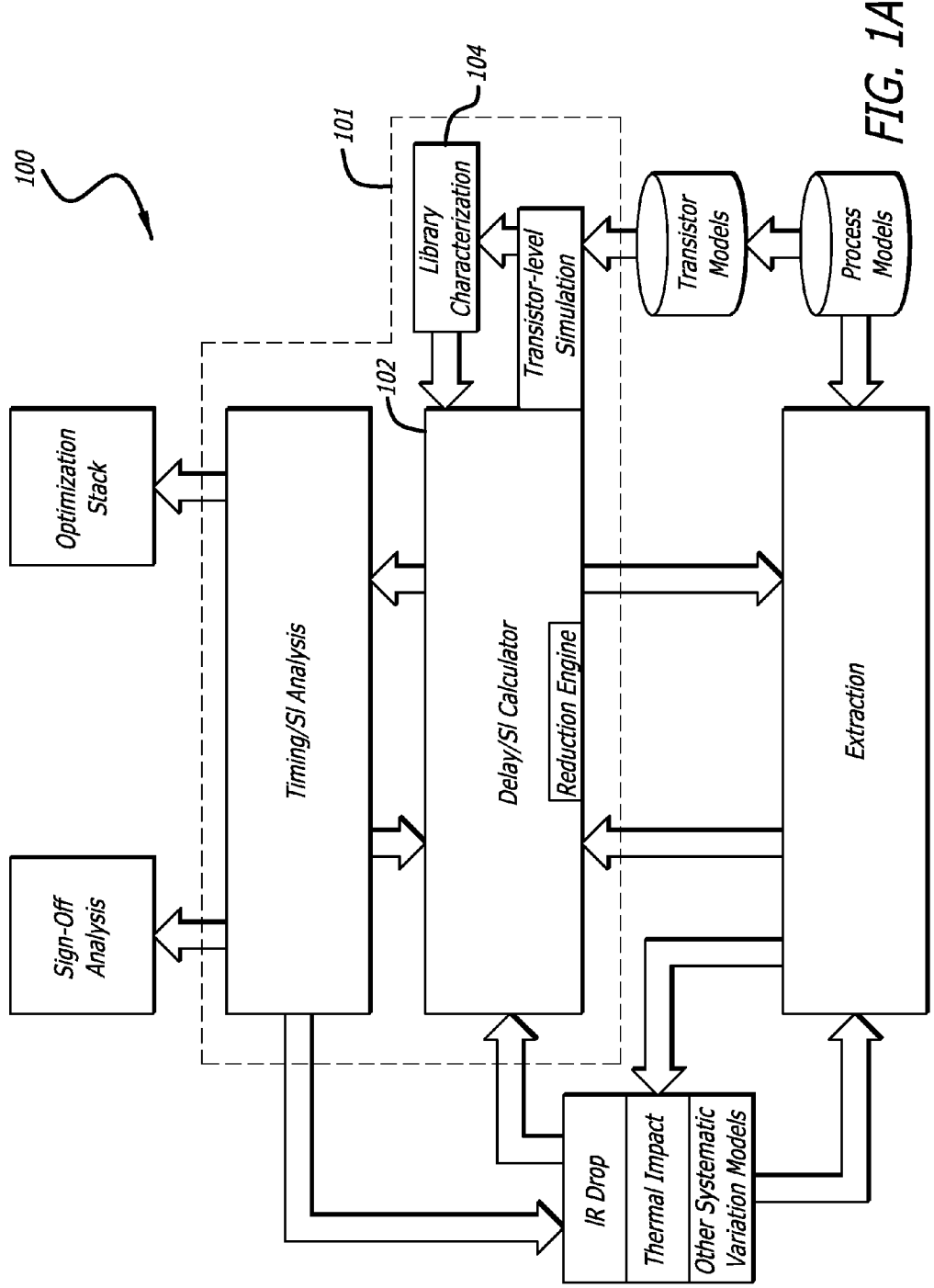
FIG. 1A is a block diagram of an integrated circuit design flow including a statistical static timing analyzer in accordance with an embodiment of the invention.

FIG. 1A illustrates an exemplary integrated circuit design flow 100 employing embodiments of the invention. Digital performance analysis software tools, such as Static Timing Analysis (STA) software tools and Signal Integrity (SI) Analysis software tools 101, are used to estimate the performance of an integrated circuit chip. As shown in FIG. 1A, these software tools may internally employ different levels of abstraction, a graph level abstraction, a net level abstraction, and a shape level abstraction.

At the graph level of abstraction, the highest level, the software tool works with the entire circuit design as a design graph. The graph level abstraction propagates quantities or metrics of interest from the inputs of the circuit design to the outputs of the circuit design. For example, an STA tool may propagate arrival times throughout the circuit design.

At the net level of abstraction, the STA software tool calculates quantities of interest for each of the nets in the design. While doing an SI analysis, an SI analysis software tool may calculate the crosstalk glitch induced on a specific net.

At the shape level of abstraction, the software tools work with information from the actual chip layout. The information may include device sizes and interconnect parasitics, for example, such as can be obtained from a parasitic extractor.

In some embodiments of the invention, an electrical calculation engine component or delay calculator 102 is provided for the net level abstraction layer of electrical analysis software tools.

Figure 1B:
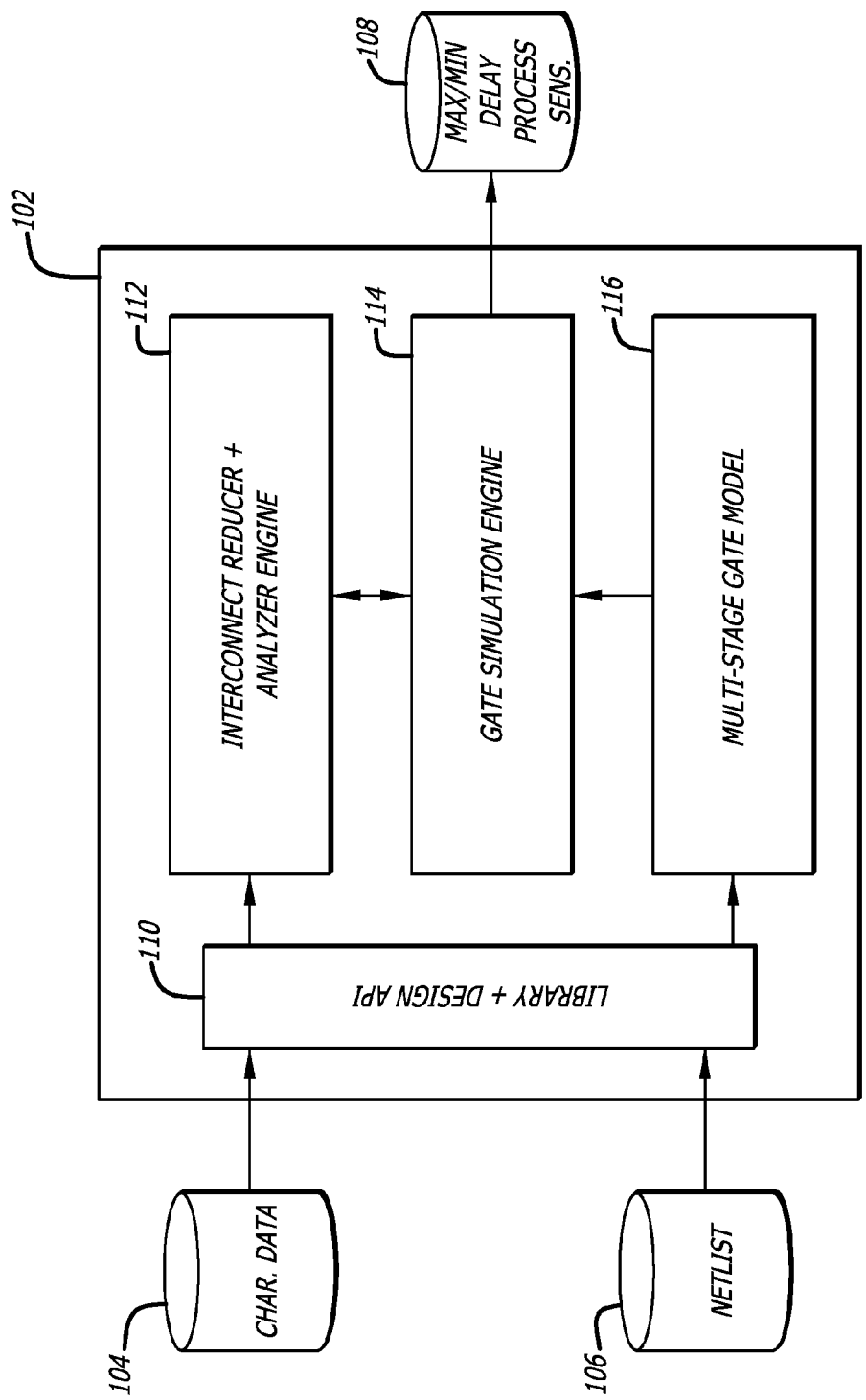
FIG. 1B is a block diagram of a multi-CCC gate delay calculator in accordance with one embodiment of the invention.

Referring now to FIG. 1B, a block diagram of a multi-CCC gate delay calculator (EOS) 102 is illustrated. The multi-CCC gate delay calculator (EOS) 102 may also be referred to herein as an electrical calculator. The delay calculator 102 receives characterization data 104 and a netlist 106 to generate timing delays 108 (e.g., max timing delay, min timing delay) including process sensitivities. The characterization data 104 may be part of a cell library of logic cells.

The delay calculator 102 includes an application programming interface (API) 110, an interconnect reducer & analysis engine 112, a gate simulation engine 114, and a multi-CCC current source model 116 coupled together as shown.

The interconnect reducer & analysis engine 112 receives the netlist 106 including a defined interconnect of standard cells to reduce it down to a simplified model for use with the gate simulation engine 114. The interconnect reduction and analysis engine 112 reduces the extracted parasitic network down to a simplified load model. Typically, the extracted parasitic network corresponding to an output net can be very large. Since only the inputs and outputs of the net need to be monitored, the interconnect network may be reduced to create a smaller, electrically equivalent representation speeding up delay calculations while preserving the input-to-output electrical behavior of the net.

The multi-CCC current source model 116, described in further detail below, receives the characterization data 104 and models single-CCC and multi-CCC standard cells in response to the type of standard cell in the netlist that is being analyzed in a given stage of a delay path. The multi-CCC current source model 116 describes the electrical behavior of a standard cell in an abstract fashion in order to speed electrical calculations, such as delay calculations and noise delay calculations, and sensitivity calculations. The parameters of the gate model are usually derived by a library characterization process, such as described below.

The gate simulation engine 114 calculates the output waveform at the output of a given gate in response to the input stimulus as well as the multi-CCC current source model 116 and its parameters. A simplified load model may be used to model the effect of the interconnect loading on the gate. A noise model may also be used to model noise from aggressors in the standard cell.

The parameters for each standard cell to fashion its corresponding gate model are typically stored in a standard cell library. The IC netlist design data is stored in some form in the host tool. One or more application programming interfaces (API) 110 interact with the library and the design data to read information there-from. Another one or more APIs 110 may be used by graph level engines, operating at the graph level on the netlist to determine delays along data paths for example, to call the delay calculator 110 and obtain the timing results of the calculations at each gate along a graphed path.

A current source model for a multi-CCC structure described below may be used for both delay and SI calculations. Thus, a single characterization process may yield a gate model for both delay and SI calculations.

Figure 1C:
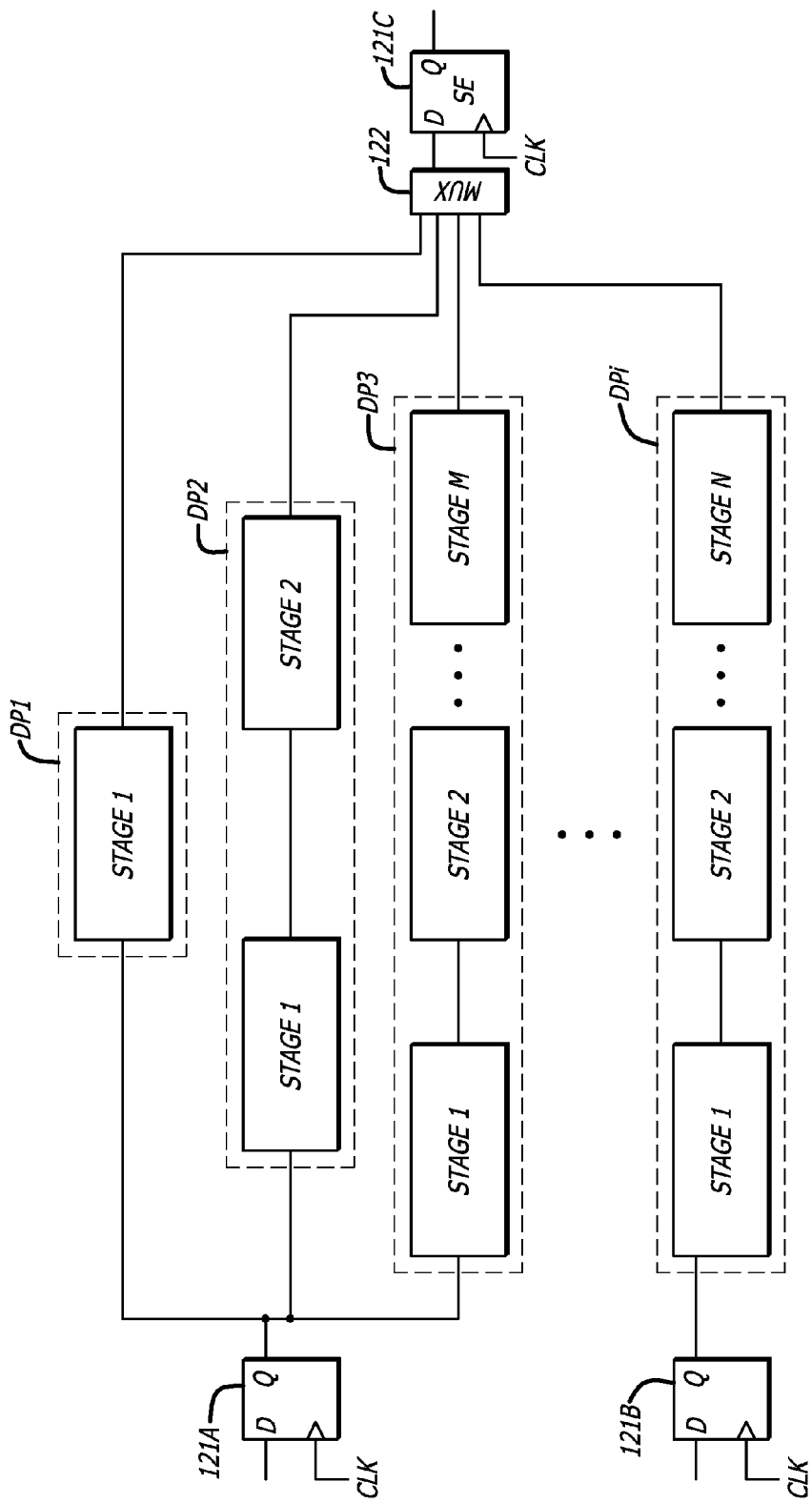
FIG. 1C is a block diagram of a portion of an exemplary netlist with stages of standard cells along delay paths between flip flops.

FIG. 1C illustrates a block diagram of a portion of an exemplary netlist including a plurality of delay paths DP1-DPi from D flip-flops/latches/registers 121A-121B multiplexed into a D flip-flop/latch/register 121C by a multiplexer 122. The delay calculator 102 may be used to compute the timing delays through the delay paths between the D flip-flops/latches/registers 121A-121B and the D flip-flop/latch/register 121C.

The delay paths DP1-DPi may have various stages of single-CCC and multi-CCC standard cells. A first delay path DP1 includes a single stage Stage1. A second delay path DP2 includes two stages, Stage1 and Stage2. A third delay path DP3 includes M stages, Stage1 through StageM. An $i^{th}$ delay path Dpi includes N stages, Stage1 through StageN.

Figure 1D:
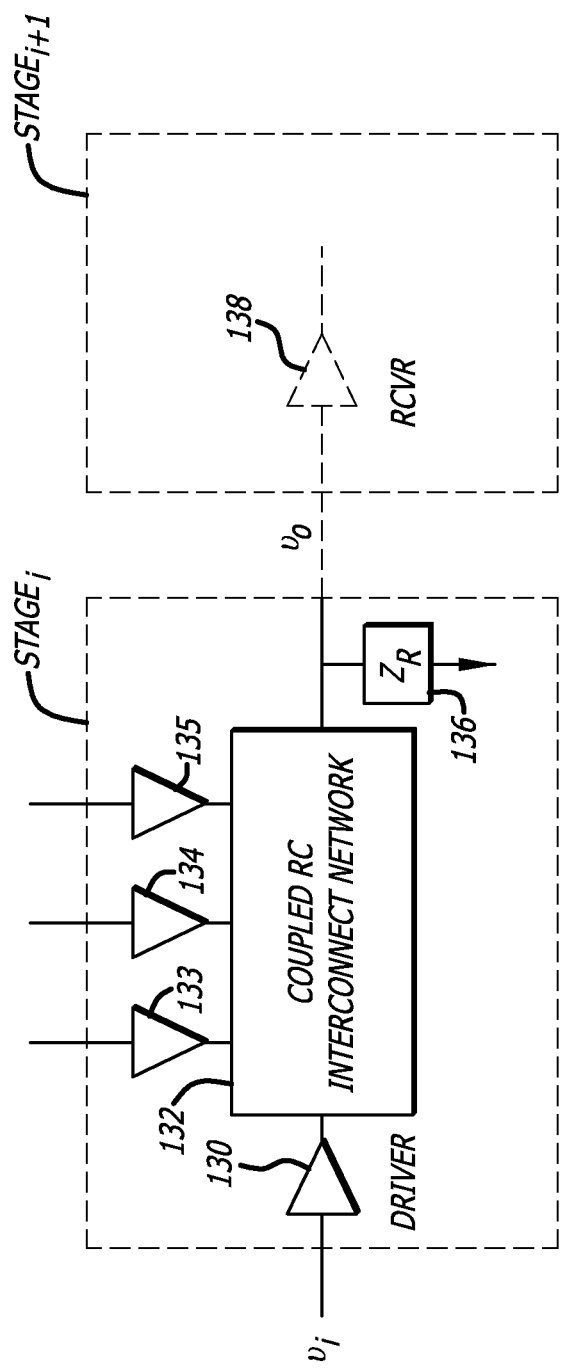
FIG. 1D illustrates an exemplary pair of stages of standard cells coupled together.

FIG. 1D illustrates an exemplary pair of stages of standard cells, Stage(i) and Stage(i+1). The stage(i) may be modeled by a driver 130 driving a coupled RC interconnect network 132 and an load impedance Zr 136. One or more neighbor nets 133-135 may induce noise through the coupled RC interconnect network 132. A voltage source Vi representing a rising or falling transition is connected at the input of driver 130. In response to the input voltage Vi, the coupled RC interconnect network 132, and the load impedance Zr 136; the driver 130 generates an output voltage Vo at the one or more outputs of the stage(i). However, the description herein describes a model with a single output that may be readily duplicated for a standard cell with a plurality of outputs.

Referring now to FIG. 2A, a schematic diagram of an exemplary standard cell in a netlist is illustrated. This is the view seen by the electrical delay calculator working at a gate or net level abstraction layer. The standard cell includes a driver 130, the RC interconnect network 132 connected to the output of the driver consisting of one or more resistors 210-211 and one or more capacitors 221-224, the extracted parasitics 136 associated with the output net Vo 201 (see FIG. 1D) coupled together as shown. One or more receivers 138 are coupled to the output net Vo 201 and may add to the extracted parasitics 136. An aggressor driver 233 may generate an aggressor signal 250 coupled into the interconnect network 132. An aggressor receiver 238 may also influence the generation of the aggressor signal 250, adding additional parasitic load to the network 132.

FIG. 2B illustrates waveform diagrams 200, 250, and 201A-201B respectively of the Vin signal 200, the aggressor signal 250, and the victim or Vo output signal 201. The objective of the electrical delay calculator 102 is to calculate the waveforms at the output net Vo which is input to each of the receivers 138 of the net, and return quantities of interest about the waveform to the graph level abstraction layer. In this case, the delay calculator 102 applies the input signal Vin 200 as a stimulus when simulating the responses at the receiver inputs. For static timing analysis (STA), the quantity of interest is the timing delay from the input Vin 200 into the driving gate 130 and the output net Vo 201 that is coupled to the input of the receiver 138 in the next stage. For noise or signal integrity analysis, the quantity of interest may be the amount of crosstalk delay generated on the output net Vo 201 by the aggressor driver 233.

Without any aggressor driver 233 or when node 250 is quiet, the delay calculator 102 may generate a relatively smooth output waveform 201A on the Vo output signal 201 that has a timing delay TD0 not affected by coupling noise (or crosstalk). When aggressor driver 233 and node 250 are switching, the delay calculator 102 may generate a noisy output waveform 201B on the Vo output signal 201 that has a timing delay TDN which is affected by coupling noise that may be greater than the timing delay TD0 without coupling noise. That is, the switching of the aggressor driver 233 may cause additional delay in the signal generated by the stage on the output net Vo 201.

Models and Characterization

The multi-CCC current source model used in the delay calculator, may also be referred to herein as a ViVo II model. The multi-CCC current source model is capable of accurately supporting standard cells with both single-channel connected components (single-CCC) and multi-channel connected components (multi-CCC). Channel-connected components (CCCs) are found within standard circuit cells (or simply standard cells) of a standard cell library.

A single channel connected component (single-CCC) includes transistors connected to each other by their drain and/or source terminals between paths from the positive power supply VDD to the negative power supply VSS or ground. The boundary of a CCC is at a gate terminal or an input or output terminal of the standard cell.

Standard cells with multi-channel connected components (multi-CCCs) include a plurality of single-CCCs coupled in series together at gate terminals between inputs and outputs of the standard cell.

Figure 3B:
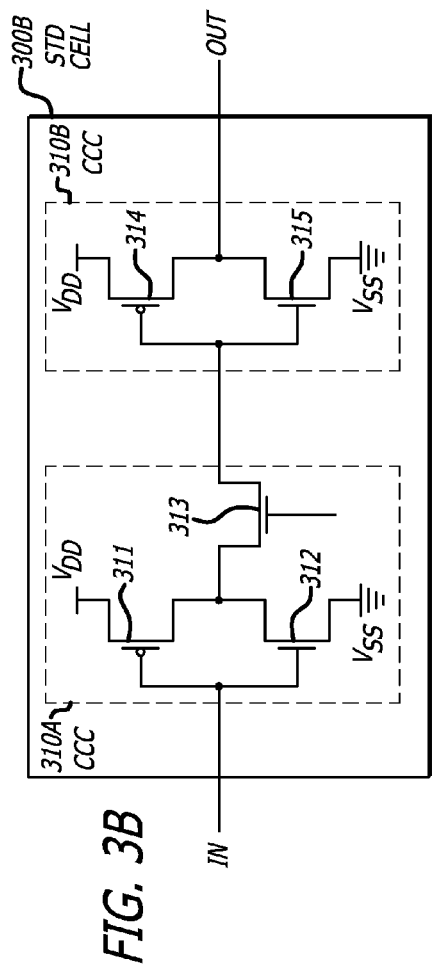
FIGS. 3A-3C are schematic diagrams of exemplary single-CCC standard cells and multi-CCC standard cells.
Figure 3C:
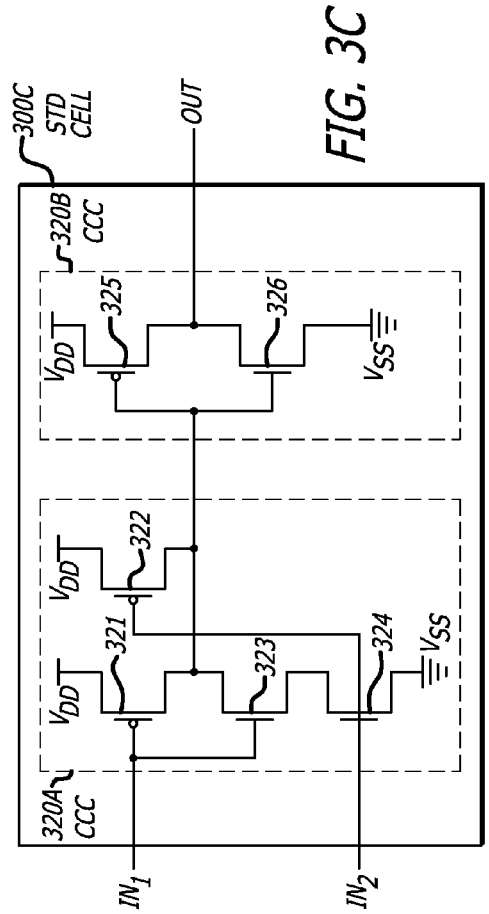
Figure 3A:
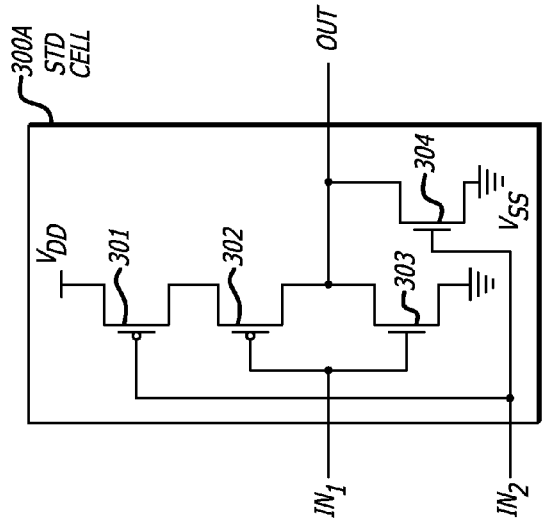

FIG. 3A illustrates an exemplary single-CCC standard cell 300A. The standard cell 300A is a NOR logic gate with sources/drains of transistors 301-304 coupled together between the positive power supply VDD and the negative power supply VSS. Standard cells for an inverter and NAND gate are also single-CCC standard cells. There are no other CCCs between the inputs IN1,IN2 and the output OUT.

FIG. 3B illustrates an exemplary multi-CCC standard cell 300B. The multi-CCC standard cell 300B includes a first single-CCC 310A and a second single-CCC 310B coupled in series together between the input IN and the output OUT of the standard cell 300B. The single-CCC 310A includes transistors 311-313. The sources/drains of transistors 311-313 are coupled together between the positive power supply VDD and the negative power supply VSS. A source or drain of transistor 313 couples to the gate terminals of transistors 314 and 315 at the boundaries of the first and second single-CCCs 310A-310B. The single-CCC 310B includes transistors 314-315. The sources/drains of transistors 314-315 are coupled together between the positive power supply VDD and the negative power supply VSS.

FIG. 3C illustrates another exemplary multi-CCC standard cell 300C. The multi-CCC standard cell 300C is an AND gate and includes a first single-CCC (NAND gate) 320A and a second single-CCC (inverter) 320B coupled in series together between the inputs IN1,IN2 and the output OUT of the standard cell 300C. The single-CCC 320A includes transistors 321-324. The sources/drains of transistors 321-324 are coupled together between the positive power supply VDD and the negative power supply VSS. The single-CCC 320B includes transistors 325-326. The sources/drains of transistors 325-326 are coupled together between the positive power supply VDD and the negative power supply VSS. Other exemplary multi-CC standard cells include a non-inverting buffer formed by a pair of inverters coupled in series together, an OR gate formed by a NOR gate coupled in series to an inverter, an exclusive-NOR (XNOR) gate formed by a pair of parallel NOR gates coupled in series to an additional NOR gate, and an exclusive-OR (XOR) gate formed by a pair of parallel NAND gates coupled in series to an additional NAND gate.

The ViVo II multi-CCC current source model (i) treats standard cells (with either single-CCCs or multi-CCS) as black boxes during characterization; (ii) compacts the model, which is independent of output load and much less dependent on the number of input slews to use during characterization; and (iii) encapsulates internal waveform distortion and internal delay in multi-CCC standard cells efficiently.

Figure 4A:
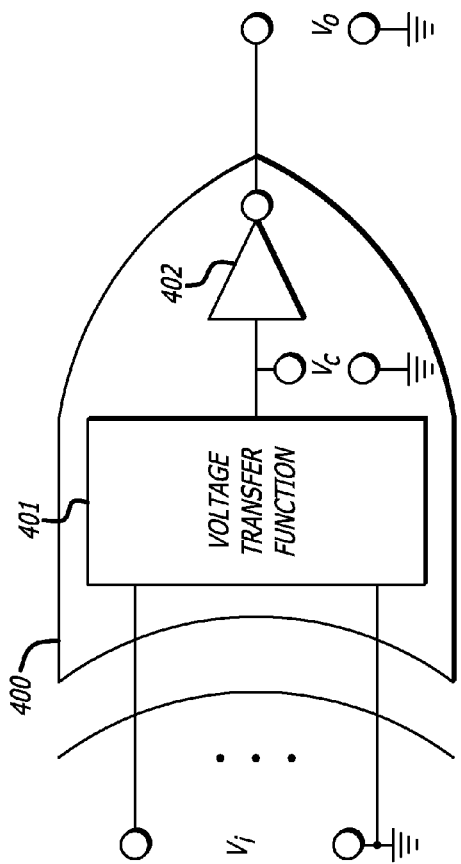
FIG. 4A illustrates an abstracted view of a multistage standard cell, such as an XOR gate.

FIG. 4A illustrates an abstracted view of a multi-CCC standard cell, such as an XOR gate 400. The exemplary XOR gate 400 may be modeled by a voltage transform function 401 to transform the input voltage $V_i(t)$ into an intermediate voltage $V_c(t)$; and a last stage or driver stage 402 to generate an output voltage Vo(t) and an output current Io(t) in response to the intermediate voltage $V_c(t)$. The voltage transform function 401 may also be referred to herein as a delay transfer function may represent one or more internal stages of a multi-CCC standard cell.

The goal of ViVo II multi-CCC current source model is to characterize the gate's driving capability and to provide a simple abstraction which captures the output current waveform in the presence of multiple internal stages. The current through a single CCC can be described accurately based on a two dimensional DC current function F(Vi(t),Vo(t)). For a multi-CCC cell the current Io(t) waveform at the output of the standard cell 400 is dictated by the instantaneous input voltage at the last CCC 402, which we denote as $V_c(t)$. Thus, the current through a multi-CCC standard cell is a function of the instantaneous input voltage at the last CCC 402 which can be denoted by I=F($V_c(t)$,Vo(t)). In order to find $V_c(t)$ from Vi(t), a waveform transfer function 401 can be used to map the input voltage transition to an intermediate voltage transition.

A multi-CCC current source model therefore may consist of two major components: (i) the dc current function modeling drawn current as a function of instantaneous input and output voltages and their time derivatives of the last CCC of the cell, and (ii) a waveform transfer function defining the waveform at the input of the last CCC as a function of the waveform at the cell's input.

A one straightforward way to construct these two parts is to perform a series of spice simulations where the node which is the input of the cell's lass CCC is directly probed or stimulated, respectively. However, while this approach is feasible, an understanding of the internal topology of the cell's circuit and a partition of the circuit into one or more CCCs must be performed. Instead, the embodiments of the invention treat a standard cell as a black box without having to understand the internal topology of a circuit and partition it into CCCs. Thus, the construction of the two components of the model is done through fitting the results of a series of spice simulations where excitation and probing points are only the standard cell's interface (e.g., input/output) pins.

Vivo II Multi-CCC Current Source Model

Figure 4B:
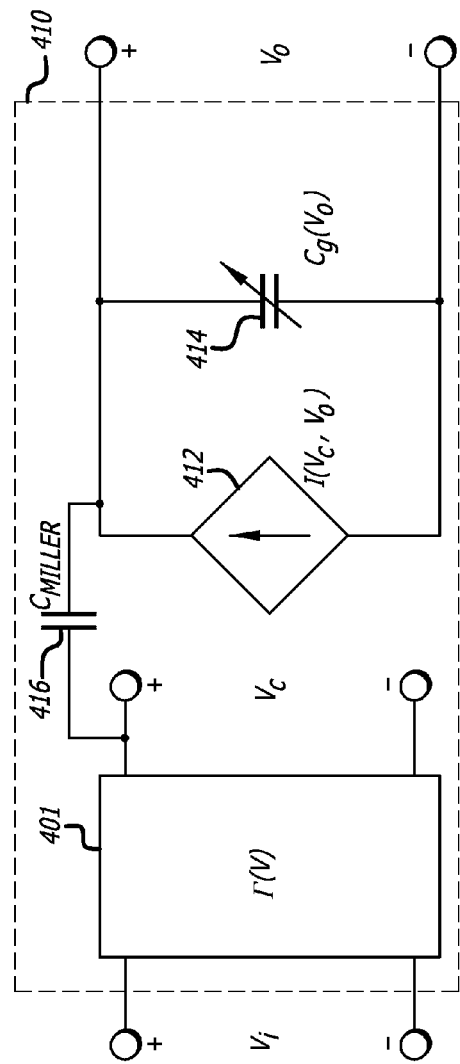
FIG. 4B illustrates a multi-CCC current source model in accordance with one embodiment of the invention.

FIG. 4B illustrates the ViVo II multi-CCC current source model 410. The multi-CCC current source model 410 includes two parts as explained in the previous section.

The first part is an internal waveform transformation function 401 which transforms the input voltage $V_i(t)$ into the intermediate voltage $V_c(t)$ by Equation 1 as follows:

$$V_c(t) = \Gamma(V_i(t)) \tag{1}$$

Note that the intermediate voltage Vc(t) models a delay and distortion of the input signal transition as it propagates through a standard cell's circuit up until the input to the last CCC. Fitting techniques may be used to map the input signal to the intermediate voltage signal $V_c(t)$.

The second part is a voltage dependent current source which characterizes the driving CCC 402. It consists of a voltage dependent current source I=F($V_c,V_o$) 412, which gives the driving current for any $V_c$ and $V_o$ value and their derivatives:

$$F(V_c,V_o)=F_{dc}(V_c,V_o)+C_M(V_c,V_o)d/dt(V_c-V_o)-C_g(V_c,V_o)d/dtV_o \tag{2}$$

In Equation 2, $F_{dc}$ is a DC component of the current source defining the current value based on the values $V_c$ and $V_o$. The second and third terms in Equation 2 model the dynamic current due to Miller effect from input to the output of the last CCC of the cell and output pin capacitance of the cell. The coefficients of the two latter terms are nonlinear Miller and output pin capacitances which in general depend upon voltages Vc, Vo. However, since the contribution of the last dynamic term in Eq. (2) is usually small, characterizing the $C_g$ for the initial input voltage Vi(t=0) suffices to provide sufficiently accurate results.

Figure 5A:
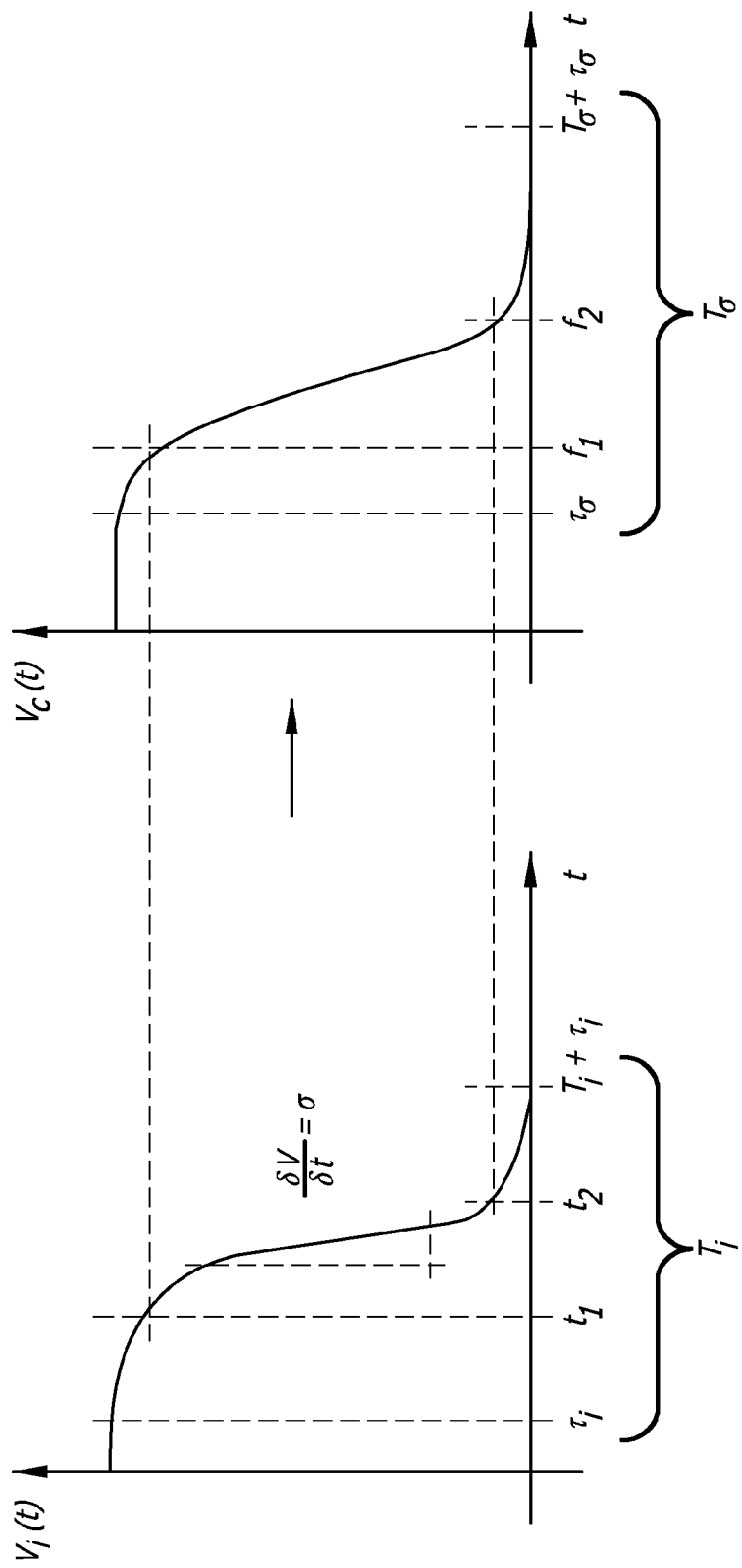
FIG. 5A illustrates an input voltage waveform and an intermediate voltage waveform generated by the application of voltage transform function in accordance with one embodiment of the invention.

FIG. 5 illustrates the application of Γ(V(t)) which converts an input voltage waveform $V_i(t)$ of slew σ into an intermediate voltage waveform $V_c(t)$ in accordance with one embodiment of the invention. In one embodiment of the invention, the transformation function Γ which is used to generate the intermediate voltage Vc(t) in voltage transformation equation (Eq. 1) is as follows:

$$V_c(t) = \Gamma(V_i(t)) = V_i\left(\frac{T_i}{F_\sigma\left(\frac{t-\tau\sigma}{T_\sigma}\right)} + \tau_i\right) \tag{3}$$

In Equation 3, $F_o(v)$ is a normalized time transfer function (time versus time) with time normalization being defined by $$v = \frac{t - \tau_\sigma}{T_\sigma}.$$

As show by the input voltage $V_i(t)$ versus time chart of FIG. 5, $\tau_i$ and $T_i$ are respectively the starting time and the duration of the input voltage $V_i(t)$ transition from high to low. Alternatively, $\tau_i$ and $T_i$ may be the starting time and the duration of the input voltage $V_i(t)$ transition from low to high, respectively.

As shown by the intermediate voltage $V_c(t)$ versus time chart of FIG. 5, $\tau_\sigma$ is the starting time of the transition in the intermediate voltage $V_c(t)$ and $T_\sigma$ is the transition period of the intermediate voltage $V_c(t)$.

The function $F_o(v)$ captures the non-linear waveform shape change from $V_i(t)$ to $V_c(t)$. $F_o(v)$, $T_\sigma$ and $\tau_\sigma$ are all functions of the slew rate $\sigma$ (change in voltage over time) of the input voltage $V_i(t)$ and are stored in tables indexed by $\sigma$. FIG. 11 illustrates an exemplary table of values for $T_\sigma$ and $\tau_\sigma$ as a function of a reference slew rate $\sigma_{ref}$, a fast slew rate $\sigma_{fast}$, and a slow slew rate $\sigma_{slow}$ of the input voltage $V_i(t)$. FIG. 12 illustrates an exemplary table of values for $F_o(v)$ as a function of a reference slew rate $\sigma_{ref}$, a fast slew rate $\sigma_{fast}$, and a slow slew rate $\sigma_{slow}$ over the normalized time $v$ which varies from 0 to 1.

In its application, the multi-CCC current source model captures the slew rate $\sigma$ from the voltage input waveform $V_i(t)$, which is then used to look up the corresponding values for $T_\sigma$, $\tau_\sigma$ and $F_o(V)$ from look up tables, such as the tables illustrated in FIG. 11 and FIG. 12, respectively. The model then applies the voltage transformation equation (Eq. 3) to map the voltage points on $V_i(t)$ to $V_c(t)$ to convert an input waveform $V_i(t)$ of slew rate $\sigma$ to the intermediate voltage waveform $V_c(t)$ in one embodiment of the invention. In another embodiment of the invention, a lookup table is used to convert the waveform $V_i(t)$ of slew rate $\sigma$ to the intermediate voltage waveform $V_c(t)$.

With the intermediate voltage waveform $V_c(t)$, the output current waveform may be computed by using the intermediate voltage waveform $V_c(t)$ as the dependent input of the current source model $I_o(V_c,V_o)$. The model may use a table to store $I_o(V_c,V_o)$, such as illustrated by FIG. 13, which is indexed by both $V_c$ and $V_o$. To compute output current at time $t_n$ given a particular $V_c$ and $V_o$ at time $t_{n-1}$, the model may first find the nearest voltages in the table and then perform a two-dimensional interpolation to approximate the actual output current at $V_c$ and $V_o$. The model may also look up $C_g$ given $V_o$ from another table, such as illustrated in FIG. 14. With the values of $I_o$ and $C_g$ computed at time $t_n$, we can compute the value of $V_o$ and move on to the next time point $t_{n+1}$, at which we look up $I_o$ and $C_g$ again using $V_c$ and $V_o$ at time $t_n$. This process repeats until the whole output waveform is computed.

Vivo II Model Characterization

The ViVo II multi-CCC model for gates is characterized from a blackbox view of a standard circuit cell. To characterize a ViVo II multi-CCC model, the voltage and current waveforms at inputs and outputs of the standard cell are observed. Characterization starts at block 1600 and jumps to block 1602.

At block 1602, the output current $I_0$ is characterized for the driving stage of the multi-CCC current source model. The flow chart of FIG. 17 illustrates the characterization of the output current of the multi-CCC standard cell in greater detail.

Figure 17:
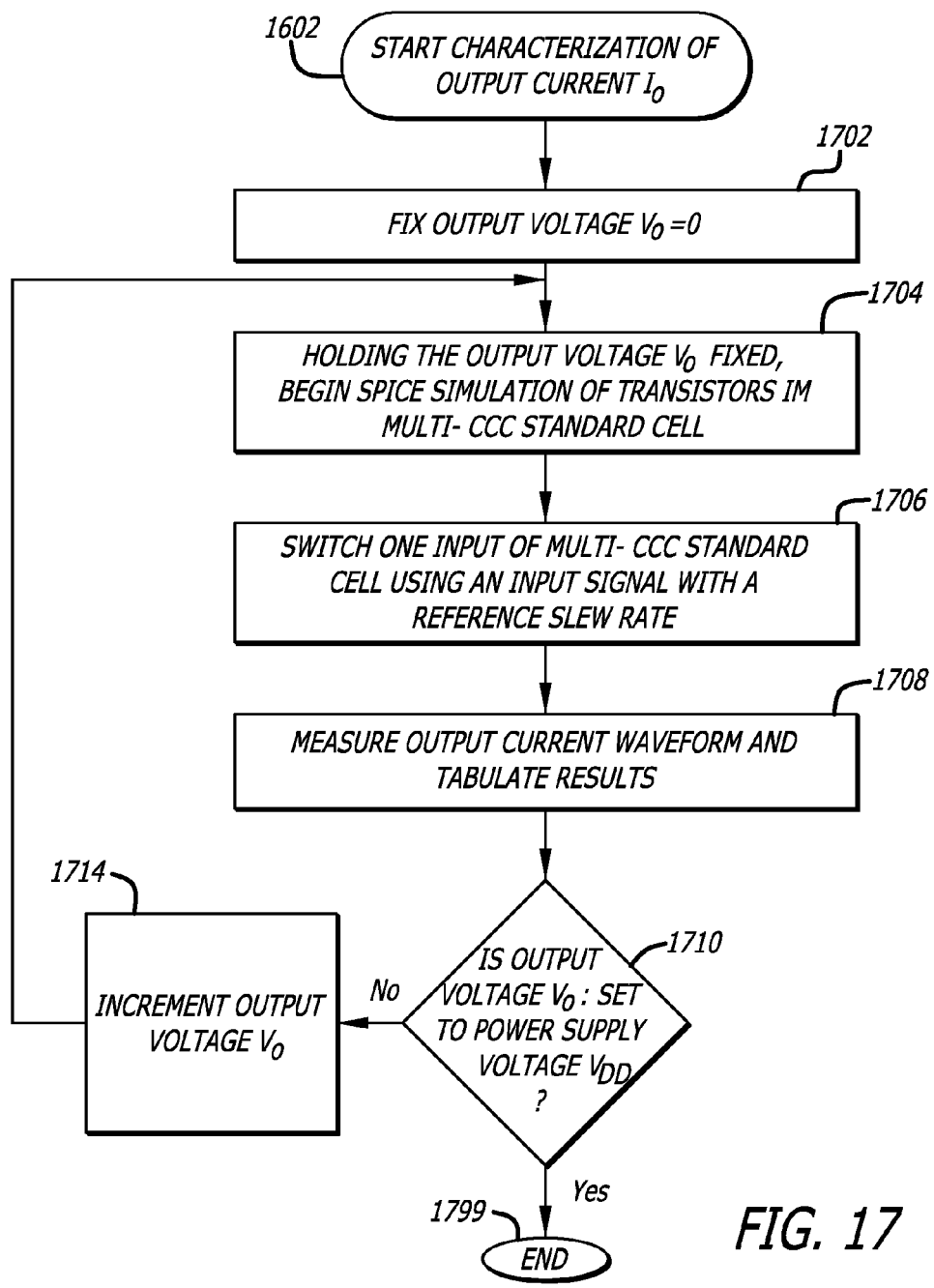
FIG. 17 is a flow chart to illustrate the characterization of the output current of the multi-CCC standard cell.

Referring now to FIG. 17, at block 1702, the output voltage $V_o$ is fixed to a known voltage, such as zero volts.

To characterize the driving stage $I_o(V_c,V_o)$, transient simulations with a SPICE transistor circuit simulator, such as Spectre software by Cadence Design Systems, Inc. are used to switch the input to the standard cell with its output voltage $V_o$ being fixed.

At block 1704, while holding the output voltage $V_o$ fixed, a spice transistor simulation is run on the multi-CCC standard cell.

At block 1706, one input of the multi-CCC standard cell is switched using an input signal with an initial reference slew rate.

At block 1708, the output current waveform is measured and the results are tabulated such as in FIG. 13.

At block 1710, a determination is made as to whether or not the output voltage was set to the power supply voltage Vdd. If so, the process ends at block 1799. If not, the process goes to block 1714.

At block 1714, the output voltage is incremented to a new value and the process returns to block 1704, to determine the output current for the new fixed value of output voltage Vo.

In the case of standard cells with only one CCC, performing a DC-analysis by sweeping $V_i$ and $V_o$ is sufficient to find $I_o(V_c,V_o)$. However for a multi-CCC standard cell, $I_o(V_c,V_o)$ a DC-analysis may not be used since the input voltage $V_i$ does not equal the intermediate voltage Vc.

Figure 6B:
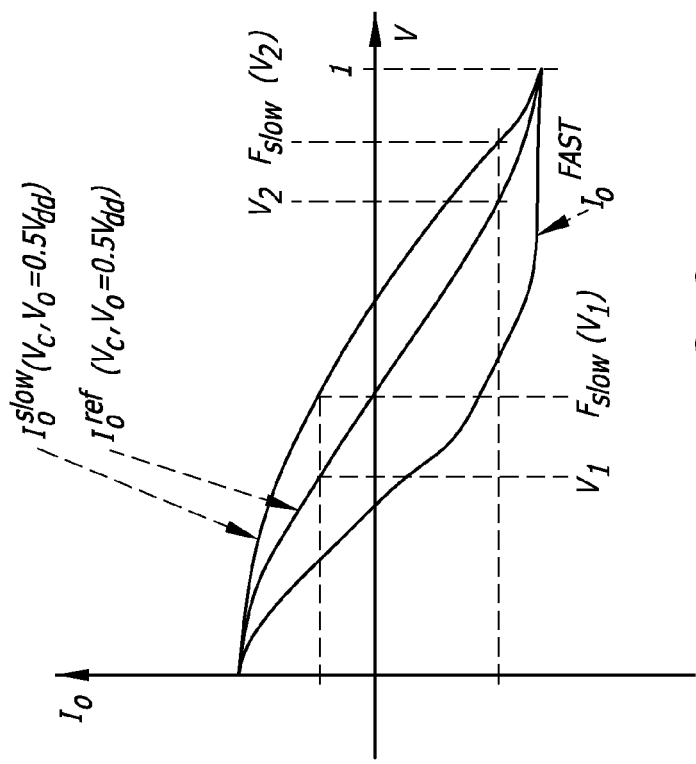
FIG. 6B illustrates normalized current curves from which parameters to characterize the voltage transform may be extracted.
Figure 6A:
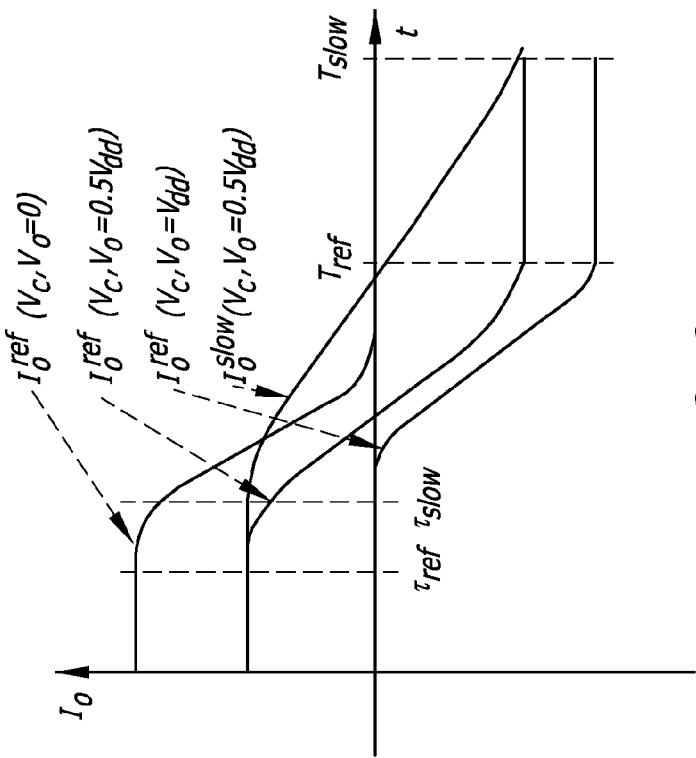
FIG. 6A illustrate output reference current waveforms generated by applying an input ramp voltage with a reference slew rate with different settings of fixed output voltage.

FIG. 6A shows three output current waveforms $I_o^{ref}$ which are obtained by applying an input ramp voltage $V_i(t)$ with a reference slew rate $\sigma_{ref}$ with different settings of fixed output voltage $V_o$. These curves are stored in the current table $I_o(V_c,V_o)$ of FIG. 13 for current look-up. FIG. 6A further shows an output current waveform $I_o^{slow}$ which is obtained by applying the input ramp voltage $V_i(t)$ with a slow slew rate $\sigma_{slow}$.

Figure 18:
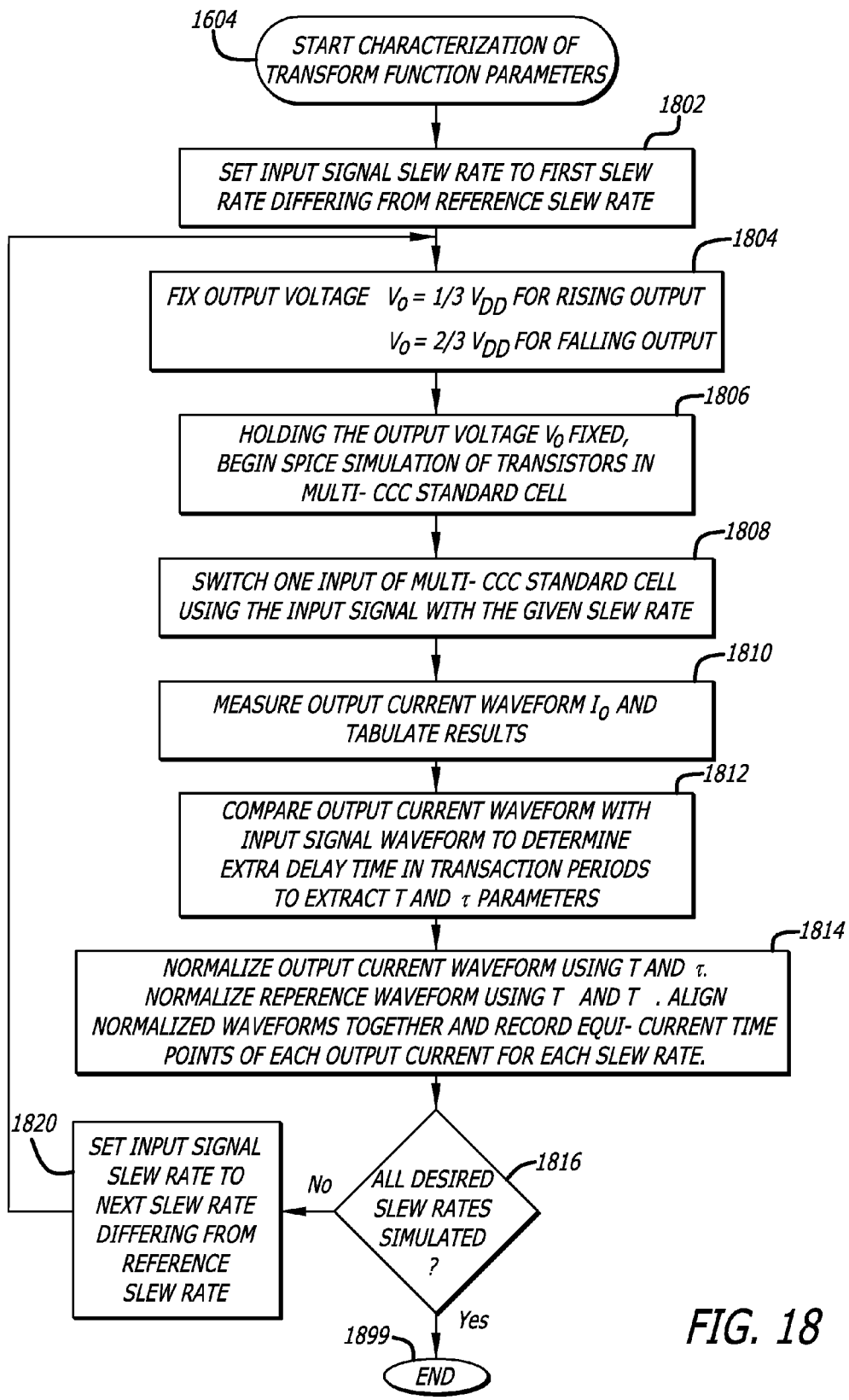
FIG. 18 is a flow chart to illustrate characterization of the voltage transform function of the multi-CCC standard cell.

At block 1604, the voltage transform function $\Gamma(V(t))$ of the multi-CCC standard cell is characterized. The flow chart of FIG. 18 illustrates the characterization of the voltage transform function $\Gamma(V(t))$ of the multi-CCC standard cell in greater detail. Characterizing the functional $\Gamma$ in Equation 1 requires extra simulations using different input slews than a reference slew rate $\sigma_{ref}$.

At block 1802 of FIG. 18, the input signal slew rate is set to a first slew rate that is different form the reference slew rate. For example, the input slew rate may be changed to a slow slew rate $\sigma_{slow}$.

At block 1804, the output voltage $V_o$ of the multi-CCC current source model is fixed to ⅓ of Vdd for a rising output and ⅔ of Vdd for a falling output.

At block 1806, with the output voltage fixed, SPICE transistor circuit simulations are run with the multi-CCC current source model.

At block 1808, one input of the multi-CCC standard cell is switched using the input signal with the differing slew rate than the reference slew rate.

At block 1810, the output current $I_o^{slow}$ is measured and results may be tabulated. FIG. 6A illustrates an $I_o^{slow}(V_c, V_o=x \cdot V_{dd})$ waveform which is obtained by changing input slew rate to $\sigma_{slow}$, where x is a fraction of ⅓ for rising output and ⅔ for falling output.

At block 1812, the output current waveform is compared with the input signal waveform to determine the extra delay time in the transition periods to extract $\tau_{slow}$ and $T_{slow}$ parameters, for example.

From $I_o^{slow}(V_c, V_o = x \cdot V_{dd})$ waveform curve we observe that the output current waveform incurs an extra delay of $\tau_{slow} - \tau_{ref}$ and its transition period stretches from $T_{ref}$ to $T_{slow}$ compared to the original reference current waveform $I_o^{ref}(V_c, V_o = x \cdot V_{dd})$. $T_{slow}$ and $\tau_{slow}$ are stored, in the table of FIG. 11 for example, for the input slew $\sigma_{slow}$ as part of the parameter for characterizing the functional Γ. Moreover, we can capture the non-linear shape difference between $I_o^{ref}(V_c, V_o = x \cdot V_{dd})$ and $I_o^{slow}(V_c, V_o = x \cdot V_{dd})$ by normalizing the time-axis $$v = \frac{t - \tau_\sigma}{T_\sigma},$$

where $\sigma = \sigma_{ref}$ and $\sigma_{slow}$, respectively.

At block 1814, the output $I_o^{slow}(V_c, V_o = x \cdot V_{dd})$ waveform curve is normalized using $\tau_{slow}$ and $T_{slow}$ parameters. The reference waveform curve $I_o^{ref}(V_c, V_o = x \cdot V_{dd})$ is normalized using its $\tau_{REF}$ and $T_{REF}$ parameters. The normalized output waveform curve and the normalized reference curve are aligned together and equal-current time points are recorded for each output current for their respective slew rates, such as illustrated by FIG. 15. The equi-current normalized time information further simplifies the computations and reduces the amount of information that need be stored to model a multi-CCC standard cell. The equi-current normalized time information is used to further transform the output waveform, be it an output current waveform $I_o$ or an output voltage waveform $V_o$.

Referring now back to FIG. 18 at block 1816, a determination is made if all desired slew rates differing from the reference slew rated have been simulated. If so, the process goes to block 99 and ends. If not, the process goes to block 1820.

At block 1820, the input signal slew rate is set to the next slew rate differing from the reference slew rate. The process then returns to block 1804 where the characterization process is repeated.

FIG. 6B illustrates normalized current curves from which parameters to characterize $F_o(v)$ may be extracted. This process may be repeated for a fast input slew $\sigma_{fast}$ to more accurately characterize Γ.

The current table of FIG. 13 is characterized for at least one input voltage slew rate, a reference slew rate $\sigma_0$ or $\sigma_{ref}$. In another embodiment of the invention, it is characterized for two slew rates, a fast slew rate $\sigma_1$ or $\sigma_{fast}$, and a slow slew rate $\sigma_2$ or $\sigma_{slow}$. In another embodiment of the invention, it is characterized for at least three slew rates, the reference slew rate $\sigma_0$ or $\sigma_{ref}$, the fast slew rate $\sigma_1$ or $\sigma_{fast}$, and the slow slew rate $\sigma_2$ or $\sigma_{slow}$. The more characterization data, the better the interpolation accuracy with respect to input slew.

To adapt the characterized output currents to input voltage signals with different slew rates, the values in the current table are adjusted. With a multi-CCC standard cell, there are first and second order adjustments to be made. With a single-CCC standard cell, a first order adjustment for a different slew rate may only be made.

Referring now to FIG. 5B, a first-order-only-transformation (applying Γ to the first order) of the voltage input waveform Vi into an output current waveform Io is illustrated. A reference voltage input waveform 510 was previously used to generate the tabulated output current waveform 515. A voltage input waveform 512 with a new slew rate (indicated by the slope) and a delayed start (indicated by the offset from time zero) is coupled into the single-CCC standard cell. The new voltage input waveform 512 results in a new output current waveform 517. The output current waveform 518 is the result of a SPICE transistor circuit simulation for comparison with the output current waveform 517 of the multi-CCC model.

A first order output adjustment to the output current waveform is due to the change input slew rate illustrated by the slope of waveform 511 and the delayed start of the input illustrated by the time offset between waveforms 511 and 512. The change in slope of the input waveform (illustrated by the difference between waveforms 511 and 510) results in a change in slope in the output waveform as illustrated by the difference between output waveforms 515 and 516. The delayed start in the input waveform (illustrated by the difference between waveforms 512 and 511) results in a delayed start in the output waveform as illustrated by the difference between output waveforms 517 and 516. The change in slope is established by a stretch parameter T. The change in start time is established by a shift parameter τ.

A second order output adjustment to the output current waveform is the result of the extra gate stages in a multi-CCC standard cell. The new voltage input waveform is coupled into a different gate than that of the last driving stage of a multi-CCC standard cell. The second order adjustment to the output current waveform is illustrated by the difference between output waveforms 518 and 517. The second order output adjustment is modeled by a time transformation function Γ that is responsive to the new input slew rate. If the standard cell is a simple single-CCC standard cell, the time transformation function is u=v, where v is the normalized time with respect to the current table and u is the normalized simulation time. That is, there is no second order output adjustment to be made to a simple standard cell with a single-CCC. The first order output adjustment may be made to a simple standard cell with a single CCC.

Figure 5C:
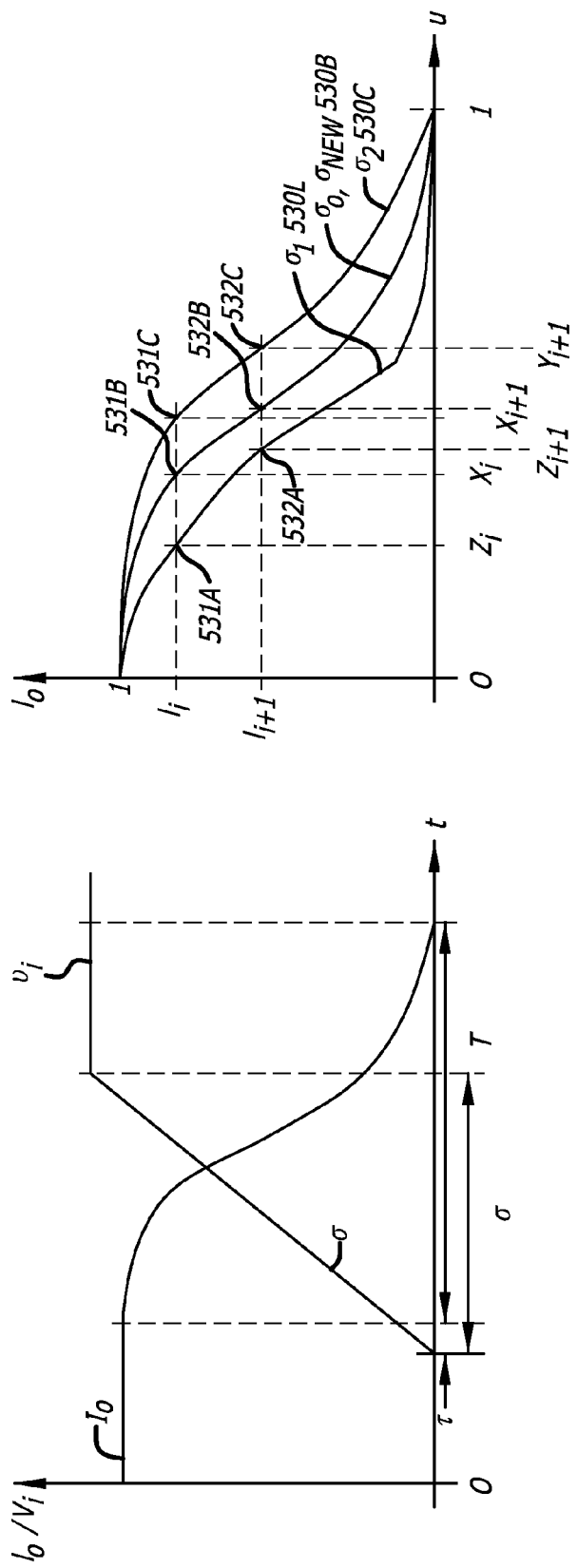
FIG. 5C illustrates an input voltage waveform with a new slew rate and characterization of the second transform function in accordance with another embodiment of the invention.

Referring now to FIG. 5C, the characterization of a time transformation function Γ is now described. A voltage input waveforms $V_i$ and its respective output current $I_o$ over time are plotted in the left chart. Output current waveforms Io normalized for time are plotted in the right chart.

From the plots of voltage input waveforms Vi with different slew rates and their respective output current Io, the shift parameters τ and the stretch parameters T are first measured. The shift parameters τ and the stretch parameters T for each voltage input waveform and its respective slew rate may be tabulated, such as illustrated in FIG. 11.

The output current waveforms Io are aligned and normalized for time over U from zero to one, such as illustrated in the right chart of FIG. 5C. Three output current waveforms Io 530A-530C are illustrated in the right chart of FIG. 5C with slew rates $\sigma_1$, $\sigma_0$, and $\sigma_2$, respectively. A plurality of equi-current points $I_i$ are selected and their normalized times U for all of the output current waveforms Io 530A-530C with their respective slew rates are recorded into a table, such as the table illustrated in FIG. 15.

For example, consider the equi-current point $I_i$ illustrated in the right chart of FIG. 5C that intersects the waveforms 530A-530C at points 531A-531C, respectively. At point 531A on waveform 530A, the normalized time is $Z_i$. At point 531C on waveform 530C, the normalized time is $Y_i$. At point 531B on waveform 530B, the normalized time is $X_i$. These normalized time points are tabulated in FIG. 15.

As another example, consider the equi-current point $I_{i+1}$ illustrated in the right chart of FIG. 5C that intersects the waveforms 530A-530C at points 532A-532C, respectively. At point 532A on waveform 530A, the normalized time is $Z_{i+1}$. At point 532C on waveform 530C, the normalized time is $Y_{i+1}$. At point 532B on waveform 530B, the normalized time is $X_{i+1}$. These normalized time points are also tabulated in FIG. 15. Additional equi-current points are selected and their respective normalized times for each waveform and slew rate are tabulated. The greater the number of equi-current points selected the better the accuracy of the model. Additionally the greater the number of output currents characterized for different input slew rates, the better the accuracy of the model.

Figure 5D:
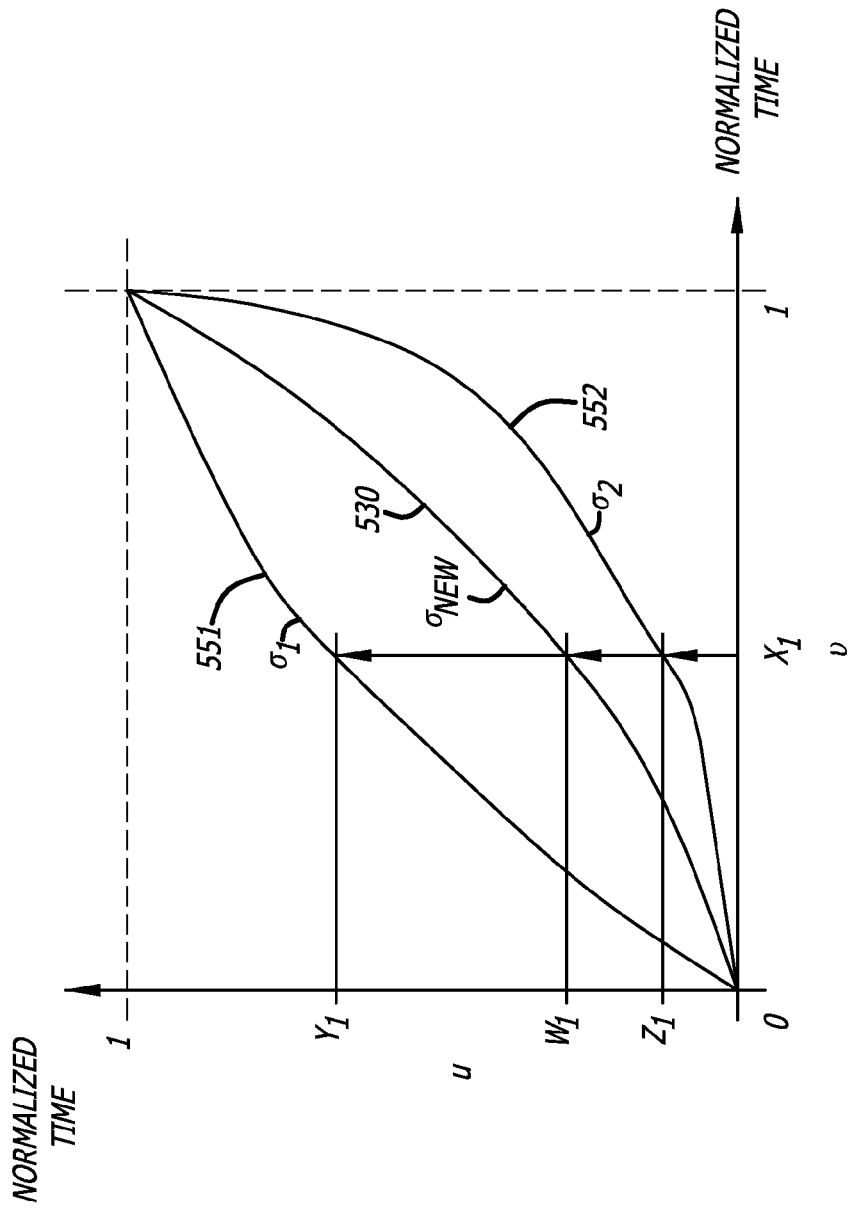
FIG. 5D illustrates equi-current normalized time curves to perform time transformation and generate an output current in response to an input voltage waveform with a new slew rate in accordance with another embodiment of the invention.

Referring now to FIG. 5D, the equi-current values of the output current waveform with their respective slew rates can be inverted and normalized with respect to time in order to form time transformation curves 551,552 illustrated in FIG. 5D. That is, FIG. 5D illustrates time versus time plots plotted from FIG. 5C. Time transformation waveforms 551, 552 with respective slew rates of $\sigma_1$ and $\sigma_2$ are illustrated in FIG. 5D.

With curves 551 and 552, a new intermediate voltage waveform 530 with respect to a new slew rate $\sigma_{new}$ may be readily interpolated by applying the second order adjustment. The interpolation is to construct an intermediate waveform for a multi-CCC standard cell to assist in output current look-up during simulation. The curves 551 and 552 of FIG. 5D may be stored in a table, such as illustrated in FIG. 15, as piece-wise linear time versus time curves.

The characterized time transformation curves of FIG. 5D for the slew rates $\sigma_1$ and $\sigma_2$ may be saved and used as part of the multi-CCC current source model. After determining a new slew rate of an input voltage waveform to a multi-CCC standard cell, the characterized time transformation curves 551-552 of FIG. 5D for the slew rates $\sigma_1$ and $\sigma_2$, respectively, may be utilized to interpolate a new time transformation curve 550 associated with the new slew rate $\sigma_{new}$ of the input voltage waveform.

At a normalized time of $u_1$ in FIG. 5D, curves 551 and 552 have normalized equi-current values of $Y_1$ and $Z_1$, respectively. The new transformation curve 550 has an interpolated value of $W_1$ at a normalized time of $X_1$. Equivalent ratios may be set up to interpolate all values of W along the curve 530 as follows:

$$\frac{y-x}{\sigma_1 - \sigma_{new}} = \frac{y-z}{\sigma_2 - \sigma_1} \qquad (4)$$

for all values of normalized time u and each respective value of y and z. The equation may be solved for the value w along the curve 530 as follows:

$$w = y\left[1 - \frac{\sigma_1 - \sigma_{new}}{\sigma_2 - \sigma_1} + z\frac{\sigma_1 - \sigma_{new}}{\sigma_2 - \sigma_1}\right] \qquad (5)$$

Figure 9:
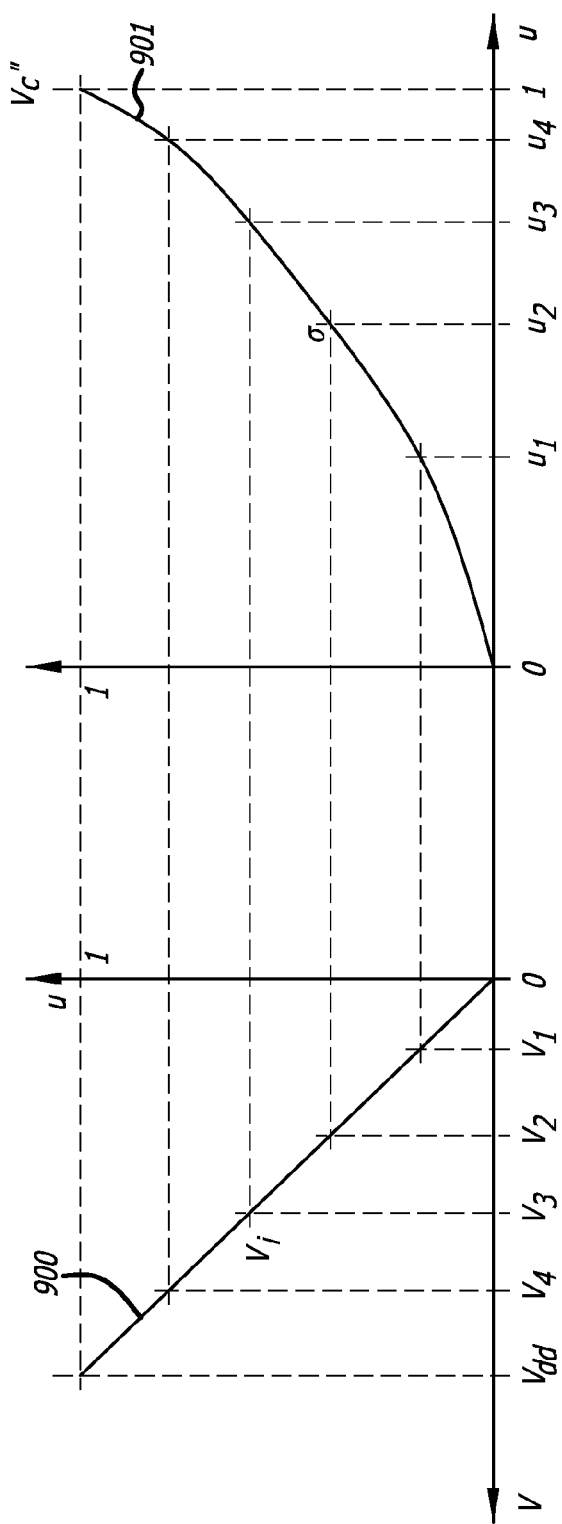
FIG. 9 illustrates a normalized input voltage waveform and a partially transformed voltage waveform.

Referring now to the left graph illustrated in FIG. 9, the input voltage waveform is then normalized by shifting the starting time point to zero at the origin and scaling the time axis so that the normalized input waveform $V_i$ 900 goes from the normalized time of zero to one.

Using the new time transformation curve 550, new time points are generated from the new input voltage waveform 900 to begin its transformation into the intermediate voltage waveform $V_c''$ 901 as illustrated by the right graph in FIG. 9.

Using the new slew rate $\sigma_{new}$, values for a new shift parameter and a new stretch parameter may be interpolated from a parameter look up table, such as the table illustrated in FIG. 11. A pair of parameter values $\tau_1$ and $\tau_2$ with respective slew rates $\sigma_1$ and $\sigma_2$ around the new slew rate $\sigma_{new}$ are chosen. A new shift parameter $\tau_{new}$ may be interpolated from the equivalent ratios in the following equation:

$$\frac{\tau_1 - \tau_{new}}{\sigma_1 - \sigma_{new}} = \frac{\tau_1 - \tau_2}{\sigma_1 - \sigma_2} \qquad (6)$$

The equation may be solved for the new shift parameter value $\tau_{new}$ as follows:

$$\tau_{new} = \tau_1\left[1 - \frac{\sigma_1 - \sigma_{new}}{\sigma_1 - \sigma_2} + \tau_2\frac{\sigma_1 - \sigma_{new}}{\sigma_1 - \sigma_2}\right] \qquad (7)$$

A pair of parameter values $T_1$ and $T_2$ with respective slew rates $\sigma_1$ and $\sigma_2$ around the new slew rate $\sigma_{new}$ are chosen. A new stretch parameter $T_{new}$ may be interpolated from the equivalent ratios in the following equation:

$$\frac{T_1 - T_{new}}{\sigma_1 - \sigma_{new}} = \frac{T_1 - T_2}{\sigma_1 - \sigma_2} \qquad (8)$$

The equation may be solved for the new stretch parameter value $T_{new}$ as follows:

$$T_{new} = T_1\left[1 - \frac{\sigma_1 - \sigma_{new}}{\sigma_1 - \sigma_2} + T_2\frac{\sigma_1 - \sigma_{new}}{\sigma_1 - \sigma_2}\right] \qquad (9)$$

Figure 10:
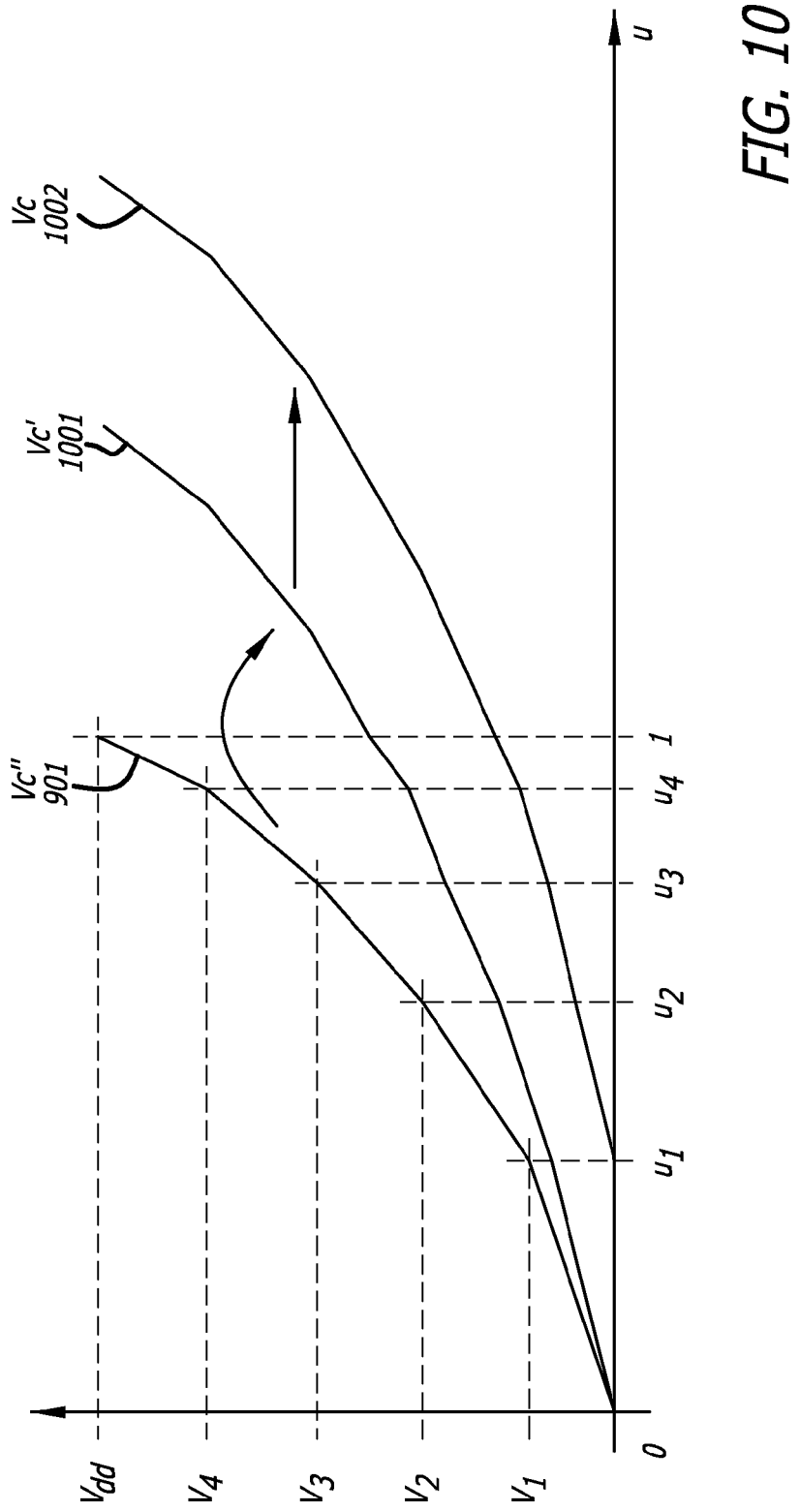
FIG. 10 illustrates the final transformations of the partially transformed voltage waveform into the intermediate voltage waveform.

Referring now to FIG. 10, the intermediate voltage waveform $V_c''$ 901 is further transformed by the stretch parameter value $T_{new}$ by stretching it into the intermediate voltage waveform $V_c'$ 1001. The intermediate voltage waveform $V_c'$ 1001 is finally transformed by the shift parameter value $\tau_{new}$ by shifting it into the final intermediate voltage waveform $V_c$ 1002.

Figure 19:
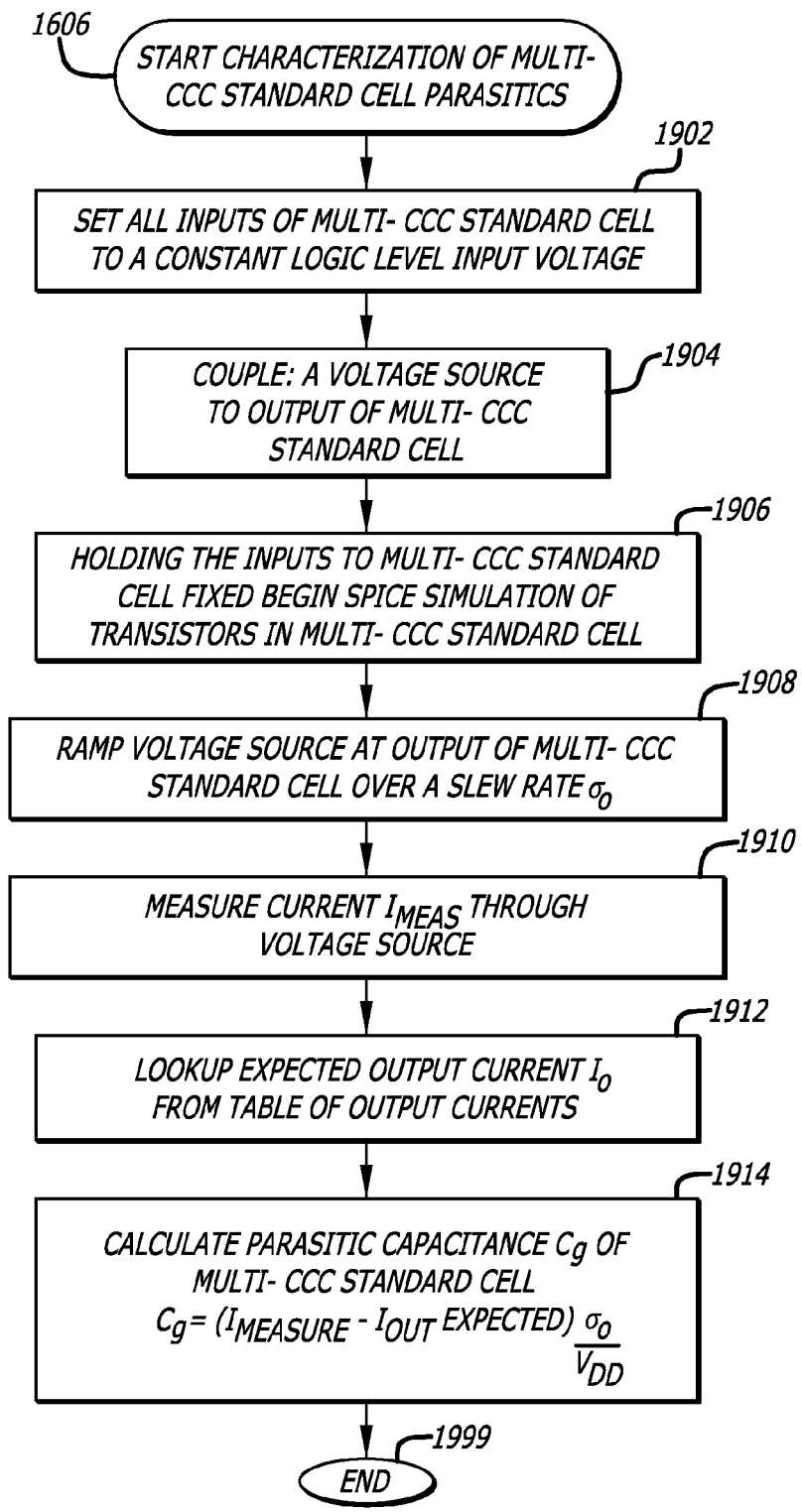
FIG. 19 illustrates a flow chart of the characterization of the standard cell parasitics.

At block 1606, the parasitic capacitance of the standard cell for the multi-CCC current source model is characterized. The flow chart of FIG. 19 illustrates the characterization of the parasitics of the standard cell in greater detail.

At block 1902, all the inputs of the multi-CCC standard cell are set to a constant logic level input voltage. At block 1904, a voltage source is coupled to the output of the multi-CCC standard cell. With the input voltage Vi being held constant, the intermediate voltage level Vc is also held constant.

At block 1906, while holding the inputs to the multi-CCC standard cell fixed, a SPICE transistor circuit simulation is run of the transistors in the given multi-CCC standard cell.

At block 1908, to characterize $C_g(V_o)$, the voltage source at output applies a voltage ramp with a slew rate $\sigma_o$ at the output of the multi-CCC standard cell.

At block 1910, the current ($I_{meas}$) going through the voltage source at the output of the multi-CCC standard cell which asserts the voltage ramp is measured.

At block 1912, the expected initial output current $I_o(V_c(t=0), V_o)$ may be looked up from a current table, such as the table illustrated in FIG. 13, given that we set the output voltage $V_o$ and we estimated the intermediate voltage $V_c(t=0)$ at time zero.

At block 1914, given the foregoing information, $C_g(V_o)$ can be computed by using Eq. 10 as follows:

$$Cg = \frac{(I_{meas} - I_o(V_c(t=0), V_o)) \cdot \sigma_o}{V_{dd}} \qquad (10)$$

where $I_{meas}$ is the measured current and $I_o(V_c(t=0),V_o)$ is the initial output current that may be looked up from a current table.

Figure 16:
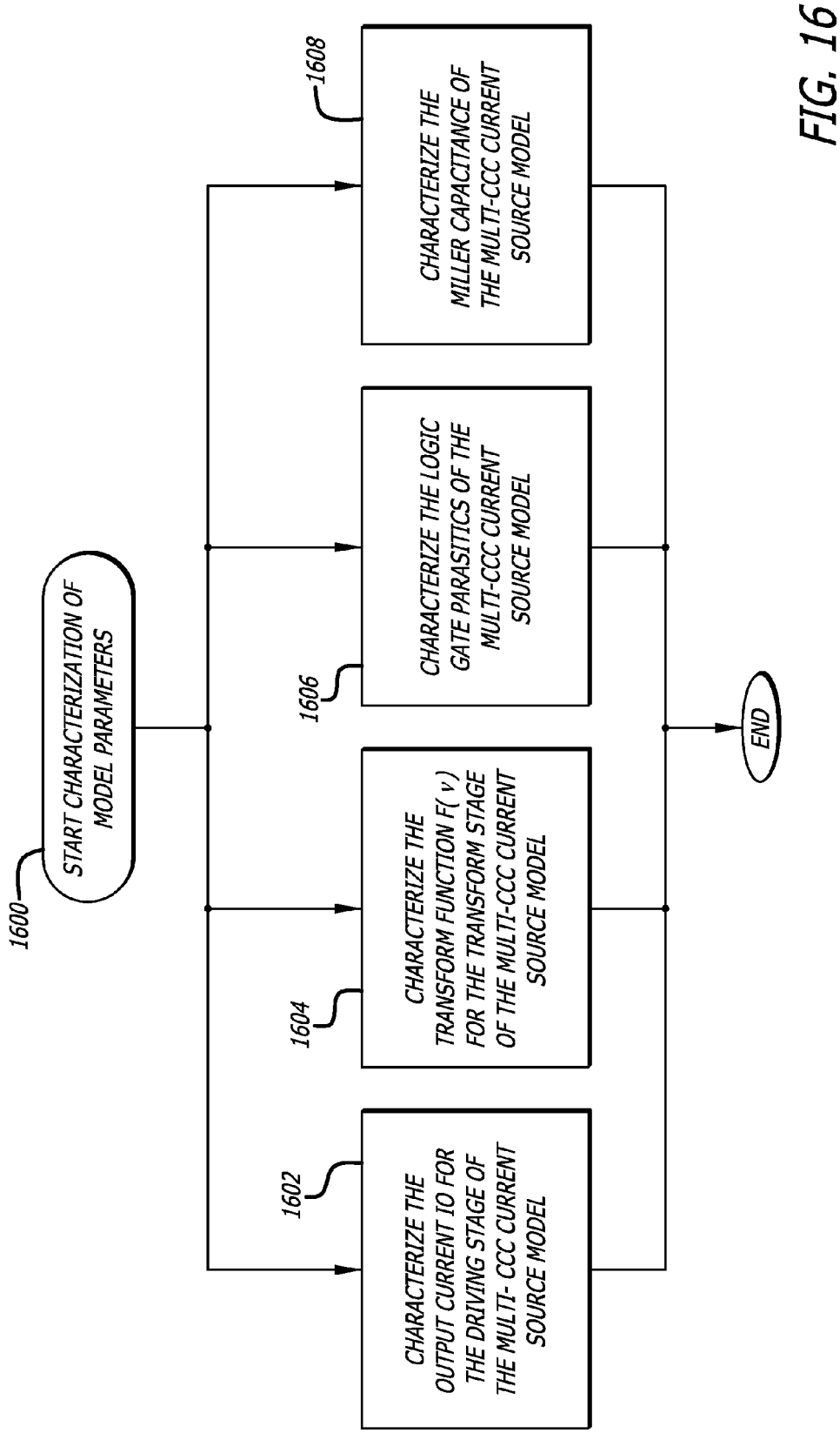
FIG. 16 is a flowchart illustrating the characterization of model parameters for the multi-CCC current source model.

At block 1608 in FIG. 16, the miller capacitance of the multi-CCC current source model may also be characterized.

Figure 4C:
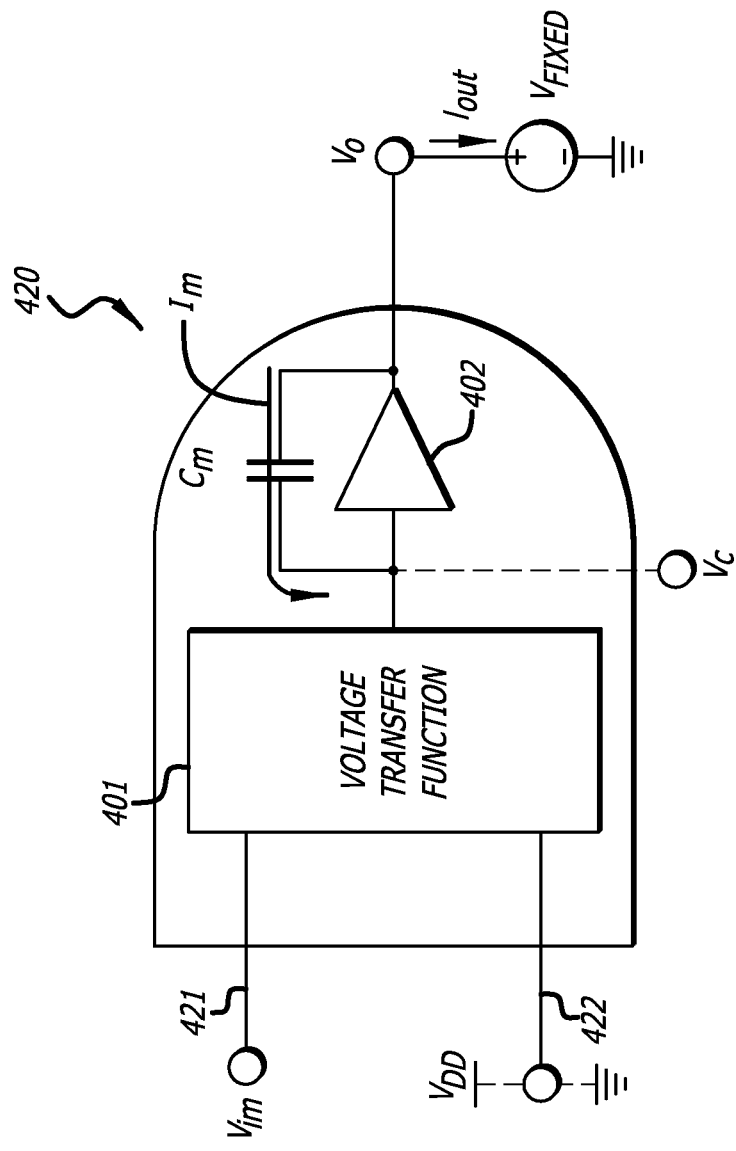
FIG. 4C illustrates an abstracted view of another multistage standard cell, such as an AND gate, configured for characterizing the miller capacitance ($C_{miller}$ or $C_m$) of the multi-CCC current source model.
Figure 20:
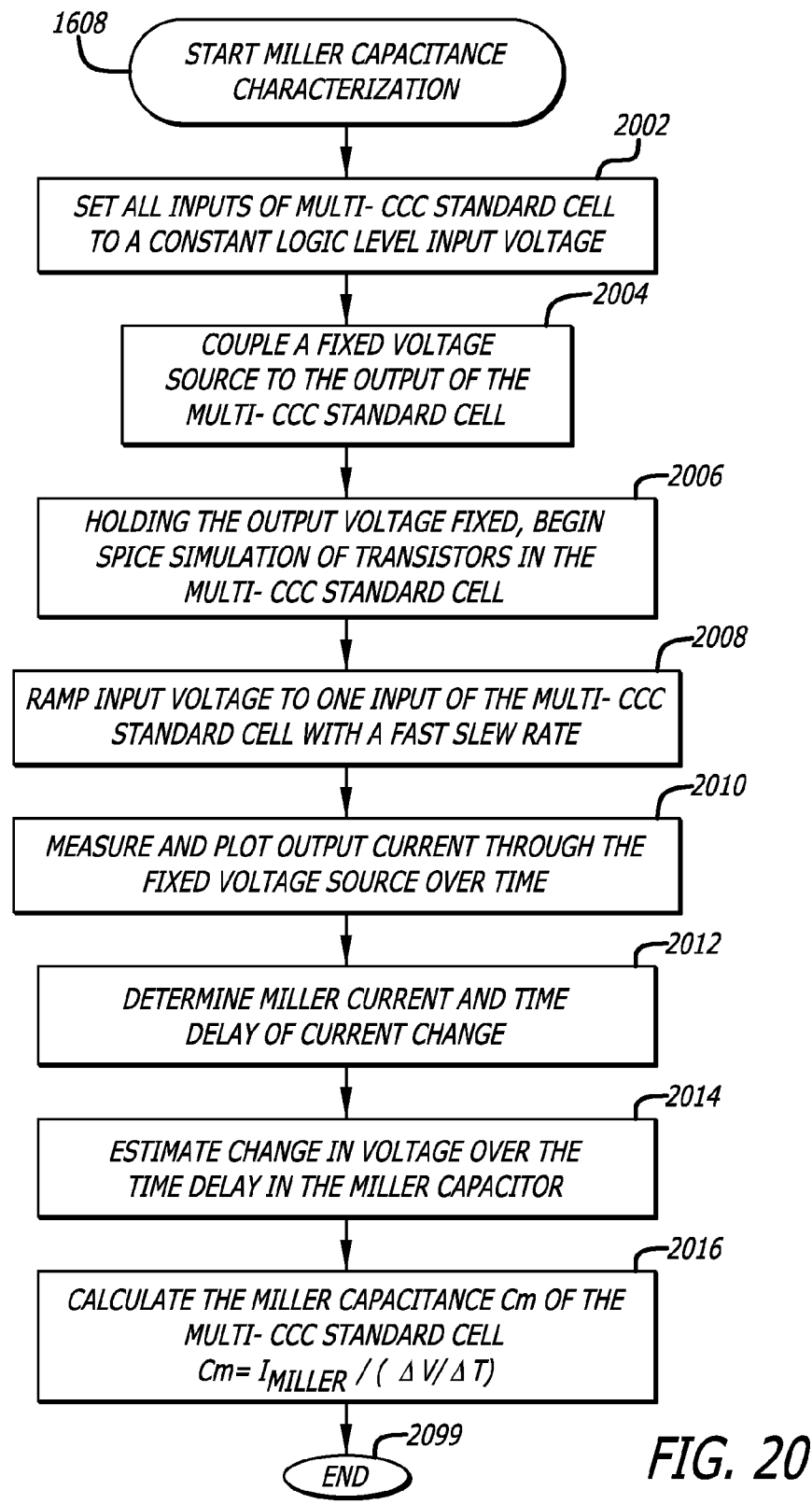
FIG. 20 illustrates a flow chart of the characterization of the miller capacitance.

Referring now to FIG. 20 and FIG. 4C, a method of characterizing the miller capacitance ($C_{miller}$ or $C_m$) of the multi-CCC current source model is now described.

At block 2002, all the inputs 422 but one input 421 of the multi-CCC standard cell 420 are set to a constant logic level input voltage. They may be set to a constant high logic level by coupling to the positive power supply voltage VDD or a constant low logic level by being coupled to ground VSS.

At block 2004, a fixed voltage source $V_{fixed}$ is coupled to the output of the multi-CCC standard cell 420. The fixed voltage source $V_{fixed}$ may be fixed to a constant positive power supply voltage level (VDD) in one embodiment of the invention or a constant zero volts in another embodiment of the invention.

At block 2006, while holding the output voltage of the multi-CCC standard cell fixed to the fixed voltage source $V_{fixed}$, a SPICE transistor circuit simulation is run of the transistors in the given multi-CCC standard cell.

At block 2008, to characterize the miller capacitance $C_m$, a voltage source applies a voltage ramp with a fast slew rate $\sigma_{fast}$ at the input 421 to the multi-CCC standard cell 420. The slew rate of the voltage ramp should be as fast as possible for best results.

At block 2010, the output current ($I_{out}$) going through the fixed voltage source is measured and plotted over time in response to the voltage ramp at the input 421 of the multi-CCC standard cell.

At block 2012, the miller current $I_{miller}$ or $I_m$ is determined and a time delay S in the change of the output current is also determined from the plotted output current. The time delay S is used as the change in the time period for the voltage decay over the miller capacitor.

Figure 22A:
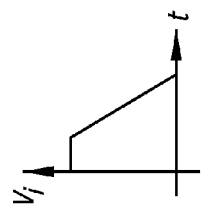
FIGS. 22A-22C illustrate plots of exemplary waveforms for the input voltage ramp Vi, intermediate voltage Vc, and the output current $I_{out}$ for characterization of the miller capacitance in one embodiment of the invention.
Figure 22B:
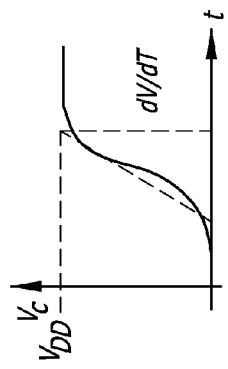
Figure 22C:
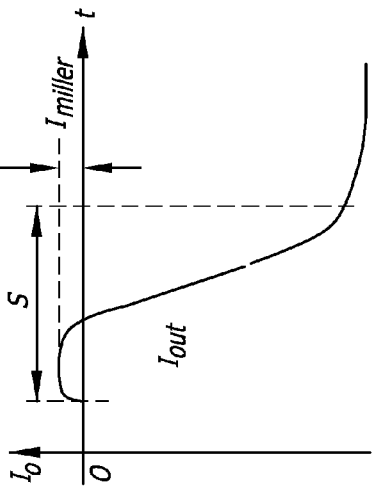
Figure 23A:
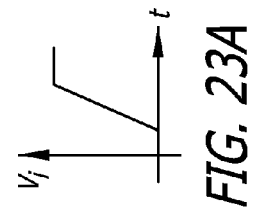
FIGS. 23A-23C illustrate plots of exemplary waveforms for the input voltage ramp Vi, intermediate voltage Vc, and the output current $I_{out}$ for characterization of the miller capacitance in another embodiment of the invention.
Figure 23B:
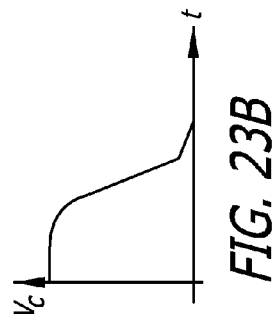
Figure 23C:
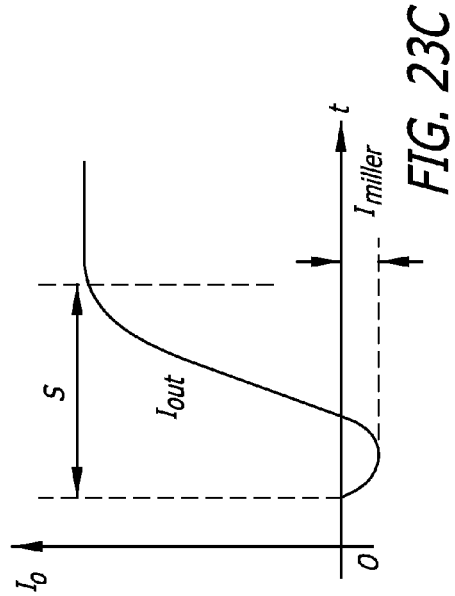

Referring now to FIGS. 22A-22C, plots of exemplary waveforms for the input voltage ramp Vi, intermediate voltage Vc, and the output current $I_{out}$ are illustrated in the case that the fixed voltage source is set to the positive power supply voltage VDD. FIGS. 23A-23C illustrate plots of exemplary waveforms for the input voltage ramp Vi, intermediate voltage Vc, and the output current $I_{out}$ in the case that the fixed voltage source is set to the zero volts.

In either case, the miller current is a current that results because the miller capacitor resists an instantaneous change in voltage. The miller current flows from the input to the driver stage of the multi-CCC current source model through the miller capacitor to the output node Vo. The miller current is the instantaneous change in current illustrated in FIGS. 22C and 23C as a result in the initial change in the intermediate voltage Vc in FIGS. 22B and 23B. The driver stage of multi-CCC current source model has yet to turn on and provide a current. Thus, the measured output current is the miller current prior to the driver stage turning on and driving a current into the output node.

The current through a capacitor is known to be proportional to the product of the capacitance and a time derivative of the voltage. The latter can be approximated by a change in voltage divided by a change in time:

$$I_m = C_m \frac{\delta v}{\delta t} \quad (11)$$

Rearranging Eq. 11 to solve for the miller capacitance we get:

$$C_m = \frac{I_m}{\left(\frac{\delta v}{\delta t}\right)} \quad (12)$$

At block 2014, the change in voltage over time in the miller capacitor is estimated using the time delay S. That is, dV/dt is congruent to the positive power supply voltage VDD divided by the time delay S or VDD/S.

At block 2016, the miller capacitance is calculated using Eq. 12 and the measured miller current Im through the miller capacitor Cm and the change in voltage over time VDD/S across the miller capacitance. After the miller capacitance is determined for the given multi-CCC standard cell, it is stored with the other parameters of the multi-CCC current source model.

After the miller capacitance is determined, the characterization of the miller capacitance ends at block 2099.

Generally, the multi-CCC current source model is efficient in the runtime that is required to characterize the model, as well as the amount of data storage need to preserve its parameters. The multi-CCC current source model can achieve sufficient accuracy by keeping seven $V_o$ values and twenty time samples of $$I_o^{ref}(V_c(t), V_o)$$

for each $V_o$ in the $I_o(V_c,V_c,V_o)$ table of FIG. 13. $C_g(V_o)$ may require only seven $V_o$ values in its table of FIG. 14. It is also sufficient to store values of $T_o, \tau_o$ and $F_o(v)$ for three different input slew rates, a reference input slew $\sigma_{ref}$, a slow input slew $\sigma_{slow}$, and a fast input slew $\sigma_{fast}$ that may be stored in tables, such as tables illustrated in FIGS. 11 and 12. Characterizing these parameters may take about ten transistor circuit simulations using a transistor circuit simulator, such as Cadence Design Systems, Inc.'s Spectre transistor circuit simulator, compared to about eighty transistor circuit simulations that may be required for other gate models.

Delay Calculation for Application Specific IC Design

The embodiments of the invention may be used with or in a static timing analyzer for analyzing the timing of an integrated circuit.

Figure 21:
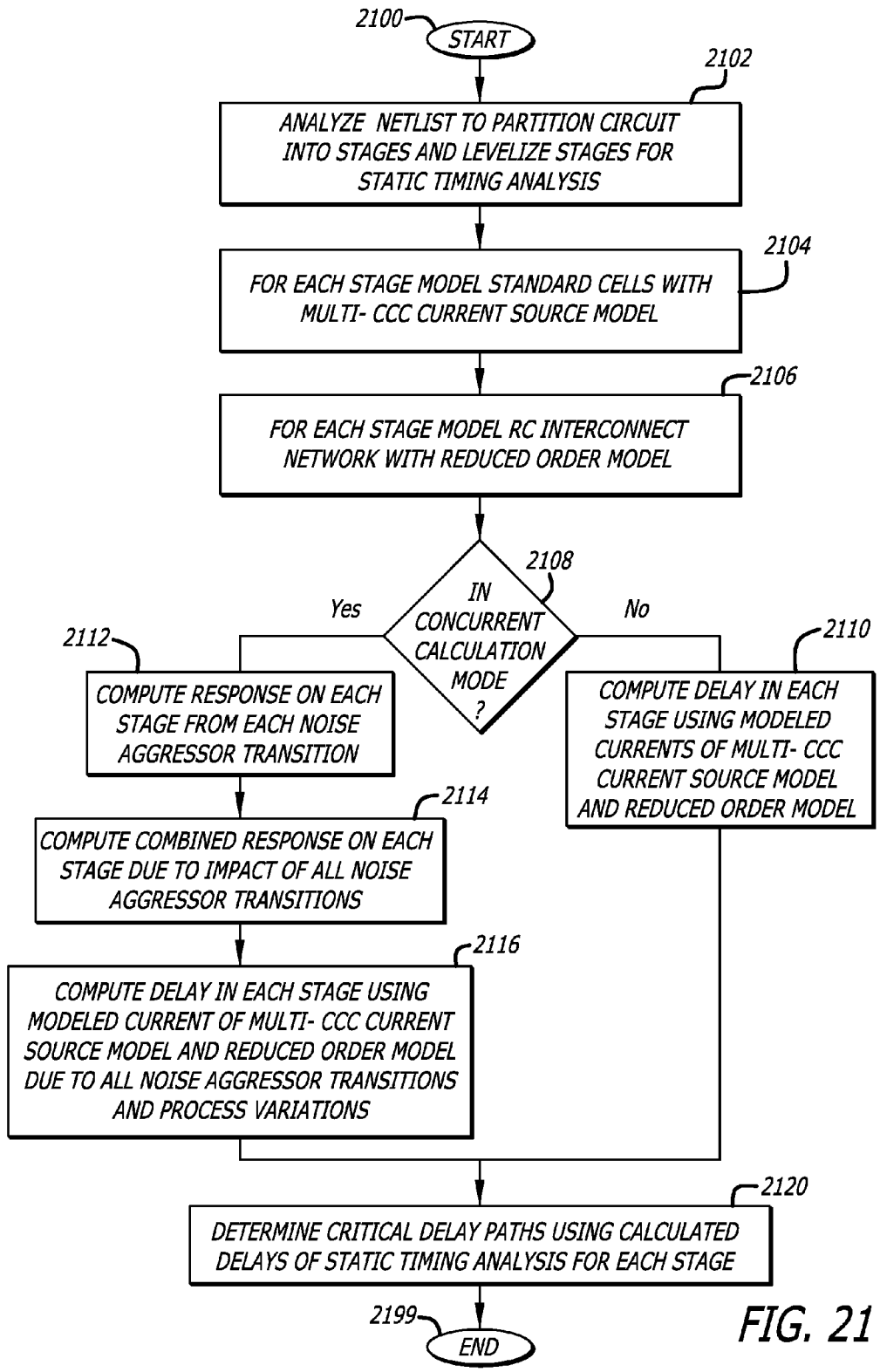
FIG. 21 is a flow chart for performing a timing analysis of the circuit netlist of FIG. 1D.

Referring now to FIG. 21 and FIGS. 1C-1D, a timing analysis of the circuit netlist of FIG. 1D may be made starting at block 2100 in FIG. 21 which jumps to block 2102.

At block 2102, a netlist is analyzed to partition a circuit into stages. The stages are further levelized to perform static timing analysis. Each stage may include one or more standard cells and associated interconnect.

At block 2104 in each stage, one or more standard cells are modeled using a multi-CCC current source model. If a standard cell is a single-CCC standard cell, the multi-CCC current source model may still be used with the voltage transform function having a unity value of one such that the intermediate voltage is the input voltage.

At block 2106 in each stage, the coupled RC interconnect network may be generated from a parasitic extraction after a circuit is laid out or the parasitics may be generated in response to the netlist after logic synthesis and possibly a floor plan of the functional blocks of the circuit, if available. The parasitics of the coupled RC interconnect network in each stage are modeled using a reduced order model (ROM).

At block 2108, a determination is made as to whether or not the system is in a concurrent calculation mode. A concurrent calculation mode includes a noise or signal integrity analysis as part of the multi-CCC current source model. If not, the process goes to block 2110. If so, the process goes to block 2112.

At block 2110, the delay in each stage is computed using the modeled current of the multi-CCC current source model and the modeled parasitics of the reduced order model (ROM). The process then goes to block 2120.

At block 2112 for each stage, assuming concurrent calculation mode, the response on the output of each stage due to each noise aggressor transition is computed and tabulated. The process may then go to block 2114.

At block 2114 for each stage, the combined response on the output of each stage in response to all noise aggressor transitions may be computed and tabulated.

Next at block 2116, for each stage, the delays and the sensitivities to all noise aggressors and process variations are computed via simulation using the multi-CCC current source model and the reduced-order model (ROM) for the associated RC interconnect. The receiving gates in each stage are modeled using constant capacitors. The process then goes to block 2120.

At block 2120, the calculated delays of each stage are used by a static timing analysis tool to determine the critical delay paths. The process goes to block 2199 and ends.

Stage Delay Calculation Under Process Variations

The multi-CCC current source model may be used to perform timing delay calculations on a stage of a circuit in the presence of process variations. Process variations can effect the interconnect as well as the transistors used in the logic cells of a standard cell library. For example, a metallization process is used to manufacture the interconnect within an integrated circuit. During the metallization process, the sheet resistance may vary in the metal as well as the width and thickness of metal lines due to process variations and change the impedance.

Figure 24:
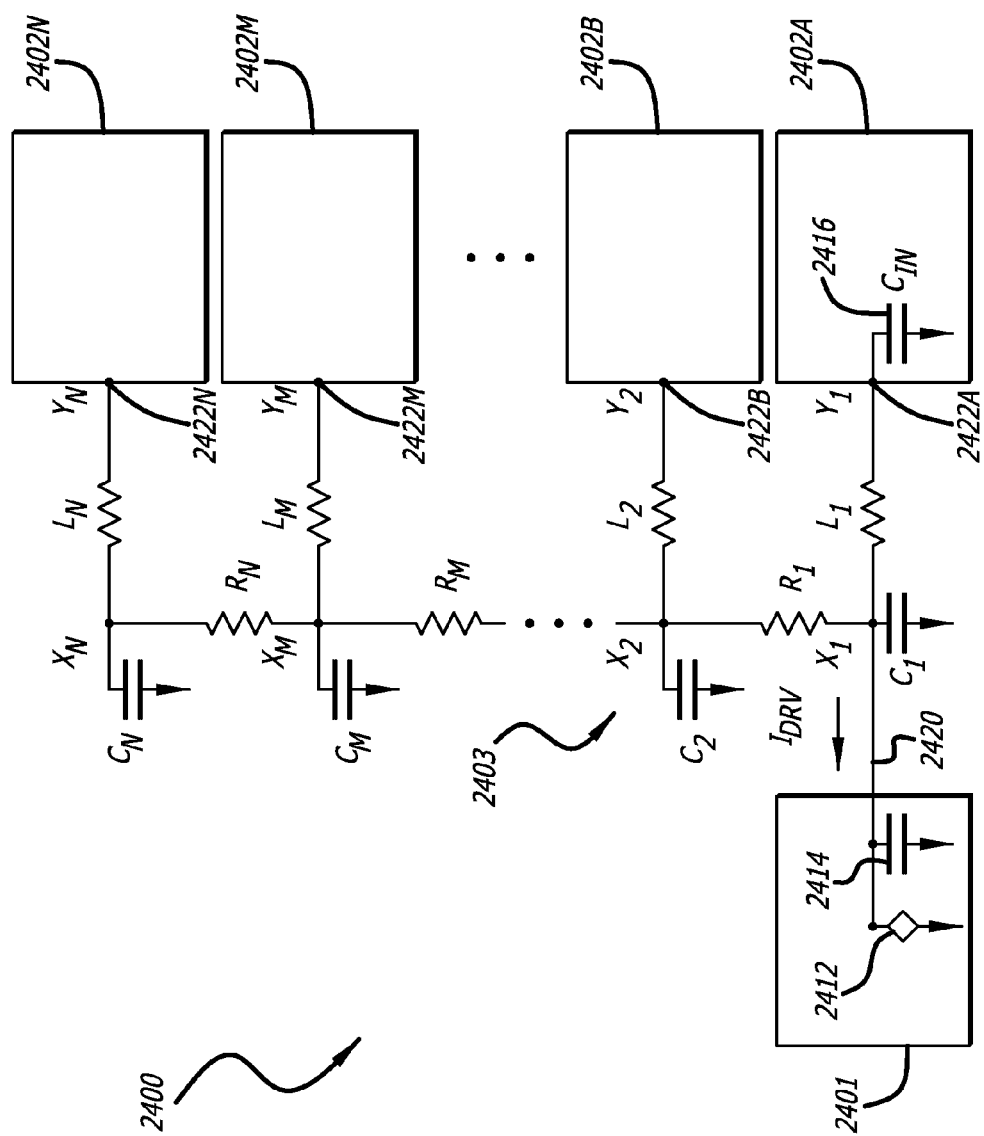
FIG. 24 illustrates a block diagram of a circuit stage for a vector analysis of the timing delay and the sensitivity of the timing delay to process variations.

Referring now to FIG. 24, a circuit stage 2400 is illustrated including a driver 2401 connected to a plurality of receivers 2402A-2402N through an interconnecting net 2403. The stage 2400 is modeled by a circuit consisting of the net's parasitics and its driver 2401 and receivers 2402A-2402N. For the sake of simplicity, a net is assumed to have a single victim driver as shown. However, the methods may be adopted with modification for the general case of multiple driving stages.

For calculation of STA delays at the driver output (port) X1 2420 and receiver inputs (taps) Y1-YN 2422A-2422N, the transition at the driver input is required. Correspondingly, the delay calculator computes voltage responses at the so-called probing points Yd, Y1-YN (2420, 2422A-2422N in FIG. 24)—nodes which are connected to output of the driving gate and inputs of receiving gates, respectively.

For calculation of the responses at the probing points Yd,Y1-YN 2400,2422A-2422N, a state-space formulation is used. A vector of voltages V ($v_1, \ldots, v_{N+1}$) is formed at nodes of the RC network in the stage 2400. The vector V of voltages may be formed so that $v_1$ denotes $v_d$—a voltage on the output node (port) from the driver 2401 as shown in FIG. 24, and $v_2, \ldots, v_{N+1}$ denote respectively voltages at input nodes (taps) of the receiving gates—$v_{r1}, \ldots, v_{rN}$.

To enable an efficient and accurate delay calculation the nonlinear parts of the stage are approximated using appropriate models. The driver 2401 is modeled with the multi-CCC current source model described previously. The driver 2401 includes a voltage controlled current source 2412 and a capacitance $C_g$ 2414. Calculation of responses at the stage's probing points is performed after responses are computed at the previous stages and parameters of input transitions, such as slews and delays, are determined at the inputs of the stage being analyzed.

During calculation of responses, it is assumed that voltage at one of the inputs of the driving gate is transitioning (either rising or falling) and this causes some transition at the nodes of the driven interconnect. We can assume that for each input pin of the driving gate, direction of transition at the input and output pins and logical values at other input pin, there exists a unique current source model describing current at the output pin as a function of voltage transitions at the switching input and output pins: $I = I_{drv}(v_{in}(t), v_{out}(t))$. However, since transition at the inputs of the driving gate are known at the time of delay calculation at the stage, the driver current source can be represented as a function of time and voltage at the output node of the driving gate: $I = I_{drv}(t, v_{out}(t))$.

For a given switching input pin, directions of transitions at the input and the output of the driving gate and logical values at the other inputs, the current drawn by the driver is thus a known function of time t and voltage $v_1$ and may be designated as $I_{drv}(t, v_1)$.

Each of the receivers or receiving gates 2402A-2402N may be modeled using a constant input capacitor $C_{in}$ 2416 extracted from a standard cell library for the respective type of cell or gate.

Kirchhoff's current law (KCL) equations regarding the principle of conservation of electric charge, may be applied to describe the stage 2400 as follows:

$$C\frac{dv}{dt} + Gv = BI_{drv}, \quad (13)$$

$$y = Lv \quad (14)$$

In the left-hand side of Eq. 13, C is a capacitance matrix, G is a conductance matrix, and v is the voltage vector. The vector $y = \{v_1, v_2, \ldots, v_{M+1}\}$ denotes voltages at the probing points which include output of the driver and inputs to the receiving gates of the M receivers 2402A-2402N as shown in FIG. 24.

In the right-hand side of Eq.13,14, the matrices B and L are respectively input and output position matrices, and $I_{drv}$ is the current drawn by the driver current source.

The input capacitors modeling the receiver gates 2402A-240@N may be added into the capacitance matrix C.

The set of equations (13,14) is sufficient to calculate responses at the probing points, which may be achieved via simulation of the circuit using numerical integration of the governing equations (13,14). Note that the current source model for the driver is different for different input switching pins, input and output direction transition and values at side (other) inputs. That is, for each such configuration of the driver, a separate simulation is required.

Since RC interconnect may include hundreds or even thousands of resistors and capacitors, it is usually expensive to integrate Eqs. (13,14) with highly sparse matrices G,C. In order to make simulation more efficient a model-order reduction (MOR) may be performed to generate a load model (a reduced order model ROM) of the RC interconnect. Model-order reduction is generally described in U.S. Patent Application Publication No. 2006/0095236A for U.S. patent application Ser. No. 10/932,406 filed on Sep. 2, 2004 by Joel R. Phillips and incorporated herein by reference. The model-order reduction results in much more compact state-space equations with very little loss of accuracy. The reduction produces a reduced-order model (ROM) for the interconnect parasitics, which also includes receiver pin capacitors. After the reduced-order model (ROM) for the interconnect parasitics is generated, the state-space equations can be formulated in this conventional form:

$$E\frac{dx}{dt} = Ax + Bu \quad (15)$$

$$y = Cx \quad (16)$$

Note that matrix C in Eq. (16) is unrelated to the capacitance matrix used in Eq. (13). The vector x is the state vector, which usually has much smaller dimension that original vector of node voltages. Vector y is the vector of probing points as before, and u in the right-hand side of Eq. (15) is the driver current $I_{drv}$. The input to the ROM, which is the node where a driver is connected to, and the outputs, which are nodes where receiving gates are connected to, are often referred to as port and taps, respectively. Matrices E,A are of much smaller size than before reduction.

Generally, both linear and nonlinear elements of a circuit are functions of process parameters. Let a vector $\lambda = \{\lambda_n\}$ with $n = 1, \ldots, P$ denote a vector of interconnect and cell process parameters. It is assumed that the capacitance and the conductance matrices of the original state-space system $C(\lambda)$, $G(\lambda)$ and driver current source $I_{drv}(t, v, \lambda)$ are known functions of process parameters. Likewise, the state-space matrices of the reduced system A,E are also functions of process parameters. Moreover, the capacitance matrix $C(\lambda)$, the conductance matrix $G(\lambda)$, the driver current source $I_{drv}(t, v, \lambda)$, of the original stage-space system and the state-space matrices A,E of the reduced state-space system can also be modeled so that the effects of variation of temperature and variation in power supply voltage Vdd can be accounted for.

For a fixed vector of process parameters $\lambda$ the port and tap responses can be determined by solving both of the equations (5,6). This may be done for instance using trapezoidal integration method. Since excitation u is a nonlinear function of the port voltage, Newton-Raphson iterations are used at each time step. This means that the responses and correspondent delays are implicitly functions of process parameters.

The delay calculation problem of the stage 2400 may be formulated as a problem of finding the port and tap responses y and the correspondent delays and slews as functions of vector $\lambda$. Some delay characteristics are of particular interest in the presence of process variations. The timing delay of the stage (the "stage delay") is of interest at a particular point of the subspace of process parameters, referred to as a process parameter vector (PPV). The maximum (and minimum) values of the stage delay within a certain range (subspace) of process parameters may be of interest. Moreover, the sensitivity of the stage delay with respect to process parameters at a particular process parameter vector may be of interest.

In the presence of large variations in process parameters, one approach to model the stage delay is to choose a representative set of process parameter vectors, often referred to as set of process corners, and perform a delay calculation at each process corner. The selection of the corners is usually done in such a way as to cover the feasible space of process variations and ensure that the maximum and/or minimum timing delays are reached at least one of the chosen corners. However with a large number of process parameters, the number of corners to ensure a conservative analysis may be too high for the process corner approach of analyzing timing delays to be practical.

However, all or several of the process parameters may vary within a relatively small range. In this case, an efficient technique to model the timing delay with process variations is as a linear function of the process parameters. This approach is based on a sensitivity analysis. The sensitivity of delay is defined as a derivative of the timing delay with respect to a varying parameter. Since the behavior of timing delay in a sufficiently small vicinity of a chosen process parameter vector is linear with respect to the process parameters, knowing the delay and its sensitivities at a process parameter vector provides a good model for the delay in the vicinity of the process parameter vector.

Calculation of Delay, Slew and their Sensitivities to Process Variations

An algorithm for the calculation of the stage delay and delay sensitivity at a given process parameter vector is now described with reference to FIG. 24.

A state-space system for the voltage responses at the output (port) X1 2420 of the driver 2401 and receiver inputs (taps) Y1-YN 2422A-2422N of the receivers 2402A-2402N in the presence of process variations may be written as $$E(\lambda)\frac{dx}{dt} = A(\lambda)x + Bu(\lambda) \quad (17)$$

$$y = Cx \quad (18)$$

Since both matrices and excitation vector depend on process parameter vector X, the solution must depend on $\lambda$ as well.

In order to find sensitivity of the stage delay with respect to process parameters at a given process parameter vector, the state-space system as well as responses are expanded in Taylor series around some nominal value of the process parameter vector $\lambda = \lambda_{nom}$.

Assuming that small variations of process parameters around their nominal values cause the variation of responses to be also small, the circuit responses in the vicinity of the nominal vector of process parameters can be sought in the form of a Taylor series with respect to the deviation of the process parameter vector from its nominal value: $\delta = \lambda - \lambda_{nom}$:

$$A = A^{(0)} + \Sigma \delta_n A_n^{(1)} + \ldots \quad (19)$$

$$E = E^{(0)} + \Sigma \delta_n E_n^{(1)} + \ldots \quad (20)$$

$$u = u^{(0)} + \Sigma \delta_n u_n^{(1)} + \ldots \quad (21)$$

$$x = x^{(0)} + \Sigma \delta_n x_n^{(1)} + \ldots \quad (22)$$

In equations 19-22, the zero-order terms $A^{(0)}$, $E^{(0)}$, $u^{(0)}$, $x^{(0)}$, correspond to nominal matrices excitation and states which are taken at $\lambda = \lambda_{nom}$. In this approach which uses Z-formulation, the matrices B and C do not depend on process parameters and therefore do not need to be expanded. The first-order terms are summations of a product of the deviation $\delta_n$ of process parameter $\lambda_n$ from its nominal value and the sensitivity (or partial derivative) of the correspondent function with respect to this process parameter, e.g.

$$A_n^{(1)} = \left.\frac{\partial A}{\partial \lambda_n}\right|_{\lambda_n = \lambda_{n,nom}}$$

At zero order we have the following problem:

$$E^{(0)}\frac{dx^{(0)}}{dt} = A^{(0)}x^{(0)} + Bu^{(0)} \quad (23)$$

$$y^{(0)} = Cx^{(0)} \quad (24)$$

Before formulating the first-order problem allowing sensitivity calculations, notice that since $u = I_{drv}(t, v_1(\lambda), \lambda)$ depends on process parameters via two latter arguments, the sensitivity with respect to (w.r.t.) $\lambda_n$ is $$u_n^{(1)} = \left.\frac{\partial I_{drv}}{\partial \lambda_n}\right|_{\lambda_n = \lambda_{n,nom}} + g(t) * v_{1,n}^{(1)} \quad (25)$$

In Equation 25, g(t) is the small-signal admittance of the current at the nominal voltage response:

$$g(t) = \left.\frac{dI_{drv}(t, v_d)}{dv_d}\right|_{v_d = y_1^{(0)}} \quad (26)$$

The two components in the first-order correction of driver current are due, respectively, to variation of the gate driving strength itself, and due to change in driver output response.

At the first order we obtain a set of linear problems, one for each process parameter as follows:

$$E^{(0)}\frac{dx_n^{(1)}}{dt} - A^{(0)}x_n^{(1)} - Bg(t)y_{1,n}^{(1)} = A_n^{(1)}x^{(0)} - E_n^{(1)}\frac{dx^{(0)}}{dt} + Bu_n^{(1)} \quad (27)$$

$$y_n^{(1)} = Cx_n^{(1)} \quad (28)$$

In equation 27, $y_{1,n}^{(1)}$ is first element of vector $y_n^{(1)}$, which is the sensitivity of driver output response w.r.t. parameter $\lambda_n$ and it can be expressed via $x_n^{(1)}$ using Eq. (28).

Equations 27,28 are linear with respect to sensitivity values. All quantities in the right-hand side of equations 27,28 are known since they depend on the nominal response which is found from equations 23,24. The sensitivities can be calculated from equations 27,28 using different numerical methods for solving a set of linear ordinary differential equations. For instance, a trapezoidal numerical integration method can be used to calculate the sensitivities using equations 27,28.

In another embodiment of the invention, the total delay under nominal conditions may initially be computed. The non-linear circuit equations for the stage including current source model for the driver $I_{drv}$ and ROM for interconnect may be formulated in their parameterized form with respect to the process parameter vectors. The port and tap responses as well as the equations and the driver current equations may be expanded around the nominal values of process parameter. The sensitivities of the responses and hence delays to process variations may be determined from a set of linear equations (27,28) obtained by the application of a perturbation method to original equations (17,18).

Results

Digital electrical analysis engines are usually compared against a SPICE-like transistor level circuit simulator, such as Cadence Design Systems, Inc. Spectre transistor level circuit simulator product. A number of tests have been performed to validate the accuracy of the multi-CCC current source model. A comparison was made on a stage by stage basis. The basic structure of all netlists is a three-stage gate chain. The test-suite has thousands of combinations of input slews, drivers, interconnect topologies, lengths and sizes. To validate nominal delay, noise coupling capacitors of the interconnect, if any, are coupled to ground. Each of the cells in the standard cell library, such as a commercial 90 nm technology cell library, is completely characterized for the multi-CCC current source model beforehand. The library models for the electrical simulation engine may also be fine tuned to achieve greater accuracy.

Figure 7:
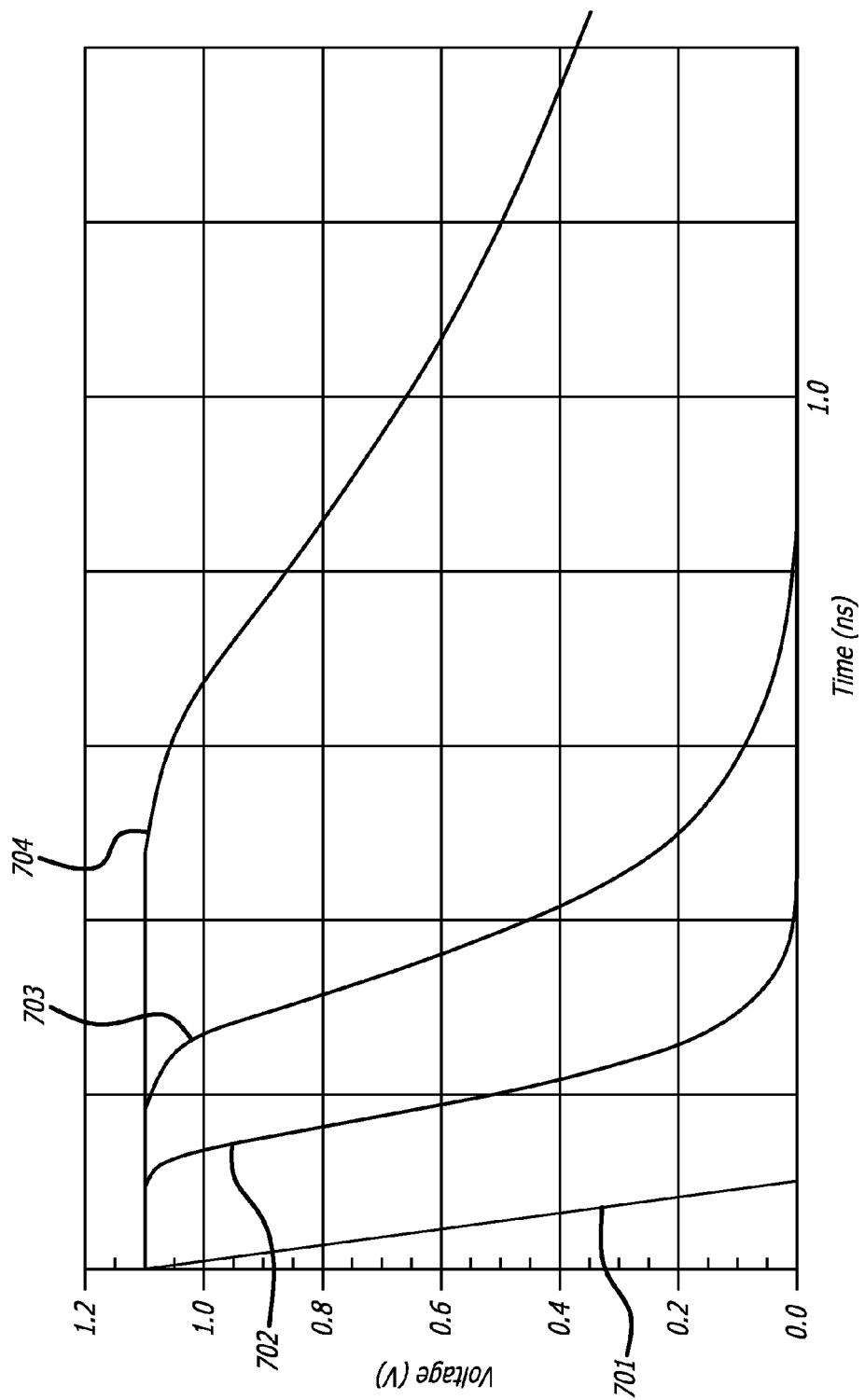
FIG. 7 shows voltage waveform results from a static timing analyzer using the multi-CCC current source model and a spice transistor level circuit simulator for comparison.

Referring now to FIG. 7, voltage waveform results of a static timing analysis using the digital delay calculator with a multi-CCC current source model and transistor level simulations generated by Cadence Design System, Inc.'s Spectre transistor level simulator are plotted for comparison.

The test case used to generate the plots of FIG. 7 was three stages of AND gates coupled in series together with an interconnect network with a maximum span of 200 microns (μm). An AND gate is a multi-CCC standard cell with its driver stage being an inverter. The ramp input voltage waveform $V_i(t)$ 701 coupled to the input of the multi-CCC standard cell in the first stage had a slew rate of 100 pico-seconds (ps). The other curves plotted in FIG. 7 are pairs of curves both generated at the following stages: input voltage $V_i(t)$ 702 at stage 2, input voltage $V_i(t)$ 703 at stage 3, and output voltage $V_{out}(t)$ 704 at the output port of stage 3. The calculated results from the static timing analysis using the digital delay calculator and the simulated results of the transistor level simulator are substantially similar such that the pairs of curves are indistinguishable from each other at each stage.

Figure 8:
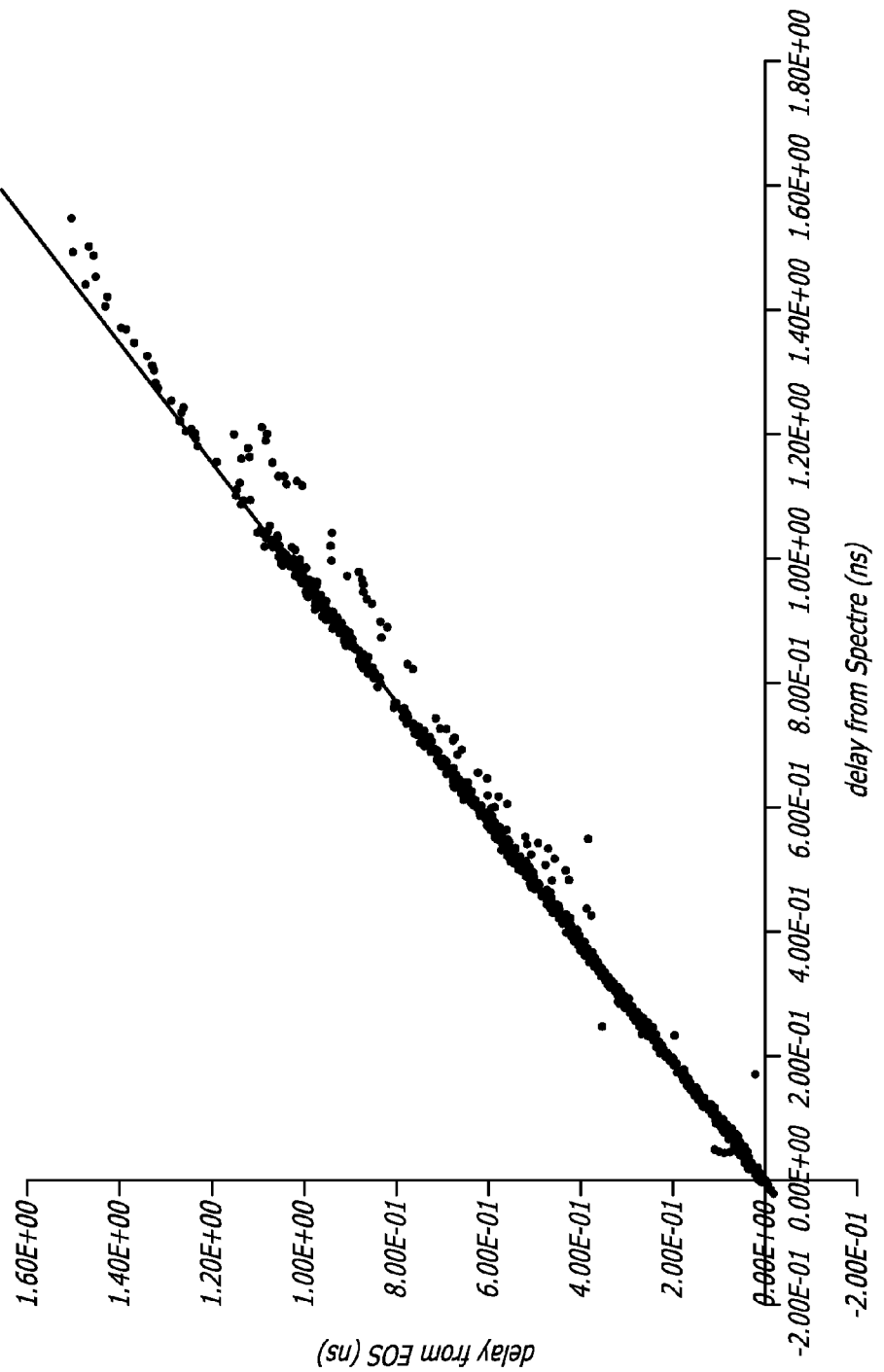
FIG. 8 shows the timing delays obtained from the static analyzer using the multi-CCC current source model in comparison with the spice transistor level circuit simulator.

Referring now to FIG. 8, a plot of timing delays calculated with the delay calculator (EOS) versus those simulated with a spice transistor level simulator, such as Spectre simulator by Cadence Design Systems, Inc., is illustrated. A forty-five degree line illustrating a perfect match is also drawn to see how well the static timing results match that of the transistor level simulated results. As shown in FIG. 8, the timing delay determined using delay calculator (EOS) with a multi-CCC current source model substantially matches the timing delay simulated by the Spectre transistor level simulator in most cases.

While the output results of the static timing analysis may be substantially similar, there may be other cases where a lesser level of accuracy may be acceptable. Depending on the usage scenario, different applications may need different levels of accuracy. For example, during cell placement, we may want to perform delay calculations using lookup models without considering any signal integrity issue. However during sign-off of an integrated circuit design for manufacture, it may be desirable to calculate the timing delays with noise effects using the fully extracted parasitics. For some critical paths, the most accurate delay calculations may be desirable with results substantially similar to that achieved using a SPICE transistor level simulation. The software infrastructure of static timing analyzer EOS with the multi-CCC current source model can support such different usage scenarios.

Concurrent Crosstalk Noise and Delay Calculations

With smaller geometries and larger numbers of switching transistors and gates in integrated circuits, accurate and efficient calculation of delay and crosstalk effects has become more important in the design of integrate circuits.

Crosstalk noise may be analyzed concurrently with timing delays by modeling the noise effects using a current source. This additional current source, along with a voltage dependent current source modeling a switching or static driver of the victim net and reduced-order model for the interconnect, allows for an efficient calculation of noisy transitions and noise glitches on the victim nets. In this manner, multi-CCC current source models may be used to model noise and timing delays.

U.S. Pat. No. 7,359,843 issued on Apr. 15, 2008 to inventors Igor Keller, et al., entitled ROBUST CALCULATION OF CROSSTALK DELAY CHANGE IN INTEGRATED CIRCUIT DESIGN and incorporated herein by reference, introduces sources of noise in a circuit and one method of analyzing the noise aggressors therein. However, it is desirable to concurrently compute timing delays and other noise effects in a circuit due to noise sources such as crosstalk noise from noise aggressors.

Figure 25:
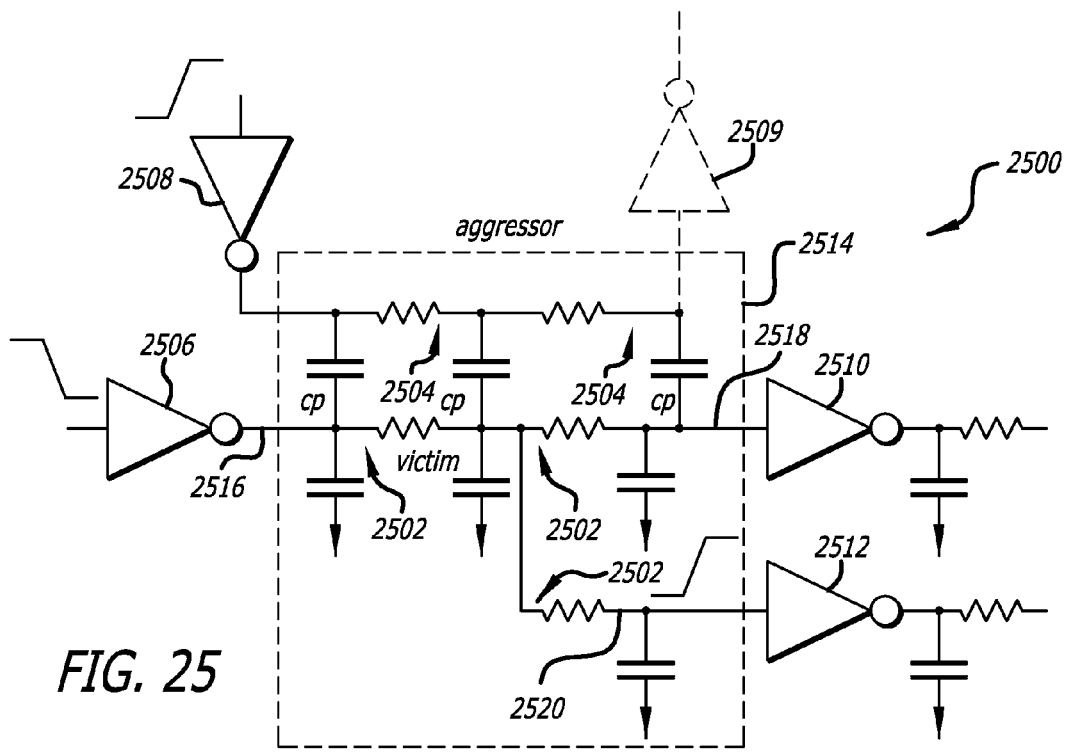
FIG. 25 illustrates a schematic diagram of a circuit stage with one or more noise aggressor drivers coupled to a victim interconnection network between a victim driver and one or more receivers.

FIG. 25 illustrates an exemplary circuit stage 2500 that includes a victim net 2502 and a single aggressor net 2504. A victim net driver 2506 is connected to drive the victim net 2502. An aggressor net driver 2508 is coupled to drive the aggressor net 2504. Parasitic capacitances $C_P$ couple the victim and aggressor nets 2502, 2504. The victim net 2502 is coupled to two receivers 2510, 2512. Dashed lines 2514 enclose an interconnect network 2514 comprising victim net 2502 and aggressor net 2504. In operation, signals are propagated through the interconnect network 2514 from an output node 2516 of victim net driver 2506 to respective input nodes 2518, 2520 of receivers 2510, 2512. It will be appreciated that in order to avoid obscuring this disclosure in unnecessary detail, only a single aggressor net 2504 is shown. In a typical stage, however, a victim net may be impacted by multiple aggressors, sometimes ten or more of them. Moreover, to simplify the description, the victim net 2502 is shown to have only a single driver 2506 and to be connected to only two receivers 2510, 2512, although an actual victim net may have several drivers and connections with more than two receivers.

The effect of a switching aggressor on a victim is proportional to the slew rate of transition of on the aggressor. In one embodiment, rising edge slew rate is defined as time required for a rising signal to transition from 20% of supply voltage (Vdd) to 80% of Vdd, and then divided by 0.6. Similarly, the falling edge slew rate is defined as time required for a falling signal to transition from 80% of Vdd to 20% of Vdd, and then divided by 0.6.

The effect of aggressor's crosstalk onto a victim's steady state or transition times is roughly proportional to signal transition rates (slew rates) on the aggressor's net, that in turn are proportional to effective load seen by the aggressors' drivers. That is, the slew rate on an aggressor depends on the coupling capacitance between the aggressor and the aggressor's neighbors, as well as the strength of drivers holding the aggressor's neighbors (i.e., second-order aggressors). Due to the high ratio of coupling capacitance to ground capacitance of wires in modern process nodes, it is important to account for second-order aggressors (aggressors of aggressors of a victim) when calculating crosstalk effects on the victim net.

Neglecting (decoupling) the second-order aggressors effectively increases the load. Depending on the magnitude of the coupling capacitance between an aggressor and its aggressors, the error of slew rate due to such decoupling can be significant. Thus, second order aggressors may be accounted for when determining aggressor slew rate.

A first order aggressor is an aggressor net that has a significant crosstalk influence on a given victim net. A second order aggressor is an aggressor net that has significant influence upon a transition waveform (or slew rate) on a first order aggressor of the given victim net. It is possible that an aggressor net may serve as both a first order aggressor and a second order aggressor relative to a given victim net. The consideration of second order aggressor effects can contribute to more accurate delay change analysis.

Figure 26C:
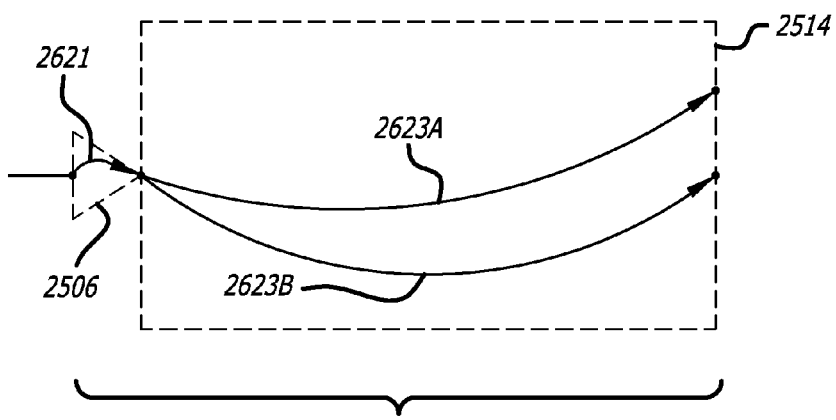
FIGS. 26A-26C illustrate a schematic diagram of a circuit stage with noise aggressor drivers, a block diagram of how the circuit stage may be modeled, and a timing subgraph of a timing graph with timing arcs associated with the circuit stage.
Figure 26A:
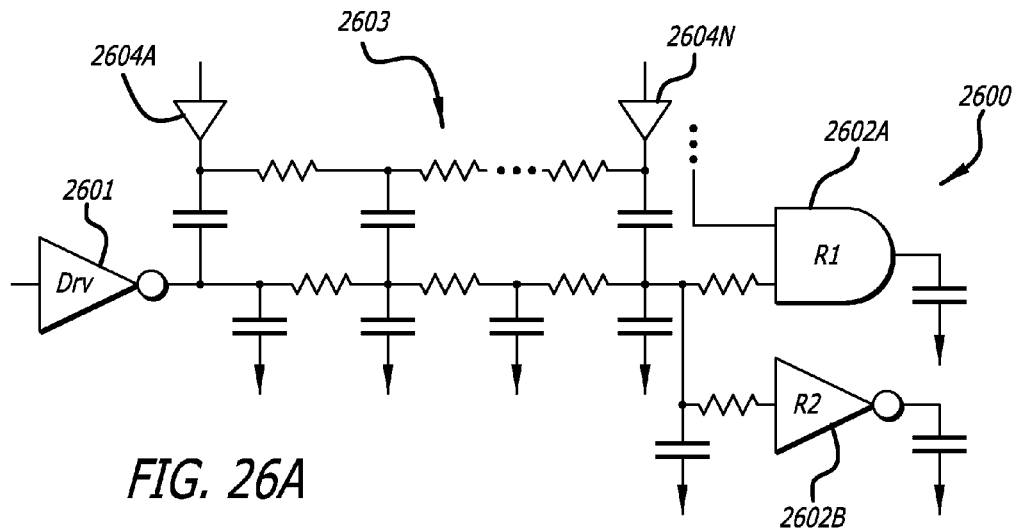

Referring now to FIG. 26A, each stage of a circuit (circuit stage 2600) may have a logic gate, such as a buffer or driver 2601 with some interconnect 2603 (with or without one or more aggressor drivers 2604A-2604N and an aggressor net) to couple the output of the driver to one or more receiving logic gates, such as an AND gate 2602A and/or inverter 2602BN. Each stage of the circuit (circuit stage 2600) may be modeled for static timing analysis to reduce the run time in determining timing delays.

Figure 26B:
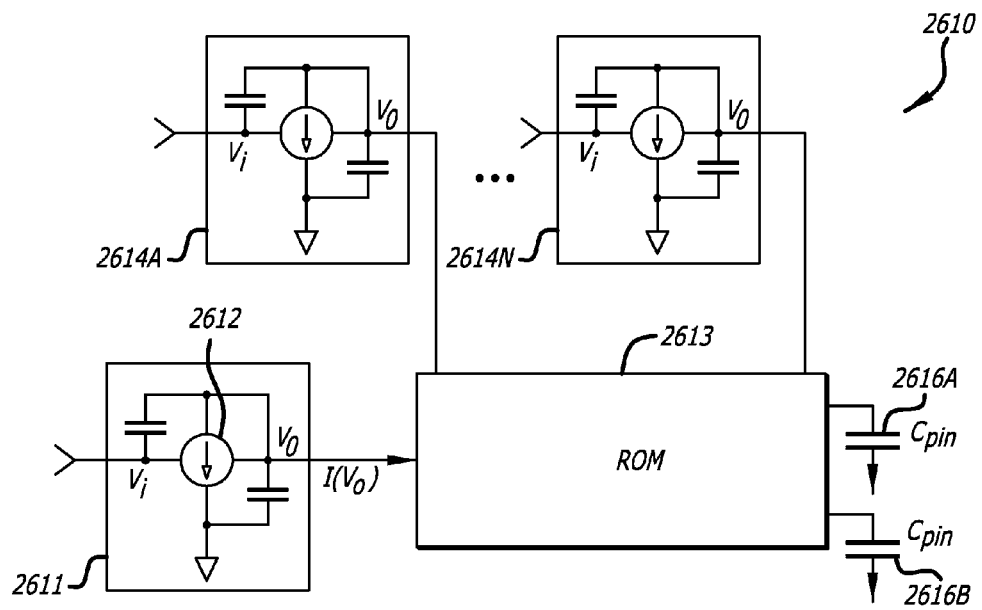

FIG. 26B illustrates a modeled circuit stage 2610 that may be used to model each stage of a circuit. For example, the driver 2601 illustrated in FIG. 26A can be modeled by a multi-CCC current source model 2611. The multi-CCC current source model 2611 includes a current source 2612 to model the switching of the driver 2601. The one or more aggressor drivers 2604A-2604N may be modeled by one or more multi-CCC current source models 2614A-2614M that include a current source to model noise and its effects on each stage of a circuit. In this manner, the concurrent computation of timing delay with noise effects may be made to determine a base timing delay and a noise related timing delay. The one or more aggressor drivers 2604A-2604N may be filtered or differentiated into weak aggressor drivers and strong aggressor drivers. The strong aggressor drivers may be directly modeled by the respective ones of the one or more multi-CCC current source models 2614A-2614M. The weak aggressor drivers may lumped together by an algorithm into one or more virtual aggressor drivers that can be respectively modeled by one or more of the multi-CCC current source models 2614A-2614M.

The interconnect 2603 illustrated in FIG. 26A can be modeled by a reduced-order model (ROM) for interconnect. U.S. Pat. No. 7,359,843 issued on Apr. 15, 2008 to inventors Igor Keller, et al., entitled ROBUST CALCULATION OF CROSSTALK DELAY CHANGE IN INTEGRATED CIRCUIT DESIGN, previously incorporated by reference, generally describes how the interconnect 2603 with an aggressor may be modeled with a reduced order model. The input load of the one or more receiving logic gates 2602A-2602B illustrated in FIG. 26A may be respectively modeled by one or more capacitors 2616A-2616B.

Generally, noise effects and timing delay of a circuit stage may be concurrently computed for static timing analysis of integrated circuit designs by using multi-CCC current source models for drivers of victim nets and aggressor nets. In order to compute the delay in the presence of noise in general one has to simulate the stage's circuit with victim and aggressor nets undergoing transition. Such a simulation is performed for each timing arc of the victim gate. In addition, the alignment of aggressor transitions relative to victim transition and each other which gives the worst-case delay is not known prior to simulation, and has to be found in iterations. The need for a plurality of simulations on a larger circuit (which includes coupled RC network and aggressors' drivers) may be a computationally expensive task. However, many stages exhibit weak coupling between victim and aggressor nets, in which case a perturbation method can be employed. In this case, the noise impact of each aggressor on victim can be found independently of other aggressors. Due to the weak noise effect and usually even weaker non-linear interaction between aggressors, the independent results from each aggressor driver may be aligned together to compute the transition in the signal on the output of the victim driver due to the impact from all the aggressor drivers. This linearly superimposed combined noise effect may be very close to the one computed from a full nonlinear simulation, but is much less expensive to compute. Furthermore, a relatively inexpensive perturbation method may then be used to compute the changes in the timing delay of the victim driver when switching due to the combined noise effects of all the aggressor drivers for the circuit stage.

Crosstalk analysis includes glitch calculations as well as calculations of the effects of crosstalk noise on timing delay of a circuit. The approach to crosstalk analysis undertaken herein is different from other approaches in that (i) it is based on a unified analysis infrastructure, used for both base delay calculations and crosstalk analysis; (ii) it is based on a mathematically more rigorous formulation; and (iii) it is more efficient since it may use perturbation methods to find a response (or transition) in the presence of weak noise.

Crosstalk analysis is performed on a circuit stage which is a (usually small) part of a digital circuit consisting of a victim net and one or more aggressor nets coupled via capacitance to the victim net and their corresponding driving gates (victim driver and aggressor drivers). The receiving gates coupled to the victim net are typically not considered to be part of the circuit stage, but their parasitic effects on delay of the output of the circuit stage may be modeled using gate capacitance.

Transitions on the aggressor nets affects a victim net in two situations: (i) when the victim driver is at a steady state, transitions on aggressors generate a glitch which can propagate further on and cause a logical failure in a sampling flip-flop (FF); and (ii) when the victim driver is transitioning, the switching aggressor drivers may speed up or slow down the victim net transition potentially causing a timing violation at the output of the circuit stage.

In the framework of static crosstalk/timing analysis, a worst-case configuration is sought in the circuit stage for which the crosstalk effect is a maximum under certain constraints. The constraints are switching windows (SW) or timing windows for victim driver input transitions and aggressor driver input transitions and the logical relationships between aggressor nets and victim nets. This gives rise to a couple of complexity factors in a crosstalk analysis of the circuit stage: (i) that the worst-case alignment between victim and aggressor transitions is not known in advance and is found through a multi-dimensional nonlinear optimization; (ii) that for each optimization step, a solution of a set of ordinary differential equations (ODEs) is to be determined for the sub-circuit stage. The set of ordinary differential equations (ODEs) to be solved may be large as it includes the coupled RC networks for the victim net and aggressor nets and their respective driver cells.

In accordance with embodiments of the invention, calculation of noise effects (noise glitch and delay change due to noise) is performed concurrently with the calculation of delay for each delay arc. The noise effects are computed inside a loop over cell timing arcs or edges of a timing or design graph, and included into the full timing delay that is passed to the static timing analysis tool. That is, the analysis of the noise sources is concurrently performed by a delay calculator in such a way that the noise effects on timing delay are included in the step where the cell and interconnects delays are computed. In this manner, the delay calculator can pass full timing delays to a static timing analysis tool, including noise effects.

To concurrently analyze noise and delay, the delay/SI calculator 102 in FIG. 1A works on a net level abstraction. It deals with computing the signal propagation delay through each edge or timing arc of a design or timing graph. Typically, the computation is performed for a set of related edges, where all the edges are formed based on a cell driving a net. The set of related edges is often referred to as a stage. The delay/SI calculator creates an electrical view of a stage and then computes all required electrical calculations on this stage by performing appropriate electrical simulations.

Referring now to FIG. 26C, an exemplary portion of a design or timing graph, a subgraph 2620 corresponding to a circuit stage is illustrated. The subgraph 2620 and the overall timing graph includes driver based timing arcs 2621 associated with drivers 2601 and interconnect based timing arcs 2623A, 2623B associated with the interconnect network from each driver 2601 to each input of the receivers 2602A, 2602B.

Referring to FIG. 27, a timing analysis method is illustrated for concurrently computing noise effects and the overall timing delay.

At block 2701, the analysis begins by forming a stage of a circuit around a victim net being analyzed, such as the circuit stage 2500 shown in FIG. 25. The stage of the circuit is a sub-circuit of an overall integrated circuit design. The stage 2500 of the circuit includes a victim net 2502, its drivers 2506 and receivers 2510, 2512; parasitic resistance and capacitance of the interconnect network 2502; aggressor nets 2504; and the aggressor drivers 2508 and aggressor receivers 2509, if any.

An initial model of the circuit stage is formed, such as shown by FIGS. 26A-26B that were described previously. The model circuit of stage is created including models of interconnect parasitics 2613, driving gate 2611, and receiving gates 2626A-2616B. A method of forming the initial model of the circuit stage is illustrated in detail by FIG. 28.

Figure 28:
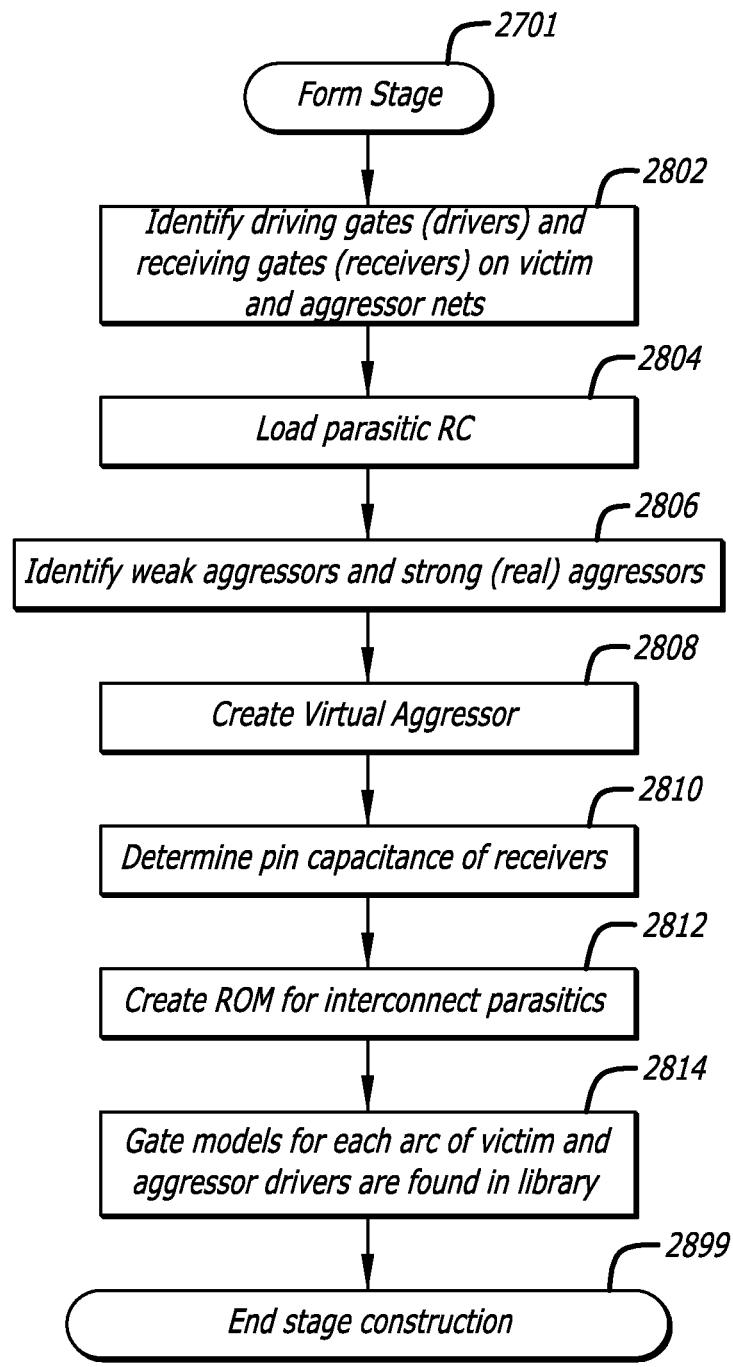
FIG. 28 illustrates a flow chart diagram detailing the initial formation of the model of the circuit stage for concurrent noise and delay analysis.

Referring now to FIG. 28, at block 2802, the victim drivers 2506 and receivers 2510, 2512; and the aggressor drivers 2508 and receivers 2509, if any, are identified in the circuit. The process then goes to block 2804.

At block 2804, the parasitic resistance and capacitance of the interconnect network 2502 is read and loaded. The process then goes to block 2806.

At block 2806, out of all the identified aggressor nets 2504, a subset are identified as being strong aggressor nets whose R and C elements are included into the coupled parasitic RC network of the victim net. The aggressor nets which are not identified as strong are referred to as being weak. The weak aggressor nets are modeled in a different way by using a virtual aggressor method that lumps them together into one or more virtual aggressors to simplify calculations. A method of filtering the weak aggressors from the strong aggressors 2504 may be selected by a user to determine the real aggressor nets and drivers whose R and C elements are included into the coupled parasitic RC network of the victim net. Constraints may be selected by a user to be used with the filtering method to determine the strong (real) aggressor drivers. After differentiating between the strong aggressors and the week aggressors, the process then goes to block 2808.

At block 2808, a virtual aggressor may be formed to model and simplify the selected set of weak aggressors. Various methods of lumping weak aggressors together may be used to simplify computations with little loss in accuracy. For example, a virtual aggressor may be formed by (i) connecting the driver nodes of the weak aggressors together; (ii) eliminating (setting to zero or shorting out) the wire resistance in the weak aggressor nets; (iii) lumping capacitors in the weak aggressors connected to the same node in the victim net together into a single capacitor, with a capacitance value determined by various factors, such as the total number of weak aggressors. The formation of virtual aggressors is further described in U.S. patent application Ser. No. 11/417,862 entitled SYSTEM, METHOD AND COMPUTER PROGRAM PRODUCT FOR HANDLING SMALL AGGRESSORS IN SIGNAL INTEGRITY ANALYSIS filed by Igor Keller et al. on May 4, 2006, which is incorporated herein by reference. Accordingly, all the gate models of the drivers of the weak aggressors may be lumped together to form a model of the driver of a virtual aggressor. One such driver model may be a Thevenin model, a voltage source coupled to the virtual aggressor responsive to the slew rates of all the weak aggressor to approximate the current waveform induced by all the weak aggressors when switching together. The process then goes to block 2810.

At block 2810, the inputs (pins) of the receivers 2509,2510, 2512 to which the output of the victim driver 2506 is coupled are evaluated to determine the input capacitance of the receivers which may be selectively modeled by capacitors, such as capacitors 2616A-2616B respectively modeling receivers 2602A-2602B illustrated in FIGS. 26A-26B. The process then goes to block 2812.

At block 2812, the reduced order interconnect model 2613 modeling the interconnection network 2514 between the victim driver 2506 and the receivers 2510, 2512 is generated. The reduced order model 2613 includes the interconnect parasitic resistance and capacitance between the victim driver 2506 and the receivers 2510,2512; and between the aggressor driver 2508 and the receivers 2510,2512. Depending upon how the aggressor driver 2508 is selectively modeled, a parasitic device (e.g., a capacitor and/or resistor) may be included as part of the reduced order interconnect model 2613 to model the aggressor driver 2508. The process then goes to block 2814.

At block 2814, gate models for victim drivers 2506 and aggressor drivers 2508 for each timing arc in the timing graph of the circuit are read from a physical cell library representing a plurality of logic gates that may be instantiated into an integrated circuit design. There may be a plurality of user-selectable gate models from which a user may select to model each victim driver and aggressor driver in the circuit stage. Depending upon the user-selection, the appropriate gate models for each victim driver and aggressor driver in the circuit stage are read from the physical cell library.

The process then goes to block 2899 and upon completion of forming the initial circuit stage model returns to the method disclosed by FIG. 27. The assembled modeled components of the initial circuit stage model then undergo further analysis/characterization to simplify the circuit stage and speed up a static timing analysis that is to be performed on the larger integrated circuit design including the circuit stage.

Generally, the circuit stage may be described by the following set of ordinary differential equations (commonly referred to as a state-space system) allowing one to calculate voltage waveforms on all nodes of interest (particularly the outputs of the circuit stage coupled to the receiver input pins) as follows:

$$E\frac{dx}{dt} = Ax + Bu \tag{29}$$

$$v = Cx \tag{30}$$

In this set of state space equations, Eqs. (29) and (30), x is the vector of states for the circuit stage; A, E, B, C are state space matrices formed during resistor-capacitor (RC) interconnect network reduction (ROM generation); v is a vector of voltages at the taps (inputs to the final receivers of the stage) and ports (outputs of drivers of the stage); and u is a vector of current sources at the inputs of the circuit stage to model the victim driver and/or the aggressor driver. The state space equation system describes port and tap voltage responses v to nonlinear current source(s) u connected at port(s) of the RC network.

In general the nonlinear current sources attached to each port are nonlinear functions of time and (unknown) voltage at that port: $u_n = I_n(t, v_n)$. Additionally, the current sources used to model the aggressor drivers have an additional parameter which may shift over time, reflecting the fact that transition at aggressor input can occur within certain timing or switching windows (SW). The current source for the $k^{th}$ aggressor is described by the equation $u_k = I_k(t - \tau_k, v_k)$, where k is the shift parameter for the $k^{th}$ aggressor.

Calculation of the voltages on the terminals (ports and taps) of the circuit stage may be performed by a numerical integration of state space equations Eqs. (29) and (30) which can be very expensive. However, due to the special structure of the matrices A and E, a perturbation method may be used to solve the state space equations more efficiently to determine the voltages.

The general idea of the perturbation method is separation the original problem into several simpler problems, which can be solved much more efficiently with little or no loss of accuracy. In the particular, the application of the original problem of calculating a response to simultaneous transitions of victim and aggressor nets is separated into two (or more) simpler problems.

The first problem describes a transition on only the victim net to calculate a base delay with the aggressor nets being quiet. The noiseless responses and corresponding delays can therefore be determined from the first problem which is much simpler and easier to solve than the original problem.

The crosstalk effects, which are considered to be perturbations of the noiseless solution, are determined from the second problem which models the switching aggressors. The second problem provides for crosstalk-induced adjustment to the noiseless solution found from the first problem.

At a high-level of description, the perturbation method is based on a mathematical expansion of unknown quantities in a series, such as:

$$x = x^{(0)} + x^{(1)} + \ldots \tag{31}$$

$$v = v^{(0)} + v^{(1)} + \ldots \tag{32}$$

Eq. 31 for the vector of states x and Eq. 32 for the vector of voltages v at ports and taps, respectively.

The system of state space equations Eqs. (29) and (30) are also expanded in series, yielding a set of problems to be solved sequentially. As described above, the expansion of the original problem is carried out in such a way such that the first problem describes a noiseless situation, where aggressor drivers are quiet, and the crosstalk effects are obtained from the second problem. Accordingly, the excitation vector u may be expanded as well as follows:

$$u=u^{(0)}+u^{(1)}+\ldots \quad (33)$$

In the expansion of the excitation vector u, the first term $u^{(0)}$ is the excitation vector for the first problem, containing only the current source to model the victim driver: $u^{(0)}=\{I_1(t,v_1^{(0)}), 0, \ldots, 0\}$. Here the only non-zero element of the vector of sources represents the current source attached at the $1^{st}$ port modeling victim's driver. The corresponding first-order problem becomes:

$$E\frac{dx^{(0)}}{dt}=Ax^{(0)}+Bu^{(0)} \quad (34)$$

$$v^{(0)}=Cx^{(0)} \quad (35)$$

The second term $u^{(1)}$ in the expansion of the excitation vector includes current sources modeling the aggressor drivers as well as a correction current through the victim driver due to crosstalk effects as follows:

$$u^{(1)}=\{v_1^{(1)}g_{ave},I_2(t-\tau_2,v_2^{(0)}),\ldots,I_k(t-\tau_k,v_k^{(0)}),\}. \quad (36)$$

Here, $g_{ave}$ is the average small signal admittance of the victim driver model computed as $g_{ave}=<g_1>$, where $<..>$ denotes time-averaging, and $g_1=dI_1(t,v)/dv|_{v=v_1^{(0)}}$. The other terms in the source vectors are current sources at ports 2, ..., k, representing switching aggressor drivers. These current sources are shifted by corresponding alignment parameters $\tau_k$ which need to be chosen to maximize effect of noise (for example glitch height or delay change). The second-order problem has the form:

$$E\frac{dx^{(1)}}{dt}=Ax^{(1)}+Bu^{(1)} \quad (37)$$

$$v^{(1)}=cx^{(1)} \quad (38)$$

The solution of the problem given by Eqs. (37, 38) is the noise-induced correction of the noiseless solution, $v^{(0)}$. Since the problem (37, 38) is linear and autonomous, its solution can be found using superposition of properly aligned solutions of the following problems, each defining a response from single aggressor switching:

$$E\frac{dx^{(1)}}{dt}=Ax^{(1)}+Bu_k^{(1)} \quad (39)$$

$$v_k^{(1)}=Cx^{(1)} \quad (40)$$

Here in Eqs. (39), (40) the subscript "k" denoted the problem and corresponding solution for the k-th problem (defined for k-th aggressor); source vector is $u_k^{(1)}=\{v_{0,k}^{(1)}g_{ave},0,..0,I_k(t),0,\ldots 0\}$, and the correspondent solution $v_k^{(1)}$ is a vector of port and tap voltages due to k-th aggressor switching, and $v_{0,k}^{(1)}$ is the voltage response to the k-th aggressor at the victim's port. Since the system is autonomous, any time-shift in the source causes same time shift in the response, hence the combined response due to all aggressor properly aligned becomes:

$$v^{(1)}=\Sigma v_k^{(1)}(t-\tau_k) \quad (41)$$

The linearly combined solution (41) depends on the alignments of each aggressor, which now can be determined from the condition that the corresponding victim response has certain maximized criterion, such as glitch height, or delay. Once the worst-case alignment vector is found, it can be used to refine the solution by either computing higher-order correction to the response, or by performing a full nonlinear simulation with all aggressors properly aligned and switching.

In this manner, using the perturbation approach to solving the equations, the effect of crosstalk on victim transitions is initially computed separately for each aggressor, and then linearly or nonlinearly combined with the noiseless transition (solution of the first problem) or the base solution. The corrections to the solutions of the state space equations due to non-linear interactions between the victim and aggressors drivers may be found from the high-order problems formulated using the next terms in the expansion, similar to the expansion of terms shown by Eqs. (31), (32), and (33).

Referring now back to FIG. 27, further analysis of the circuit stage is undertaken using the state space system.

At block 2702, iterations of computations are performed for each victim driver of the victim net. For each victim driver, base timing delays are computed for each timing arc in the timing graph from the victim driver to the input of each victim receiver. The base delays of each timing arc are computed using the state space equations without any current source modeling an aggressor driver. To compute base delays of each timing arc, Eqs. (34) and (35) are used. That is, the base delays are computed for each timing arc in the circuit stage without regard to the noise from an aggressor driver. The process then goes to block 2706.

At block 2704, a determination is made to be sure all victim drivers in the circuit stage have been considered to compute base delays and complete the computation loop over blocks 2702 and 2704. The process then goes in parallel to block 2711 where the base delays for each timing arc of the timing graph is annotated to the netlist of the circuit cell library and to block 2705 if noise effects on the circuit stage are to be considered.

Blocks 2705-2712 are used to determine noise effects on the circuit stage. If noise is not being considered, blocks 2705-2712 may be skipped, as illustrated by the parallel path directly from block 2704 to block 2715.

At block 2705, for each of the one or more aggressor drivers 2508, the glitch response of the circuit stage is computed using the state space equations of Eqs. (39) and (40). Holding other inputs in a steady state, each aggressor driver 2508 is independently modeled and its input switched to determine how it affects the signal (e.g., generating a glitch in the signal) that is input into each receiver 2510,2512. The circuit stage described by the state space equations is simulated to determine the glitch response when the vector u representing the current source of the aggressor driver changes. In order to compute the glitch response of the circuit due to the k-th aggressor, denoted above by $v_k^{(1)}$ all but the (k+1)-th current source term in the current source vector u of the state space equations are ignored.

At block 2706, a determination is made to be sure all aggressor drivers in the circuit stage have been considered to complete a computation loop over blocks 2705 and 2706. The computation loop of blocks 2705-2706 are used to determine glitch responses over all the receiving gates and timing arcs from the driver to each receiver. After competing the computation of the glitch responses, the process then goes to block 2707.

At block 2707, iterations for each receiver coupled to the victim net is initially performed. For each receiver, the input signals to the input of the aggressor drivers are aligned with the input signal to the victim driver in response to the respective glitch responses previously computed in block 2705. The method of alignment may be user selectable, such as described herein with reference to FIG. 30, for example. Alternatively, the alignment may be performed in such a way so as to maximize a certain objective given by a predefined metric. For example, the objective may be to determine alignment of the aggressor input signals with the input signal to the victim driver that generates the worst case glitch in the input signal to the receiver. As another example, the objective may be to determine alignment of the aggressor input signals with the input signal to the victim driver that generates the worst case delay in the input signal to the receiver. After the aggressor input signal alignment with the input signal to the victim driver is determined, the process may go to block 2708.

At block 2708, a determination is made to be sure all receivers in the circuit stage have been considered for determining the alignment of the input signals to the aggressor drivers. If not all receivers have been considered, the process loops back to repeat block 2707 for the remaining receivers in the circuit. If all receivers have been considered, the process goes to block 2709.

At block 2709, the aligned glitch responses are linearly summed up together to determine a combined first order noise effects on the circuit stage. If the level of the combined first order noise effects is below a user defined threshold, second order noise effects may be ignored. The process goes to block 2310 to make such determination.

At block 2710, a determination is made as to whether or not the computed level of the combined first order noise effects is below a user defined (pre-determined) threshold. If so, the process may skip block 2711 and go to block 2712 directly. If not, the level of the second order noise effects may be significant and the process goes to block 2711 to make such computations. The process is more efficient if the second order noise effects can be skipped.

At block 2711, a combined nonlinear simulation of the circuit stage is performed using Eqs. (29), (30) to compute the responses of the circuit stage to concurrent switching of all the input signals of the circuit stage. The input signals to the aggressor drivers are switched in accordance with the alignment determined previously in block 2707. This causes all the current sources in the current vector u to be turned on and the state space equation is solved to compute the response of the circuit stage thereto. As the simulation of the circuit stage to the aggressor drivers is typically non-linear, the computed voltage response of the circuit stage at the inputs to the receivers is expected to be non-linear in this case as well. After the output responses for the circuit stage are computed in response to the one or more worse case aggressor input alignments, the process goes to block 2712.

At block 2712, the output responses from the circuit stage in response to the noise sources generated by aggressor drivers and aggressor input signal alignments may be interpreted with an objective measure to determine the overall glitch response and delay in the circuit stage to signal switching and noise. The object measure to interpret the responses may be user selectable. As the output responses from the circuit stage in response to the one or more worse case aggressor input alignments are non-linear, they may be interpreted with different objective measures for glitch and timing delay. For example, an objective measure for glitch may be thirty percent of the power supply voltage while an objective measure for timing delay may be fifty percent of the power supply voltage. After the responses have been interpreted, the interpreted responses may be saved into a database associated with the circuit stage, such as a cell library. The process goes to block 2715.

At block 2715, the interpreted responses to glitch and timing delay in presence of the noise effects are annotated onto the timing graph of the netlist of the given circuit stage and saved into a database for use by a static timing analysis tool. The static timing analysis tool may be used to determine the overall timing delays in a larger or complete integrated circuit design with the model and the saved responses. The annotation of the results to the netlist substantially completes the model of the given circuit stage for use in static timing analysis. Other circuit stages with different gates and interconnect may be similarly modeled and characterized. Otherwise, the process may go to block 2799 and end.

Flexible Noise Analysis Methods

There are a number of different methodologies that are available to analyze noise and the noise-on-delay effects that have been adopted by users and EDA software vendors. However, each of these methods is typically rigidly applied to the circuit analysis for noise and noise-on-delay analysis. Until now, a single flexible solution that can support a plurality of possible (useful) solutions has been a challenge. A flexible noise analysis method is now described that can be tuned for various methodologies to analyze noise and the noise-on-delay effects in a circuit.

Figure 29:
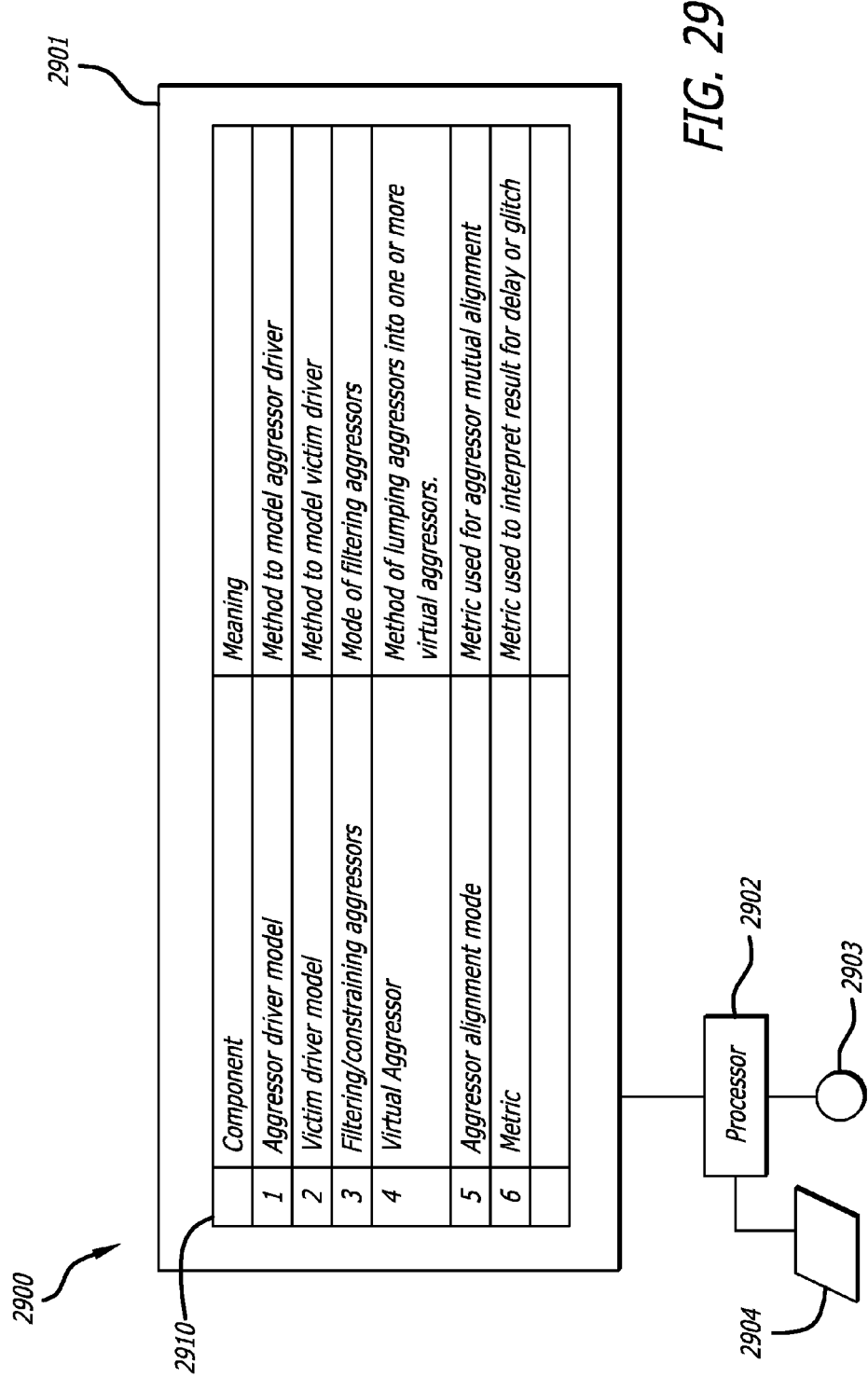
FIG. 29 illustrates a table of components for a flexible noise analysis method of a circuit stage.

Referring now to FIG. 29, a computer system 2900 is illustrated for providing timing and noise analysis of an integrated circuit. The system 2900 may include a display device 2901, a processor 2902, a processor readable storage medium 2903, and an input device 2904. Software instructions may be stored in the processor readable storage medium 2903 for execution by the processor 2902. The software instructions may have the processor 2902 display a user interface 2910 on the display device 2901. The user interface 2910 may display a plurality of selectable choices that are selectable by a user through use of the input device 2904. The user interface 2910 may be used to facilitate the flexible noise analysis methods now described.

The method of analyze noise and the noise-on-delay effects in a circuit stage may be partitioned into independently controlled components, such as an aggressor driver model, a victim driver model, aggressor filtering/constraining, a virtual aggressor driver, aggressor aligning, and a metric or objective measure of the noise effects on the circuit. With a flexible noise analysis method provided by EDA software, each of these components may have a plurality of choices displayed on a display device by the user interface 2910 that are selectable by a user with the input device 2904.

Generally, a user selects from a plurality of methods of modeling an aggressor driver as the aggressor driver model component. A user selects from a plurality of methods of modeling a victim driver as the victim driver model component. A user selects from a plurality of modes of filtering aggressors as the aggressor filtering/constraining component. A user selects from a plurality of metrics used for aggressor mutual alignment as the aggressor alignment mode component. A user further selects from a plurality of metrics that may be used to interpret the results of timing delays or timing glitches in a signal as the metric component for objectively measuring the noise effects on a circuit.

More specifically, the aggressor driver model component of the flexible noise analysis method is used to select the aggressor driver model when using the state space equations Eqs. 29 and 30 for computing the glitch response on the receivers (2705) and the timing delay (2709) in signals including noise coupled into the receivers.

Aggressor driver models for an aggressor driving gate (2508) that may be selected by a user for the aggressor driver model component include two or more of a voltage source, a linear current source, a non-linear current source, and a transistor-level netlist.

The selection of the aggressor driver model can affect the accuracy and the run time of the noise analysis. However, the selection of the aggressor driver model for the aggressor driver model component of the flexible noise analysis method is independent from the selection of the other components. That is, the selection of the victim driver model, the aggressor filtering/constraining, the aggressor aligning, and the objective measure of the noise effects on the circuit are not dependent upon the choice made for the aggressor driver model component.

The victim driver model component of the flexible noise analysis method is used to select the victim driver model when using the state space equations Eqs. 29 and 30 for computing the glitch response on the receivers (2705) and the timing delay (2709) in signals including noise coupled into the receivers.

Victim driver models for the victim driving gate (2506) that may be selected by a user for the victim driver model component include two or more of a linear current source, a non-linear current source, and a transistor-level netlist.

The aggressor filtering/constraining component of the flexible noise analysis method is used to select a method of filtering or selecting a subset of aggressor drivers (2508) that are to be included in the noise analysis method for simplification, as well as, the constraints that are used in determining the worst-case alignment of aggressor driver switching relative to each other (2508) and to the switching of the victim driving gate (2506).

Possible methods for aggressor filtering include (a) using a timing window (TW) based overlap method to determine subgroups of aggressors that induce crosstalk; and (b) using a logical relation (e.g., AND) to determine a subset of aggressor drivers that can switch together. With the method selected, a set of constraints for the method may be to be used during alignment. FIG. 30 illustrates an exemplary use of aggressor switching timing windows.

Referring now to FIG. 30, an exemplary method of aligning aggressor drivers and their input signaling is illustrated. FIG. 30 illustrates three aggressor timing windows Agg1 3001, Agg2 3002, and Agg3 3003 plotted along a time axis with respect to a clock signal CK1 for three aggressor drivers. An aggressor timing window represents a time period with respect to the clock signal CK1 over which the input to the respective aggressor driver may switch to inject noise into an input of a receiver. Two or more aggressor timing windows may overlap to form various time ranges 3011-3015 along the time axis. For each of the various time ranges, a list may be formed indicating the aggressors that are capable of switching within the respective time range. For time ranges 3011, 3013 and a non-overlapping portion of the timing window 3001, only the first aggressor driver Agg1 may switch. For the time range 3012, the timing windows 3001-3002 overlap such that the first aggressor driver Agg1 and the second aggressor driver Agg2 may switch during the time range 3012. A list including the first aggressor driver Agg1 and the second aggressor driver Agg2 may be formed for the time range 3012. For the time range 3014, the timing windows 3001 and 3003 overlap such that the first aggressor driver Agg1 and the third aggressor driver Agg3 may switching during this range. Accordingly, a list for the time range 3014 may be formed including the first aggressor driver Agg1 and the third aggressor driver Agg3. For time range 3015 and a non-overlapping portion of the timing window 3003, only the third aggressor driver Agg3 may switch. Accordingly, a list for the time range 3015 would include only the third aggressor driver Agg3.

The virtual aggressor component of the flexible noise analysis method is used to select a method of lumping the selected subset of aggressor drivers (2508) into one or more virtual aggressor drivers. For example, a first plurality of aggressor drivers may be lumped into a first virtual aggressor driver coupled to one end of the interconnect network while a second plurality of aggressor drivers may be lumped into a second virtual aggressor driver coupled to an opposite end of the interconnect network. As another example, every three aggressor drivers positioned along the interconnect network may be lumped into a virtual aggressor driver.

The aggressor aligning component of the flexible noise analysis method is a method and metric that is used for determining how to align the aggressor driver input signal switching to the victim input signal switching as described with block 2707 of FIG. 27.

The method of aligning the aggressor driver transitions relative the victim driver transitions is based upon (a) a metric or objective function that is maximized for indentifying the worst-case alignment, and (b) the method of how the constraints are to be applied. The objective function to evaluate a glitch response may be a maximum glitch peak, a maximum glitch area (energy), or a maximum delay based on a crossing time of transitions at a predetermined voltage threshold level between input signal and the resultant output signal coupled into a receiver; or the maximum glitch peak or maximum delay measured at the output of a receiving gate driving a nominal capacitive load where the output voltage response V(t) of the circuit stage (resultant output signal) is coupled to the input of the receiving gate.

Exemplary alignment methods/constraints include (a) a partial alignment method and (b) a binary alignment method. The binary alignment method involves overlapping windows of timing windows within the objective constraints such as shown by FIG. 30. The partial alignment method includes non-overlapping timing windows meeting the objective constraints. The non-overlapping timing windows may be aligned as close as possible within the objective constraints to form the worse case for the objective measure.

The metric component to determine an objective measure of the noise effects on the circuit component with the flexible noise analysis method is used to determine a mapping from the output voltage response V(t) of the circuit stage into a number M. The mapping is an objective optimization function (e.g., search for worst-case results). Exemplary metrics include glitch peak, glitch area (energy), and timing delay. The worst-case results may be the maximum glitch peak, the maximum glitch area (energy), and the maximum timing delay. The peak of the glitch in the peak in output voltage response from the circuit stage caused by the aggressor driver. The maximum glitch energy is the integration of the glitch in the output voltage response over time. The timing delay may be determined in a number of different ways. The timing delay may be determined by the time it takes the output voltage response from the circuit stage to cross over a predefined voltage threshold level. Instead of measuring at the output of the circuit stage into a receiving gate, the receiving gate may be used to assist in the metric by measuring at the output of the receiving gate coupled to a predetermined capacitive load. In this manner, the receiving gate drives the predetermined capacitive load in response to the output response of the circuit stage. The glitch peak, glitch area (energy), and/or timing delay may then be measured at the output of the receiving gate.

Conclusion

Concurrent calculation of noise effects and timing delay for a circuit stage within an integrated circuit can provide a more efficient static timing analysis. A separate computational step of determining noise-induced delay changes (incremental delays) and annotation to the timing graph can be avoided.

Pessimism in the overall timing analysis of an integrated circuit in the presence of crosstalk noise may be reduced as some of previous computational assumptions regarding noise effects need not be made. Noise effects are computed for individual timing arcs to provide improved results. A weakest timing arc need not be singled out from the set of timing arcs for a circuit stage to calculate a delay change due to noise effects.

With a concurrent noise and delay calculation, several computationally expensive steps of the analysis are shared to reduce run time. In contrast, if the base delay, glitch noise and delay changes were computed sequentially, significant duplication of simulations would be performed resulting in a high run time. In addition, the concurrent computational methods may be performed in parallel by parallel processors to further reduce the run time.

A flexible method of noise analysis may be provided with user selectable components to control the computational methods independently from one another. In this manner, the noise analysis flow can be easily tuned and adjusted in order to meet different users' methodologies and optimize the analysis by balancing the tradeoff between accuracy and runtime.

When implemented in software, the elements of the embodiments of the invention are essentially the code segments to perform the necessary tasks. The program or code segments can be stored in a processor readable medium that can be read and executed by a processor. The processor readable medium may include any medium that can store or transfer information. Examples of the processor readable medium include an electronic circuit, a semiconductor memory device, a read only memory (ROM), a flash memory, an erasable programmable read only memory (EPROM), a floppy diskette, a CD-ROM, an optical disk, and a magnetic disk. The program or code segments may be downloaded via computer networks such as the Internet, Intranet, etc and stored in the processor readable medium. When implemented as a system, the elements of the embodiments of the invention include a processor to execute the program or code segments that may be stored in a processor readable medium to perform the tasks or functions of a method or process.

The embodiments of the invention are thus described. While embodiments of the invention have been particularly described, they should not be construed as limited by such embodiments. Instead, the embodiments of the invention should be construed according to the claims that follow below.

What is claimed is:

1. A method of static timing analysis for an integrated circuit design in the presence of noise, the method comprising:
    partitioning the integrated circuit design into a plurality of circuit stages;
    constructing a timing graph representing the timing of the integrated circuit design, the timing graph including timing arcs representing delays in each of the plurality of circuit stages;
    forming a model of each circuit stage of the integrated circuit design each including a model of at least one victim driver, at least one aggressor driver, at least one receiver, and at least one victim net and at least one aggressor net coupled together; and
    for each timing arc in the timing graph, computing full timing delays for each timing arc in each circuit stage;
    wherein a processor carries out the partitioning, the constructing, and the forming.

2. The method of claim 1, wherein
the computing of the full timing delays includes
    concurrently computing base timing delays from the at least one victim net and noise related timing delay from the at least one aggressor net.

3. The method of claim 1, wherein
the computing of the full timing delays includes
    for each victim driver, computing a nominal response including base delays for each gate timing arc and interconnect timing arc from each victim driver to the at least one receiver in the circuit stage without noise from any aggressor driver;
    for each aggressor driver, independently computing a glitch response of the circuit stage at an input to the at least one receiver responsive to an input transition of the respective aggressor driver;
    in accordance with the glitch responses, shifting the input transition of the at least one aggressor driver with respect to the input transition of the at least one victim driver to substantially align the glitch responses with the nominal response of the circuit stage; and
    for each timing arc, combining all of the glitch responses together in response to the shifting of the input transitions to determine a combined noise effect and the full timing delay in the circuit stage.

4. The method of claim 3, further comprising:
determining if the combined first order noise effect on the circuit stage is less than a predetermined threshold and if so then
    interpreting the computed nominal response and the combined first order noise effects of the circuit stage with one or more objective measures to determine measures of full timing delay, noise timing delay and glitch noise in the circuit stage in response to the at least one noise aggressor.

5. The method of claim 4, further comprising:
annotating the measures of full timing delay, noise timing delay and glitch noise in the circuit stage to the timing graph for use in static timing analysis of the circuit stage in the integrated circuit design.

6. The method of claim 3, further comprising:
determining if the combined first order noise effect on the circuit stage is less than a predetermined threshold and if so then
    interpreting the computed nominal response and the combined first order noise effects of the circuit stage with one or more objective measures to determine measures of full timing delay, noise timing delay and glitch noise in the circuit stage in response to the at least one noise aggressor.

7. The method of claim 3, further comprising:

computing a combined response of the circuit stage to the input transition of the at least one victim driver and the at least one shifted input transition of the at least one aggressor driver; and interpreting the combined response of the circuit stage with an objective measure to determine measures of full timing delay, noise timing delay and glitch noise in the circuit stage in response to the at least one noise aggressor.

8. The method of claim 7, further comprising:

annotating the overall glitch response and timing delay in the circuit stage to the timing graph for use in static timing analysis of the circuit stage in the integrated circuit design.

9. The method of claim 1, wherein the at least one victim driver and the at least one aggressor driver are each modeled by a multi-CCC current source model.

10. The method of claim 1, wherein the forming of the model of the circuit stage of the integrated circuit design includes identifying the at least one victim driver, the at least one aggressor driver, and the at least one receiver coupled to the at least one victim net and the at least one aggressor net; and coupling parasitic resistances and capacitances to the at least one victim driver, the at least one aggressor driver, and the at least one receiver to model the at least one victim net and the at least one aggressor net.

11. The method of claim 10, wherein the forming of the model of the circuit stage of the integrated circuit design further includes filtering a plurality of aggressor drivers of the circuit stage into weak aggressor drivers and strong aggressor drivers in response to a predetermined constraint; and forming a virtual aggressor driver for the circuit stage to model the weak aggressor drivers together.

12. The method of claim 11, wherein the forming of the model of the circuit stage of the integrated circuit design further includes determining an input capacitance of the at least one receiver to model the at least one receiver.

13. The method of claim 12, wherein the forming of the model of the circuit stage of the integrated circuit design further includes reading a cell library file to determine a gate model for each of the at least one victim driver and the at least one aggressor driver.

14. The method of claim 13, wherein the gate model is a multi-CCC current source model.

15. The method of claim 1, wherein the at least one victim driver is modeled by a multi-CCC current source model.

* * * * *